(12) United States Patent
Kim et al.

(10) Patent No.: US 11,700,503 B2
(45) Date of Patent: Jul. 11, 2023

(54) CROWD SOURCED LOCATION DETERMINATION

(71) Applicant: Belkin International, Inc., Playa Vista, CA (US)

(72) Inventors: Ryan Yong Kim, Rolling Hills Estates, CA (US); Jon Plummer, Los Angeles, CA (US); David Shao, Gardenia, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 17/537,134

(22) Filed: Nov. 29, 2021

(65) Prior Publication Data

US 2022/0232344 A1    Jul. 21, 2022

Related U.S. Application Data

(63) Continuation of application No. 16/941,179, filed on Jul. 28, 2020, now Pat. No. 11,234,097, which is a
(Continued)

(51) Int. Cl.
*H04W 64/00* (2009.01)
*H04W 4/021* (2018.01)
(Continued)

(52) U.S. Cl.
CPC ............ *H04W 4/021* (2013.01); *H04W 4/02* (2013.01); *H04W 4/029* (2018.02); *H04W 4/50* (2018.02);
(Continued)

(58) Field of Classification Search
CPC ....... H04W 4/02; H04W 4/021; H04W 4/029; H04W 4/50; H04W 64/003; H04W 56/001; H04W 56/0005
See application file for complete search history.

(56) References Cited

U.S. PATENT DOCUMENTS 6,243,039 B1    6/2001    Elliot
7,479,889 B2    1/2009    Kazdin et al.
(Continued)

FOREIGN PATENT DOCUMENTS

WO    2014-016705 A2    1/2014

OTHER PUBLICATIONS

International Search Report and Written Opinion dated Oct. 6, 2015 in International Patent Application No. PCT/US2015/040330, all pages.

*Primary Examiner* — Siu M Lee
(74) *Attorney, Agent, or Firm* — Kilpatrick Townsend & Stockton LLP

(57) ABSTRACT

Techniques and systems for determining locations of devices using location data sources are provided. For example, a network device, method, and computer-program product may be provided. In one example, a method may include receiving, on a computing device, a request to locate a device, wherein the request includes an identifier of the device. The method may further include receiving a communication from the device, wherein the communication includes the identifier of the device, and obtaining a location of the device. The method may further include transmitting the location of the device and the identifier of the device to a server, wherein the server is configured to use the location of the device and the identifier of the device to send a response to the requestor of the request.

20 Claims, 26 Drawing Sheets

Related U.S. Application Data continuation of application No. 16/522,034, filed on Jul. 25, 2019, now Pat. No. 10,764,710, which is a continuation of application No. 16/109,527, filed on Aug. 22, 2018, now Pat. No. 10,412,542, which is a continuation of application No. 15/649,324, filed on Jul. 13, 2017, now Pat. No. 10,171,939, which is a continuation-in-part of application No. 14/958,685, filed on Dec. 3, 2015, now Pat. No. 9,712,963, and a continuation-in-part of application No. 14/798,734, filed on Jul. 14, 2015, now Pat. No. 10,021,517.

(60) Provisional application No. 62/087,657, filed on Dec. 4, 2014, provisional application No. 62/087,700, filed on Dec. 4, 2014, provisional application No. 62/024,702, filed on Jul. 15, 2014.

(51) Int. Cl.
  *H04W 4/50* (2018.01)
  *H04W 4/029* (2018.01)
  *H04W 4/02* (2018.01)
  *H04W 56/00* (2009.01)

(52) U.S. Cl.
  CPC ........ *H04W 64/003* (2013.01); *H04W 56/001* (2013.01); *H04W 56/0005* (2013.01)

(56) References Cited

U.S. PATENT DOCUMENTS

| | | |
|---|---|---|
| 8,396,888 B2 | 3/2013 | Cheng et al. |
| 8,559,608 B2 | 10/2013 | Fan et al. |
| 9,002,372 B2 | 4/2015 | Shakespeare et al. |
| 9,712,963 B2 | 7/2017 | Kim et al. |
| 10,021,517 B2 | 7/2018 | Kim et al. |
| 10,102,221 B2 | 10/2018 | Tuukkanen |
| 10,171,939 B2 | 1/2019 | Kim et al. |
| 10,412,542 B2 | 9/2019 | Kim et al. |
| 10,764,710 B2 | 9/2020 | Kim et al. |
| 11,234,097 B2 * | 1/2022 | Kim ............... H04W 4/029 |
| 2002/0019238 A1 | 2/2002 | McDonnell et al. |
| 2002/0123354 A1 | 9/2002 | Nowak |
| 2003/0025400 A1 | 2/2003 | Hall |
| 2005/0264416 A1 | 12/2005 | Maurer |
| 2006/0068812 A1 | 3/2006 | Carro et al. |
| 2007/0152823 A1 | 7/2007 | Hirahara et al. |
| 2007/0229350 A1 | 10/2007 | Scalisi et al. |
| 2007/0279237 A1 | 12/2007 | Julian et al. |
| 2008/0013540 A1 | 1/2008 | Gast |
| 2008/0112269 A1 | 5/2008 | Lawton |
| 2008/0133730 A1 | 6/2008 | Park et al. |
| 2008/0194274 A1 | 8/2008 | Ko |
| 2009/0129067 A1 | 5/2009 | Fan et al. |
| 2011/0177832 A1 | 7/2011 | Huang |
| 2011/0210847 A1 | 9/2011 | Howard et al. |
| 2011/0228727 A1 | 9/2011 | Julo et al. |
| 2011/0238751 A1 | 9/2011 | Belimpasakis et al. |
| 2013/0028245 A1 | 1/2013 | Oerton et al. |
| 2013/0324154 A1 | 12/2013 | Raghupathy et al. |
| 2014/0066105 A1 | 3/2014 | Bridge et al. |
| 2014/0171116 A1 | 6/2014 | LaMarca et al. |
| 2014/0210822 A1 | 7/2014 | Raley |
| 2014/0232292 A1 | 8/2014 | Adler et al. |
| 2015/0067032 A1 | 3/2015 | Djabarov et al. |
| 2015/0339902 A1 * | 11/2015 | Domínguez Latorre .................... G08B 13/2462 340/572.1 |
| 2019/0053014 A1 * | 2/2019 | Liu ............... H04W 4/027 |

\* cited by examiner

900

```
RECEIVE, BY A NETWORK DEVICE, LOCATION INFORMATION
OF AN ACCESS DEVICE, WHEREIN THE LOCATION
INFORMATION INCLUDES LOCATION COORDINATES OF THE
ACCESS DEVICE
902
```
↓
```
RECEIVE A SIGNAL FROM THE ACCESS DEVICE
904
```
↓
```
DETERMINE A LOCATION OF THE NETWORK DEVICE,
WHEREIN THE LOCATION OF THE NETWORK DEVICE IS
DETERMINED USING THE LOCATION INFORMATION OF THE
ACCESS DEVICE AND THE SIGNAL RECEIVED FROM THE
ACCESS DEVICE
906
```
↓
```
STORE THE LOCATION OF THE NETWORK DEVICE
908
```

```
┌─────────────────────────────────────────────┐
│ RECEIVE A REQUEST TO LOCATE A DEVICE, WHEREIN THE │
│   REQUEST INCLUDES AN IDENTIFIER OF THE DEVICE    │
│                     1302                          │
└─────────────────────────────────────────────┘
                      │
                      ▼
┌─────────────────────────────────────────────┐
│ RECEIVE A COMMUNICATION FROM THE DEVICE, WHEREIN  │
│  THE COMMUNICATION INCLUDES THE IDENTIFIER OF THE │
│                    DEVICE                         │
│                     1304                          │
└─────────────────────────────────────────────┘
                      │
                      ▼
┌─────────────────────────────────────────────┐
│         OBTAIN A LOCATION OF THE DEVICE           │
│                     1306                          │
└─────────────────────────────────────────────┘
                      │
                      ▼
┌─────────────────────────────────────────────┐
│  TRANSMIT THE LOCATION OF THE DEVICE AND THE      │
│   IDENTIFIER OF THE DEVICE TO A SERVER            │
│                     1308                          │
└─────────────────────────────────────────────┘
```

RECEIVE A COMMUNICATION, WHEREIN THE COMMUNICATION INCLUDES A REQUEST TO LOCATE A DEVICE, AN IDENTIFIER OF THE DEVICE, AND A GEOGRAPHICAL AREA TO SEARCH
1402

↓

DETERMINE A LOCATION DEVICE THAT IS PRESENT WITHIN THE GEOGRAPHICAL AREA, WHEREIN A LOCATION DEVICE IS CONFIGURED TO DETERMINE A LOCATION OF ONE OR MORE DEVICES WITHIN THE GEOGRAPHICAL AREA
1404

↓

TRANSMIT THE REQUEST AND THE IDENTIFIER OF THE DEVICE TO THE LOCATION DEVICE
1406

↓

RECEIVE A LOCATION OF THE DEVICE FROM THE LOCATION DEVICE
1408

↓

TRANSMIT THE LOCATION OF THE DEVICE TO THE REQUESTOR OF THE REQUEST
1410

FIG. 14

CROWD SOURCED LOCATION DETERMINATION

CROSS-REFERENCE TO RELATED APPLICATIONS

This application is a continuation of U.S. patent application Ser. No. 16/941,179, filed Jul. 28, 2020, which is a continuation of U.S. patent application Ser. No. 16/522,034, filed on Jul. 25, 2019, now U.S. Pat. No. 10,764,710, which is a continuation of U.S. patent application Ser. No. 16/109,527, filed on Aug. 22, 2018, now U.S. Pat. No. 10,412,542, which is a continuation of U.S. patent application Ser. No. 15/649,324, filed on Jul. 13, 2017, now U.S. Pat. No. 10,171,939, which is a continuation-in-part of U.S. patent application Ser. No. 14/798,734 filed on Jul. 14, 2015, now U.S. Pat. No. 10,021,517, which claims the benefit of and priority to U.S. Provisional Patent Application No. 62/024,702 filed on Jul. 15, 2014. U.S. patent application Ser. No. 15/649,324 application is also a continuation-in-part of U.S. patent application Ser. No. 14/958,685 filed on Dec. 3, 2015, now U.S. Pat. No. 9,712,963, which claims the benefit of and priority to U.S. Provisional Application No. 62/087,700 filed on Dec. 4, 2014, and U.S. Provisional Application No. 62/087,657 filed on Dec. 4, 2014. All of these applications are hereby incorporated by reference in their entireties for all purposes.

FIELD

The present disclosure relates to determining a location of one or more devices. In some examples, techniques and systems are provided for determining a location of one or more devices using one or more location data sources. In some examples, techniques and systems are provided for determining a location of one or more devices using crowd sourced location data.

BACKGROUND

A network may include various devices that are interconnected to other devices in the network using wires and/or wireless signals. For example, a local area network may include one or more gateways that provide network access to client devices (e.g., network devices, access devices, or the like) by providing wired connections and/or wireless connections using radio frequency channels. As another example, a mesh or ad hoc network may include multiple node devices. The node devices relay data among the network of nodes until the data reaches a destination.

Determining and/or reporting accurate locations or positions of devices in certain networks may be difficult using global positioning system (GPS) or cellular based location sources. For example, some devices may not have GPS or cellular transceiver radio chips, and thus may be unable to receive or transmit GPS and cellular signals. As another example, GPS and/or cellular signals may be inaccurate when received by a device located indoors. Accordingly, devices may be unable to accurately determine and/or report their location, which may prevent the devices from being located and also from performing various other location-related functions.

BRIEF SUMMARY

Techniques are described herein for determining a location of one or more devices using one or more location data sources. In some examples, a network device may not have access to adequate location data sources so that it can determine its location with sufficient accuracy. In such examples, the network device may use location information received from one or more other devices that have access to various location data sources or that can provide other information that can be used to determine a location of the network device. The network device may use the location information to determine its location. The determined location may become more and more accurate over a period of time by continuously or periodically accessing location information from the one or more other devices.

The other devices with access to the various location data sources may include other network devices, one or more access devices, one or more gateways, or the like. For example, a network device may determine its location using the network device's location relative to one or more other network devices, the network device's location relative to other devices (e.g., access devices, gateways, or the like), Internet protocol geolocation sources, or the like. In some embodiments, a graphical interface may be used to allow a user to indicate a location of a device. The location of the network device may then be used to perform various location-related functions. In one example, once the network device determines a sufficiently accurate location for itself, the network device may recognize that an access device is located within a certain proximity from the network device, and, in response, may perform a function. Examples of functions that may be performed may include, but are not limited to, turning a light on or off, turning a water faucet on or off, opening or closing a garage door, turning spinklers on or off, or the like.

In some examples, a network device may store location information corresponding to its determined location. For example, the network device may store global positioning system (GPS) coordinates or a latitude-longitude position of the network device's position. In some embodiments, a network device may transmit its stored location information so that other devices can use the location information to determine their own locations. For example, the network device may broadcast its location information in a beacon frame, or in some other communication that can broadcast the network device's location information to one or more other devices within or outside of the network device's network.

According to at least one example, a network device may be provided that includes one or more processors and a receiver configured to receive location information of an access device, wherein the location information includes location coordinates of the access device, and receive a signal from the access device. The network device further includes a non-transitory machine-readable storage medium containing instructions which when executed on the one or more data processors, cause the one or more processors to perform operations including determining a location of the network device, wherein the location of the network device is determined using the location information of the access device and the signal received from the access device. The network device further includes a storage device configured to store the location of the network device.

In some embodiments, a computer-implemented method may be provided that includes receiving, on a network device, location information of an access device, wherein the location information includes location coordinates of the access device. The method further includes receiving, on the network device, a signal from the access device, and determining a location of the network device, wherein the location of the network device is determined using the location information of the access device and the signal received from the access device. The method further includes storing, on the network device, the location of the network device.

In some embodiments, a computer-program product tangibly embodied in a non-transitory machine-readable storage medium of a first network device may be provided. The computer-program product may include instructions configured to cause one or more data processors to: receive location information of an access device, wherein the location information includes location coordinates of the access device; receive a signal from the access device; determine a location of the network device, wherein the location of the network device is determined using the location information of the access device and the signal received from the access device; and store the location of the network device.

In some embodiments, the method, computing device, and computer-program product described above may further include a transmitter configured to transmit the location of the network device. In some embodiments, the location of the network device is transmitted in a beacon, and wherein the beacon includes a service set identification associated with the network device.

In some embodiments, the location coordinates include global positioning coordinates of the access device.

In some embodiments, the receiver is further configured to receive a signal from an additional network device, and the method, computing device, and computer-program product described above may further include instructions which when executed on the one or more data processors, cause the one or more processors to perform operations including determining a signal strength of the signal, and determining the location of the network device using the signal strength of the signal.

In some embodiments, the receiver is further configured to receive updated location information of the access device, wherein the updated location information of the access device is updated over time using sensor information of the access device. The method, computing device, and computer-program product described above may further include instructions which when executed on the one or more data processors, cause the one or more processors to perform operations including determining an updated location of the network device, wherein the updated location of the network device is determined using the updated location information. In some embodiments, the method, computing device, and computer-program product described above may further include instructions which when executed on the one or more data processors, cause the one or more processors to perform operations including determining a layout of a venue in which the network device is located, wherein the layout is estimated using the updated location information.

In some embodiments, the receiver is further configured to receive signal strengths of other signals received by other network devices from the access device. The method, computing device, and computer-program product described above may further include instructions which when executed on the one or more data processors, cause the one or more processors to perform operations including determining a signal strength of the signal received from the access device, performing triangulation using the signal strength of the signal and the signal strengths of the other signals, and determining the location of the network device using a result of the triangulation.

In some embodiments, the method, computing device, and computer-program product described above may further include instructions which when executed on the one or more data processors, cause the one or more processors to perform operations including performing triangulation using the location coordinates of the access device, and determining the location of the network device using a result of the triangulation.

In some embodiments, the method, computing device, and computer-program product described above may further include instructions which when executed on the one or more data processors, cause the one or more processors to perform a site survey to determine an existence of one or more gateways. The receiver is configured to receive identification information of the one or more gateways, a transmitter is configured to transmit the identification information of the one or more gateways, and the receiver is further configured to receive location information associated with the one or more gateways. The method, computing device, and computer-program product described above further includes instructions which when executed on the one or more data processors, cause the one or more processors to determine the location of the network device using the location information associated with the one or more gateways.

In some embodiments, the method, computing device, and computer-program product described above may further include instructions which when executed on the one or more data processors, cause the one or more processors to perform operations including determining an internet protocol address of a gateway, and determining the location of the network device using the internet protocol address of the gateway.

In some embodiments, the receiver is further configured to receive global positioning system location information. The method, computing device, and computer-program product described above may further include instructions which when executed on the one or more data processors, cause the one or more processors to perform operations including validating the location of the network device using the global positioning system location information.

In some embodiments, the receiver is further configured to receive a gateway signal from a gateway. The method, computing device, and computer-program product described above may further include instructions which when executed on the one or more data processors, cause the one or more processors to perform operations including determining a signal strength of the gateway signal, and determining the location of the network device using the signal strength of the gateway signal.

In some examples, a network device may be provided that includes one or more processors and a non-transitory machine-readable storage medium containing instructions which when executed on the one or more data processors, cause the one or more processors to perform operations including providing for display an icon of a network device. The device further includes a receiver configured to receive input corresponding to a position of the network device. The device further includes a transmitter configured to transmit the position to the network device, wherein a location of the network device is determined using the position.

In some embodiments, a computer-implemented method may be provided that includes providing for display, by a computing device, an icon of a network device. The method further includes receiving input corresponding to a position of the network device, and transmitting the position to the network device, wherein a location of the network device is determined using the position.

In some embodiments, a computer-program product tangibly embodied in a non-transitory machine-readable storage medium of a first network device may be provided. The computer-program product may include instructions configured to cause one or more data processors to: provide for display an icon of a network device; receive input corresponding to a position of the network device; and transmit the position to the network device, wherein a location of the network device is determined using the position.

In some embodiments, the method, computing device, and computer-program product described above may further include providing for display a map of a venue in which the network device is located, wherein the icon of the network device is provided for display by overlaying the icon on the map.

In some embodiments, the method, computing device, and computer-program product described above may further include providing for display a layout of the venue in which the network device is located, wherein the layout of the venue is provided for display by overlaying the layout on the map.

In some embodiments, the position is used to update the location of the network device. In some embodiments, the input corresponding to the position of the network device includes a drag-and-drop operation, and wherein the drag-and-drop operation includes dragging the icon of the network device to the position. In some embodiments, the input corresponding to the position of the network device includes a pin-drop operation, and wherein the pin-drop operation includes dropping a pin at the position.

Techniques are also described herein for determining a location of a device or object using crowd sourced location data. In some examples, a network of location devices may be used to locate an object located remotely from a user that desires that the object be located. The object may be unable to communicate directly with a client device of the user. The object may also be unable to determine its own location and/or transmit its location to the client device of the user from the remote location. Accordingly, the network of location devices may be used to locate the object, and to communicate the location of the object back to the client device of the user. The network of location devices and the client device of the user may be in communication with a network server. The network of location devices may report the location of the object to the network server. The network server may then report the location of the object to the client device of the user.

In some examples, a user may make a location request using a client device in order to locate an object that has been misplaced. A device may be part of or integrated with the object to allow the object to be located. The request may be transmitted to a network server, and the network server may identify one or more location devices in which to send the request. For example, the network server may identify one or more location devices based on a geographical area or region identified by the user. The network server may transmit the request to an identified location device. The location device may receive a communication from the device that is included with the object. The location device may obtain the location of the object. The communication may include an identifier that identifies the device and/or object so that the location device obtains the location of the correct object. The location device and/or the network server may also transmit the request to other location devices that may also be configured to obtain the location of the device included with the object. The location devices may send locations of the object back to the network server. Using location information of the object received from a group of the location devices, the network server may respond to the user's request with an accurate location of the object. For example, the network server may allow the user to track movement of the object as the object moves to different locations. In some embodiments, a location device may report a location of the object without receiving a request from the network server. For example, any location device that receives the communication from the device may obtain the object's location, and may transmit the location back to the network server. The network server may store the location information of the object in the event a user requests location of the object.

According to at least one example, a computing device may be provided that includes one or more data processors and a receiver configured to receive a request to locate a device, wherein the request includes an identifier of the device. The receiver is further configured to receive a communication from the device, wherein the communication includes the identifier of the device. The computing device further includes a non-transitory machine-readable storage medium containing instructions which when executed on the one or more data processors, cause the one or more processors to perform operations including obtaining a location of the device. The computing device further includes a transmitter configured to transmit the location of the device and the identifier of the device to a server, wherein the server is configured to use the location of the device and the identifier of the device to send a response to a requestor of the request.

In some embodiments, a computer-implemented method may be provided that includes receiving, on a computing device, a request to locate a device, wherein the request includes an identifier of the device. The method further includes receiving a communication from the device, wherein the communication includes the identifier of the device, and obtaining a location of the device. The method further includes transmitting the location of the device and the identifier of the device to a server, wherein the server is configured to use the location of the device and the identifier of the device to send a response to the requestor of the request.

In some embodiments, a computer-program product tangibly embodied in a non-transitory machine-readable storage medium of a first network device may be provided. The computer-program product may include instructions configured to cause one or more data processors to: receive a request to locate a device, wherein the request includes an identifier of the device; receive a communication from the device, wherein the communication includes the identifier of the device; obtain a location of the device; and transmit the location of the device and the identifier of the device to a server, wherein the server is configured to use the location of the device and the identifier of the device to send a response to the requestor of the request.

In some embodiments, the transmitter is configured to transmit the request to locate the device to one or more devices within a geographical area, wherein the transmitted request includes the identifier of the device.

In some embodiments, the request is received as a broadcast request that is receivable by the one or more devices within the geographical area.

In some embodiments, the method, computing device, and computer-program product described above may further include instructions which when executed on the one or more data processors, cause the one or more processors to perform operations including determining the location of the device using the communication received from the device.

In some embodiments, the receiver is configured to receive the location of the device from the device, wherein the location is determined by the device. In some embodiments, the location is determined by the device using signals received from one or more location devices.

In some embodiments, the computing device includes an access device. In some embodiments, the computing device includes a network device. In some embodiments, the device includes a tracking device.

In some embodiments, the location includes global positioning coordinates of the device.

According to another example, a network server may be provided that includes one or more data processors and a receiver configured to receive a communication, wherein the communication includes a request to locate a device, an identifier of the device, and a geographical area to search. The computing device further includes a non-transitory machine-readable storage medium containing instructions which when executed on the one or more data processors, cause the one or more processors to perform operations including determining a location device that is present within the geographical area, wherein a location device is configured to obtain a location of one or more devices within the geographical area. The computing device further includes a transmitter configured to transmit the request and the identifier of the device to the location device. The receiver is configured to receive a location of the device from the location device, and the transmitter is configured to transmit the location of the device to a requestor of the request In some embodiments, a computer-implemented method may be provided that includes receiving, on a network server, a communication, wherein the communication includes a request to locate a device, an identifier of the device, and a geographical area to search. The method further includes determining a location device that is present within the geographical area, wherein a location device is configured to obtain a location of one or more devices within the geographical area. The method further includes transmitting the request and the identifier of the device to the location device, receiving a location of the device from the location device, and transmitting the location of the device to the requestor of the request.

In some embodiments, a computer-program product tangibly embodied in a non-transitory machine-readable storage medium of a first network device may be provided. The computer-program product may include instructions configured to cause one or more data processors to: receive a communication, wherein the communication includes a request to locate a device, an identifier of the device, and a geographical area to search; determine a location device that is present within the geographical area, wherein a location device is configured to obtain a location of one or more devices within the geographical area; transmit the request and the identifier of the device to the location device; receive a location of the device from the location device; and transmit the location of the device to the requestor of the request.

In some embodiments, the transmitter is configured to transmit the request as a broadcast request that is receivable by a plurality of location devices within the geographical area.

In some embodiments, the method, computing device, and computer-program product described above may further include instructions which when executed on the one or more data processors, cause the one or more processors to perform operations including determining whether the requestor is authorized to locate the device, wherein determining includes generating a signature using a key associated with the requestor.

In some embodiments, the transmitter is configured to transmit the request to the location device, and the receiver is configured to receive the location of the device from an additional location device within the geographical area, wherein the request is transmitted from the location device to the additional location device.

According to another example, a computing device may be provided that includes one or more data processors and a transmitter configured to transmit a tracking signal, wherein the tracking signal includes an identifier of the computing device. The computing device further includes a receiver configured to receive a response, wherein the response includes location information of a device. The computing device further includes a non-transitory machine-readable storage medium containing instructions which when executed on the one or more data processors, cause the one or more processors to perform operations including determining a distance between the computing device and the device and determining a location of the computing device using the location information and the determined distance. The transmitter is configured to transmit the location of the computing device and the identifier to the device, wherein the device is configured to send the location of the computing device and the identifier to a network server.

In some embodiments, a computer-implemented method may be provided that includes transmitting, from a computing device, a tracking signal, wherein the tracking signal includes an identifier of the computing device. The method further includes receiving a response, wherein the response includes location information of a device, determining a distance between the computing device and the device, determining a location of the computing device using the location information and the determined distance. The method further includes transmitting the location of the computing device and the identifier to the device, wherein the device is configured to send the location of the computing device and the identifier to a network server.

In some embodiments, a computer-program product tangibly embodied in a non-transitory machine-readable storage medium of a first network device may be provided. The computer-program product may include instructions configured to cause one or more data processors to: transmit a tracking signal, wherein the tracking signal includes an identifier of the computing device; receive a response, wherein the response includes location information of a device; determine a distance between the computing device and the device; determine a location of the computing device using the location information and the determined distance; and transmit the location of the computing device and the identifier to the device, wherein the device is configured to send the location of the computing device and the identifier to a network server.

In some embodiments, the method, computing device, and computer-program product described above may further include instructions which when executed on the one or more data processors, cause the one or more processors to perform operations including determining that the computing device is outside of a communication range with an access device, and transmitting the tracking signal when the computing device is outside of the communication range.

In some embodiments, the receiver is configured to receive a plurality of responses, wherein each response includes location information of a sender of the response.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 9 is a flowchart illustrating an embodiment of a process for determining a location of a network device, in accordance with some embodiments.

FIG. 13 is a flowchart illustrating an embodiment of a process for determining a location of a device, in accordance with some embodiments.

FIG. 14 is a flowchart illustrating another embodiment of a process for determining a location of a device, in accordance with some embodiments.

DETAILED DESCRIPTION

Figure 1:
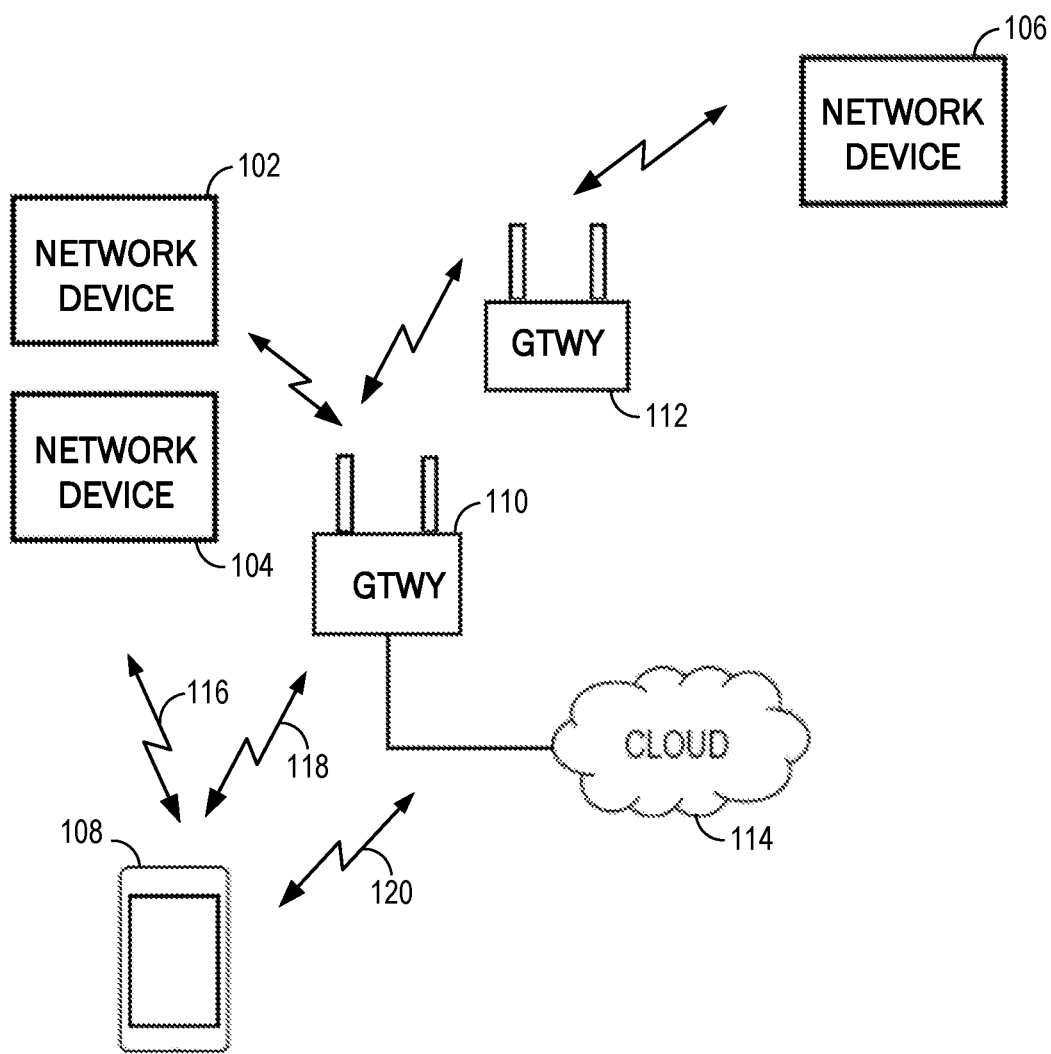
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on an access device (e.g., via an application, program, or the like installed on and executed by the access device). In some embodiments, only a single gateway is included in the local area network (e.g., any other displayed gateways may be part of other local area networks). For example, the single gateway may include a router. In such embodiments, only the single gateway may be displayed (e.g., when only the single gateway is detected by the network device). In some embodiments, multiple gateways may be located in the local area network (e.g., a router, a range extending device, or the like), and may be displayed. For example, a router and a range extender may be part of the local area network. A user may select one of the gateways as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Each network device and access device may also be assigned a unique identifier (e.g., a universally unique identifier (UUID), a unique device identifier (UDID), globally unique identifier (GUID), or the like) by the cloud server that is separate from the network ID and the unique security key of each device. Accordingly, the access device may perform accountless authentication to allow the user to remotely access the network device via the cloud network without logging in each time access is requested. Further details relating to an accountless authentication process are described below. Also, the network device can communicate with the server regarding the logical network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments or venues, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

Upon being powered on or reset, network devices, access devices, or any other client devices may be registered with an external network (e.g., cloud network 114) and associated with a logical network within the local area network 100. Details relating to registration of network devices are described below with respect to FIG. 16.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Many advantages arise from a client device being able to accurately determine its location. For example, a client device may successfully perform various location-related functions (as described below) when an accurate location can be determined. As another example, a client device may store and share its location information with other devices, allowing the other devices to use the location information to determine their own locations and also to aid in determining locations of other devices.

Devices may determine their locations using various location data sources, such as global positioning system (GPS) sources, cellular sources, WiFi™ sources, Bluetooth™ sources, Zigbee™ sources, UWB sources, WiFi-Direct sources, BLE sources, or other sources of location data. A combination of these location data sources may be used in order to accurately determine a location. For example, a device may attempt to locate itself using a combination of satellite-based GPS, cellular triangulation, and WiFi™ triangulation. When the device is located outdoors under open sky, signals from these location data sources may be received without large amounts of distortion or other interference. When the device moves to an indoor or partially indoor venue, the signals from GPS or cellular location data sources may become distorted due to the signals reflecting and deflecting off of structures and items located in and around the venue. The distortion of the signals may make the location information received from the location data source insufficient to locate the device with any degree of accuracy (e.g., to determine when the device is in one room versus the hallway or in another room). While WiFi™, Bluetooth™, Zigbee™, or other signals may be available to the device in the indoor or partially indoor venue, using these signals alone may not be accurate enough to determine a sufficiently accurate location. Accordingly, in some cases, access to multiple location data sources may be needed to perform accurate location determination.

Some devices may not be equipped with a GPS transceiver radio, a cellular transceiver radio, or other transceiver capable of receiving location-related data. For example, a network device may be equipped with one or more of a WiFi™ transceiver radio, a Bluetooth™ transceiver radio, a Zigbee™ transceiver radio, a UWB transceiver radio, a WiFi-Direct transceiver radio, a BLE transceiver radio, or the like, but may not have a GPS transceiver radio or a cellular transceiver radio. As a result, the network device may only be able to perform location determination techniques (e.g., triangulation, trilateration, or the like) using available WiFi™, Bluetooth™, Zigbee™, UWB, WiFi-Direct, or BLE signals. As previously noted, using WiFi™, Bluetooth™, Zigbee™, UWB, WiFi-Direct, or BLE signals alone may not provide a sufficiently accurate location determination. Accordingly, techniques and systems are needed to provide devices that have limited direct access to some location data sources with the ability to use location information from one or more other devices that have access to various location data sources or that can provide other information that can be used to determine a location of a device. As explained herein, techniques and systems are provided that can determine the location of a device using information from other devices that have access to one or more location data sources or other information useful for determining a location of a device.

Figure 2:
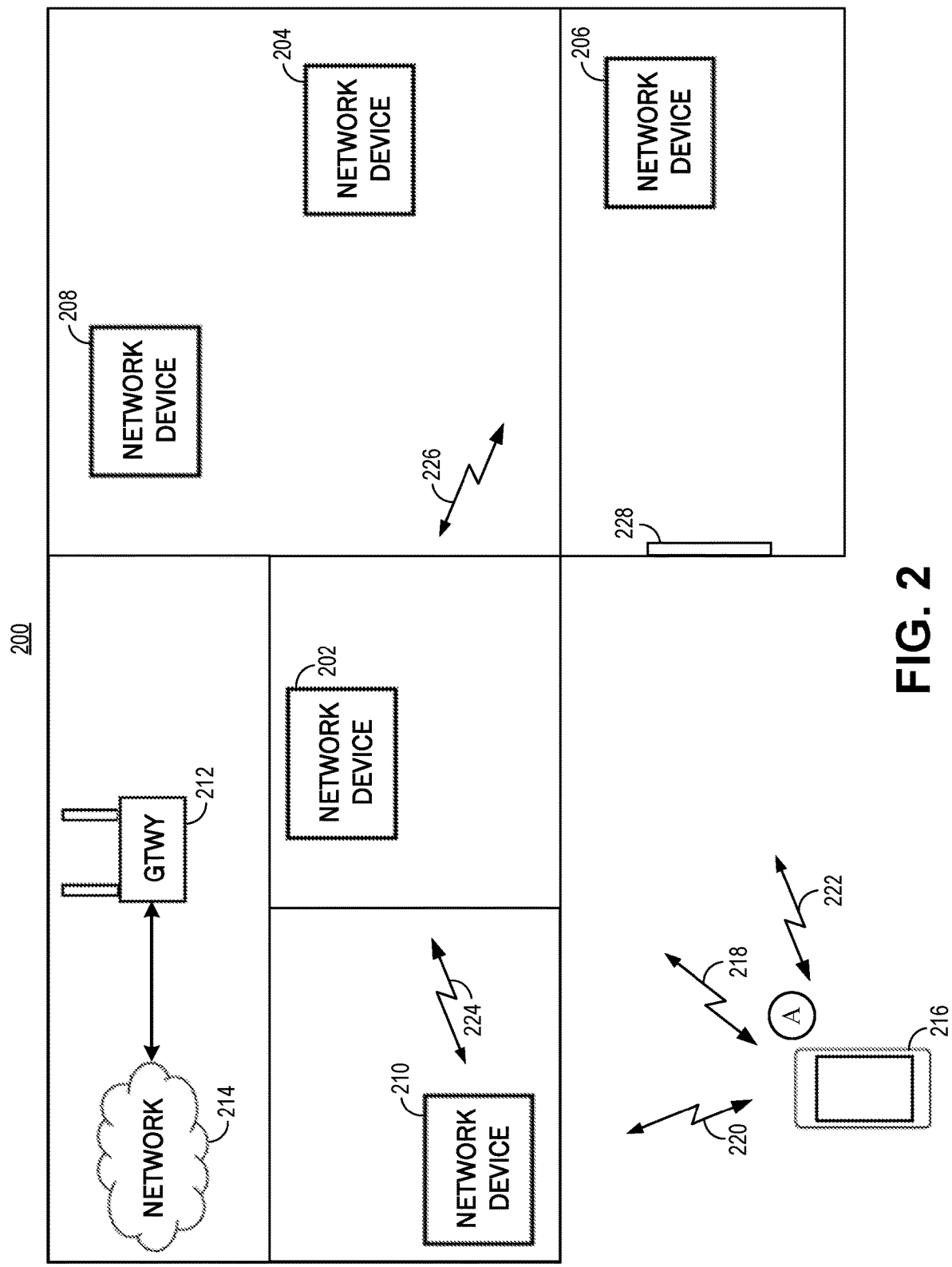
FIG. 2 is an illustration of an example of a venue, in accordance with some embodiments.
Figure 3:
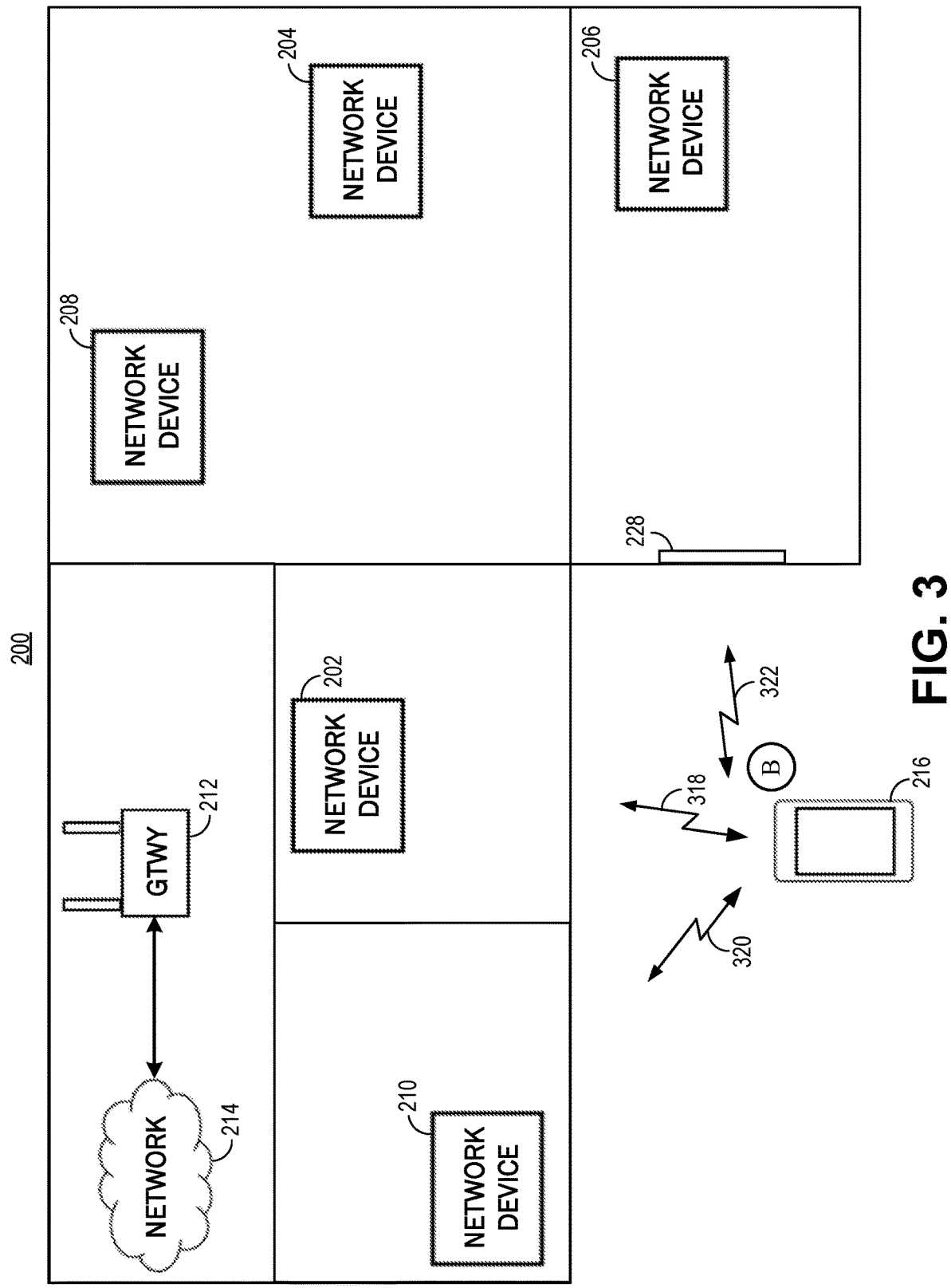
FIG. 3 is an illustration of another example of a venue, in accordance with some embodiments.
Figure 5:
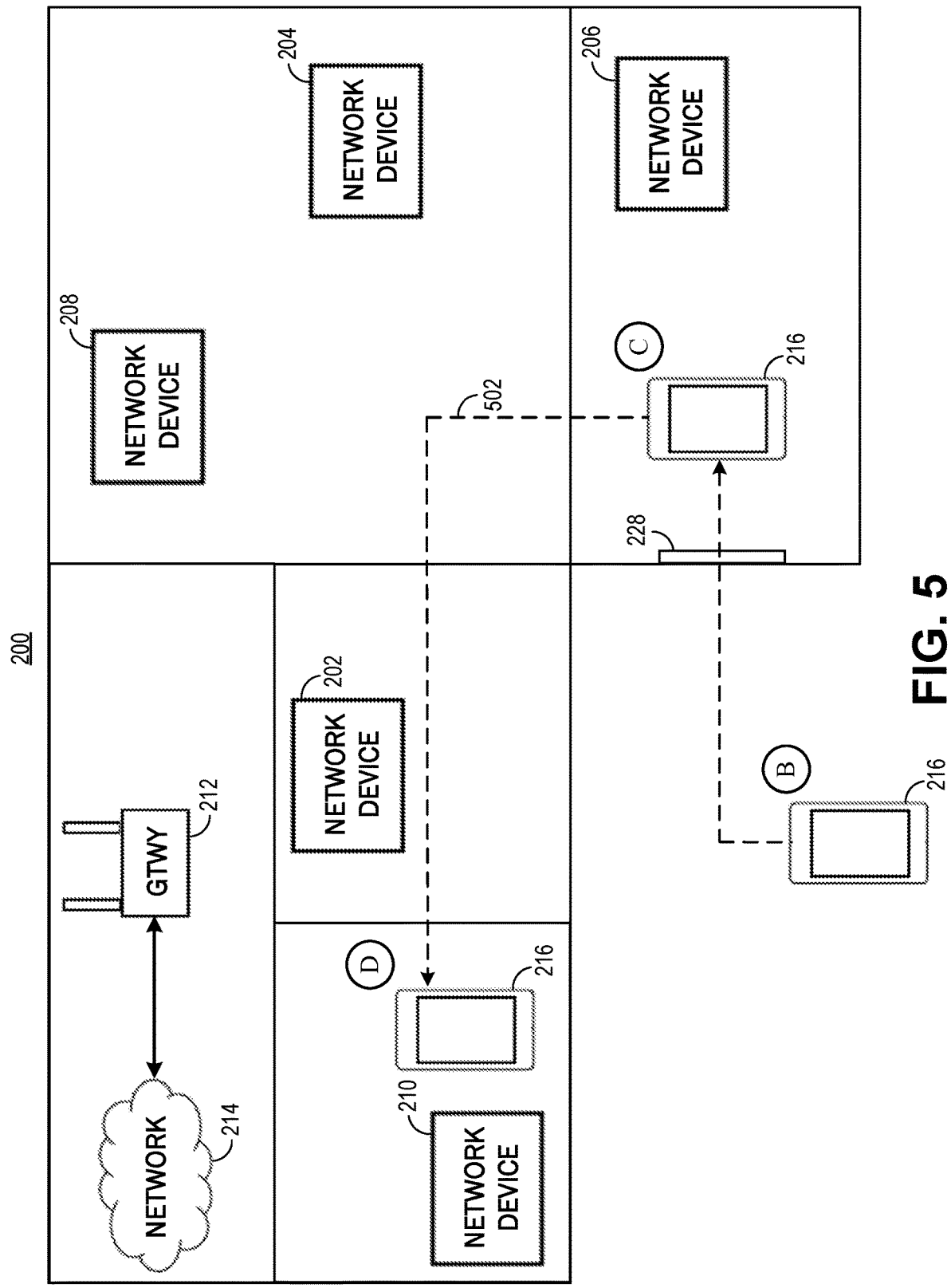
FIG. 5 is an illustration of another example of a venue, in accordance with some embodiments.

FIGS. 2, 3, and 5 illustrate an example of a venue 200 in which one or more client devices can determine their locations. The venue 200 may include a local area network. The local area network may be similar to the local area network 100 described above. Various devices may be located within and around the venue 200, such as network devices 202, 204, 206, 208, 210, an access device 216, and a gateway 212. It should be appreciated that devices other than those depicted may be located in and around the venue 200. Further, the embodiment shown in the figure is only one example of a venue that may incorporate an embodiment of the invention. In some other embodiments, venue 200 may include more or fewer devices within or in proximity to it than shown in the figure.

In some embodiments, the network devices 202, 204, 206, 208, 210 may include one or more network devices that allows a user to locally or remotely access, control, and/or configure various other devices. Network devices 202, 204, 206, 208, 210 may be similar to the network devices 102, 104, 106 described above with respect to FIG. 1. For example, network device 202 may include an IoT device. One example of a network device includes an automation switch that may be coupled with an appliance so that a user can access, control, and/or configure the appliance via the network device. One of ordinary skill in the art will appreciate that any of the network devices 202, 204, 206, 208, 210 may include any other type of device that can be used to allow remote access, control, and/or configuration of another device.

Access device 216 may be utilized by a user to wirelessly communicate with any of the network devices 202, 204, 206, 208, 210. The access device 216 may include any human-to-machine interface with network connection capability that allows access to a network. For example, access device 216 may be similar to the access device 108 described above with respect to FIG. 1. The user may interact with the network devices network devices 202, 204, 206, 208, 210 using an application, a web browser, a proprietary program, or any other program executed and operated by the access device 216. In some embodiments, the access device 216 may communicate directly with the network devices 202, 204, 206, 208, and/or 210 using Bluetooth™ signals, Zigbee™ signals, WiFi™ signals, UWB signals, WiFi-Direct signals, BLE signals, or the like. In some embodiments, the access device 404 may communicate with the network devices 202, 204, 206, 208, 210 via the gateway 212 and/or the network 214.

Gateway 212 may provide communication capabilities to the access device 216 and to the network devices 202, 204, 206, 208, 210 by providing radio signals in order to provide communication, location, and/or other services to the devices. The gateway 212 may include a router, an access point, a modem, a range extending device, and/or any other device that provides wireless network access among one or more computing devices and/or external networks. For example, gateway 212 may include a router or access point providing the local area network of venue 200 with access to the external network 210. In some embodiments, the venue 200 may include one or more other gateways, such as a range extending device.

The wireless network provided by gateway 212 may be any type of network familiar to those skilled in the art that can support data communications using any of a variety of commercially-available protocols. For example, gateway 212 may provide wireless communication capabilities for a local area network using particular communications protocols, such as WiFi™ (e.g., IEEE 802.11 family standards), or other mobile communication technologies, or any combination thereof. Using the communications protocol(s), the gateway 212 may provide radio frequencies on which wireless enabled devices in the local area network can communicate.

The gateway 212 may also provide the access device 216 and the network devices 202, 204, 206, 208, 210 with access to one or more external networks, such as the external network 214, which may include a cloud network, the Internet, and/or other wide area networks. The external network 214 may be similar to the cloud network 114 described with respect to FIG. 1. Gateway 212 is connected to the external network 214 (via a wired or wireless connection), and provides the devices within the local area network of the venue 200 with access to the external network 214.

While only five network devices 202, 204, 206, 208, 210, a single access device 216, and a single gateway 212 are shown in FIG. 2, one of ordinary skill in the art will appreciate that any number of network devices, access devices, and gateways may be connected with a local area network in the venue 200.

In some embodiments, one or more of the network devices 202, 204, 206, 208, 210 may not be equipped with a transceiver radio configured to receive and transmit signals for a particular location data source (e.g., a GPS transceiver radio, a cellular transceiver radio, or the like). For example, one or more of the network devices 202, 204, 206, 208, 210 may be equipped with one or more of a WiFi™ transceiver radio, a Bluetooth™ transceiver radio, a Zigbee™ transceiver radio, a UWB transceiver radio, a WiFi-Direct transceiver radio, a BLE transceiver radio, or the like, but may not have a GPS transceiver radio and/or a cellular transceiver radio. As a result, the network devices 202, 204, 206, 208, or 210 may only be able to perform location determination techniques (e.g., triangulation, trilateration, or the like) using available WiFi™, Bluetooth™, Zigbee™, UWB, WiFi-Direct, or BLE signals, which may not alone provide enough information for a sufficiently accurate location determination.

The network devices 202, 204, 206, 208, or 210 that do not have GPS or cellular capabilities may receive location information from one or more other devices that have access to various location data sources or that can provide other information that can be used to determine a location of the network devices. Devices that may have access to location data sources or that can provide such other information may include other network devices 202, 204, 206, 208, or 210, the access device 216, the gateway 212, or other configured devices.

Various techniques may be used by a device to gather location information from one or more other devices to enable the device to accurately determine its location. In some examples, a network device 202, 204, 206, 208, or 210 may determine its location using location information and signals received from the access device 216, and may supplement the location determination using signals received from one or more of the other network device 202, 204, 206, 208, or 210. For example, network device 202 may receive location information from the access device 216, which has access to one or more location data sources, such as GPS and/or cellular location data sources. The location information may include location coordinates of the access device 216 (e.g., GPS location coordinates, a latitude-longitude position, or the like) indicating that the access device 216 is located at point A (FIG. 2) or point B (FIG. 3).

Because the access device 216 is located outdoors in the embodiments illustrated in FIGS. 2 and 3, the access device 216 may accurately determine its location based on signals received from a location data source, such as a GPS satellite and/or a cellular network server. For example, the access device 216 may determine its location by performing triangulation or trilateration using signals from one or more GPS satellites. As another example, a server (e.g., a GPS server with which the user has a subscription, a server of a cellular or other broadband network provider, or the like) may perform triangulation or trilateration using signals from one or more GPS satellites to determine the location of the access device 216. The server may then transmit the location to the access device 216. As yet another example, a cellular or other broadband network provider may maintain a database that includes a correlation between an identifier (e.g., a media access control (MAC) address, or the like) of known gateways or cell towers and the locations of the gateways or cell towers. The access device 216 may send a request to a server of the access provider with a list of identifiers of gateways or cell towers for which the access device 216 is within range. The server may compare the identifier with the database of known identifiers to identify location information identifying the locations of the gateways and cell towers. The server or access device 216 may use the location information of the gateways and/or cell towers to triangulate or trilaterate the location of the access device 216. In the event the server performs the triangulation or trilateration, the server may send the location to the access device 216. Similar techniques may be used by other service providers to determine locations of WiFi™ gateways (e.g., access points, routers, or the like) using a database of known locations of the gateways, which may further be used to determine locations of other devices (e.g., access devices, other gateways, network devices, or the like) by performing triangulation or trilateration. In some embodiments, the access device 216 may use a combination of GPS, cellular, or WiFi™ location data sources to determine, verify, or supplement its location.

Using these various location data sources, the access device 216 may determine its location at point A (FIG. 2) and point B (FIG. 3). The access device 216 may then transmit to the network devices 202, 204, 206, 208, and/or 210 the location information identifying the locations for points A and B. At this point in time, the network devices 202, 204, 206, 208, and 210 are aware of the locations of two points in space (points A and B). In order for the network device 202, for example, to determine its own location, it may need to determine further information. In some embodiments, the network device 202 may determine its relative distance from other devices, and may use the distance information along with the location information of points A and B to determine its own location. In some examples, the network device 202 may determine its relative distance to one or more of the other network devices 204, 206, 208, or 210, its relative distance from the access device 216, and/or its relative distance from a gateway (e.g., gateway 212).

For example, the network device 202 may first obtain signals from one or more of the other network devices 204, 206, 208, or 210 in order to determine a relative geometry of its position relative to the other network devices 204, 206, 208, or 210. The network device 202 may receive signal 224 from network device 210 and the signal 226 from network device 206. The signals 224 and 226 may be used by the network device 202 to determine the distance of each of the network devices 206 and 210 from the network device 202. For example, the network device 202 may determine the distance between it and the network device 206 based on the signal strength of signal 226 received from the network device 206. The network device 202 may also determine its distance from the network device 206 by determining the round-trip time (RTT) of a signal (not shown) it sends to the network device 206, which includes the time it takes for the signal transmitted from the network device 202 to the network device 206 to be received back at the network device 202. In some embodiments, a combination of the signal strength of a signal (e.g., signal 226) and the RTT of the signal may be used to determine the network device's 202 distance from the network device 206. Further details describing techniques for determining a distance using signal characteristics are described below.

Figure 4:
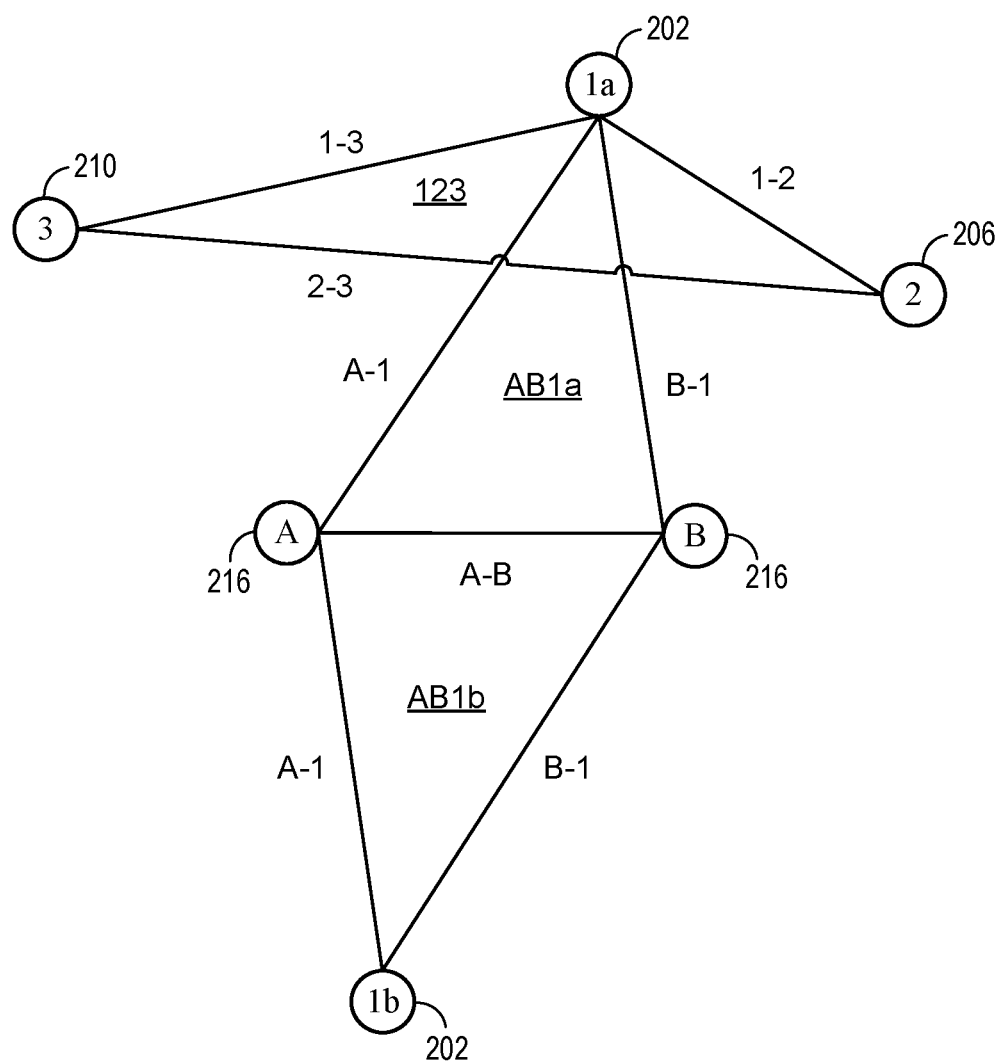
FIG. 4 is a diagram illustrating a result of one or more distance determinations by a device, in accordance with some embodiments.

FIG. 4 is a diagram illustrating a result of the distance determinations by the network device 202. For example, the network device 202 may determine that its distance from network device 206 is a distance 1-2, and may determine that its distance from network device 210 is a distance 1-3. The network device 202 may also be aware that the distance between network devices 210 and 206 is a distance 2-3. For example, network device 206 may indicate the distance 2-3 to the network device 202 in the signal 226 or another signal. Based on these distance determinations, the network device 202 may determine that it and the network devices 206 and 210 have a relative geometry in the shape of the triangle 123. While, at this point in time, the network device 202 is aware of the locations of the access device 216 at points A and B, and also of its geometry relative to network devices 206 and 210, the network device 202 is not yet aware of its own location in space, which is illustrated in FIG. 4 as point 1a. For example, the orientation of the triangle 123 is not yet known by the network devices 202, 206, and 210. In order to determine that its location is at point 1a and not at point 1b, the network devices 202, 206, and 210 may determine their distances from the access device 216 at points A and B.

The network devices 202, 206, and 210 may use one or more signals received from the access device 216 to determine their distances from the access device 216. For example, the network device 202 may determine the distance between it and the access device 216 at point A using the signal strength of signal 218 received from the access device 216, based on the RTT of a signal it sends to the access device 216, or a combination thereof. Signal 318 may be used by the network device 202 to determine its distance from the access point 216 at point B. Network devices 206 and 210 may determine their respective distances from access device using signals 220, 222, 320, and 322.

Referring to FIG. 4, the network device 202 may determine that the distance from it to the access device 216 at point A is a distance A-1, and that the distance from it to the access device 216 at point B is a distance B-1. Because the network device 202 knows the location coordinates (e.g., GPS location coordinates, latitude-longitude position, or the like) of points A and B, the distance A-B between A and B can also be determined. As a result, the two vertices A and B of the triangle AB1a are known, as well as the distances A-B, A-1, and B-1. However, the location of the network device 202 can be at either of two spots in two-dimensional space, including either location 1a or location 1b. The network device 202 may determine whether it is located at location 1a or location 1b by referencing the distance 1-2 or the distance 1-3. For example, because the network device 102 has determined that the distance between it and network device 206 is a distance 1-2, the network device can determine that it is at position 1a. This is due to the fact that if the network device 102 were located at position 1b, the distance between it and network device 206 would be a distance other than distance 1-2.

Once the locations of one or more of the network devices 202, 204, 206, 208, or 210 are known, other devices on the network (e.g., other network devices, access devices, or the like) may determine their locations by performing triangulation or trilateration using the locations of the network devices 202, 204, 206, 208, or 210 and the distances thereto. As a result, each of the network devices 202, 204, 206, 208, 210 become a location data source that can be used by another device to determine its location. Techniques for storing and sharing location information of devices will be described in further detail with respect to FIGS. 9, 10, and 13-15.

Various signal characteristics may be analyzed by the network device 202 to determine its relative distance from other devices. For example, a received signal strength indicator (RSSI) measurement, a received channel power indicator (RCPI) measurement, a round-trip time (RTT) measurement, a combination thereof, or the like may be used to determine relative distance between two devices. RSSI and RCPI measurements may indicate the power present in a radio signal received from a device. A RTT measurement may indicate the length of time it takes for a signal to be transmitted from one device to another in addition to the length of time it takes for an acknowledgment of that signal to be received. Different techniques may be performed using the signal characteristics in order to determine corresponding distances, such as a Line-of-sight technique, a Hata technique, an Indoor Attenuation technique, creation of environment-specific signal strength maps, or any other appropriate method to determine a distance from one device to another. Experiments may be conducted in order to determine the correlations between signal characteristics and distance. For example, environment-specific signal strength maps may be calculated to provide a relation between RSSI measurements and locations.

As illustrated in FIG. 5, the access device 216 may move from point B to point C through a door 228, and then from point C to point D. As the access device 216 moves from point to point, new location information becomes available at each point along the path 502. Using the new location information from access device 216, one or more of the network devices 202, 204, 206, 208, and 210 may continuously or periodically receive the location information to determine or update their respective locations. In some embodiments, because the access device 216 is located indoors between points C and D, GPS and/or cellular signals that are available from GPS and cellular location data sources may not be accurately received by the access device 216 (e.g., due to reflections or deflections of the signals off of structures or objects within the venue 200). As a result, the network devices 202, 204, 206, 208, 210 may not receive accurate location information from the access device 216 when located between points C and D.

In such embodiments, one or more sensors within the access device 216 may be used to determine where the access device 216 has traveled relative to the last point (point B) at which the access device 216 was outdoors, which was accurately determined using the GPS, cellular, or WiFi™ location data sources, or a combination thereof, as described above. In some examples, the sensors may be used to perform dead reckoning in order to determine a new position of the access device 216 based on one or more previous positions. For example, as the access device 216 moves among different points between points C and D, the access device 216 may calculate its position by using each previously determined position and advancing that position based upon measurements from the one or more sensors over time. Because the access device 216 was outdoors at point B, the location of point B can be accurately determined using GPS or cellular location data sources. As a result, the access device 216 can start the dead reckoning calculation using point B as an accurate reference point. Using point B as a reference point, the access device 216 may use the one or more sensors to determine its location at each point along the path from points B to C, and from points C to D. In some embodiments, the sensors may include an accelerometer, a gyroscope, magnetometer, a compass, and/or any other appropriate sensor device. For example, as the user moves the access device 216 from point B to point C, the accelerometer may be used to determine the distance traveled and the compass may be used to determine the direction in which the access device 216 is moved.

The access device 216 may transmit the updated location information to any of the network devices 202, 204, 206, 208, or 210 continuously, periodically at set intervals of time (e.g., every 0.5 seconds, 1 second, 2 seconds, or any other appropriate time), or on demand when queried by a network device 202, 204, 206, 208, or 210. The network devices 202, 204, 206, 208, or 210 may then use the updated location information, as described above, to update their location information.

The location determinations of each network device 202, 204, 206, 208, or 210 may become more accurate over time as more location data points become available. For example, as the access device 216 moves to different outdoor positions, new location information may be gathered from location data sources, such as GPS and cellular location data sources. As another example, new location information determined using the sensor may be received from the access device 216 as it moves throughout the venue 200. The network devices 202, 204, 206, 208, or 210 may update their location as more location data points are gathered. The network devices 202, 204, 206, 208, or 210 may be of the type that stay in a same position for long periods of time, leading to even more accurate location determinations due to the stationary nature of the devices. For example, the device may include a home automation switch that a user couples with a home appliance. In another example, the device may include a smart automation device integrated with a garage door opener, enabling learning of when and how often the garage door opens and closes.

In some embodiments, locations of other fixed wireless devices outside the envelope of a venue (e.g., venue 200) may be used to further strengthen the location determination (e.g., using triangulation, trilateration, or other location determination technique) of any device within the venue. Furthermore, the locations of these other fixed wireless devices can also be strengthened by allowing users to adjust their placement on maps (e.g., using map graphical interface), looking them up in municipal or other location databases, triangulating them from mobile devices, or the like. In some embodiments, a device may triangulate using signals from the same devices over multiple frequencies or protocols, which allows additional data to improve accuracy.

In some embodiments, other sources of location information may be available to determine device locations or to supplement previously determined devices locations. In one example, a network device may obtain location information while performing a site survey of gateways in or around the venue 200. A network device may perform a site survey during a configuration process upon being turned on for the first time or being reset in order to identify a network to join. For example, the network device 202 may perform a site survey to determine the existence of the gateway 212 and any other gateway that may be in proximity to the venue 200. The network device 202 may receive identification information from the gateway 212, for example, and may transmit the identification information of the gateway 212 to a network server (e.g., a cloud network server). A database may be maintained by the network and may include location information of various gateways that are located throughout a region. For example, the location information may include an address, GPS coordinates, a longitude-latitude position, or the like. The server may access the database to retrieve location information that identifies the location of the gateway 212. The gateway 212 may be identified by a service set identification (SSID) of its network, by the gateway's 212 media access control (MAC) address, and/or any other identifier of the gateway 212. The network device 202 may then receive the location information associated with the gateway 212, and may determine its location using the location information. In some embodiments, the location of the gateway 212 determined using the site survey may be an approximate location within the venue 200, and may not be accurate to a particular geographical coordinate. The location information of the gateway 212 and any other surrounding gateways obtained as a result of the site survey may provide an estimated location for the network device 202. In some embodiments, the location information obtained from the site survey may be used to supplement or enhance a location determined using other location determination techniques described herein. In some embodiments, the site survey may be used as an approximate starting location for the network device 202, which may be refined over time using one or more other location determination techniques described herein.

In some examples, a network device may determine its location using an IP geolocation service using an IP address of a gateway (e.g., gateway 212). One of ordinary skill in the art will appreciate that any identifier may be used, such as a MAC address, radio frequency identifier (RFID), serial number, a universally unique identifier (UUID), a unique device identifier (UDID), a globally unique identifier (GUID), or other identifier. A network device may determine an IP address of a gateway, and may transmit the IP address to a network server (e.g., a cloud network server). A database may be maintained by the network and may include location information of various devices that are located throughout a region. The network server may query the database using the IP address to determine the location of the gateway. In one example, the network device 202 may determine an IP address of gateway 212. The network device 202 may transmit the IP address to the network server, which may query the database to determine the location of the gateway 212. The network device 202 may receive location information identifying the location of the gateway 212, and may then determine its location using the location information. In some embodiments, the location information obtained from the geolocation service may be used to supplement or enhance a location determined using other location determination techniques described herein. In some embodiments, the geolocation service may be used as an approximate starting location for the network device 202, which may be refined over time using one or more other location determination techniques described herein.

In some embodiments, one or more motion sensors or cameras (not shown) located in the venue 200 may be used to determine a location of a device. For example, a camera with a trapezoidal lens may be able to capture images of a large portion of the venue. The camera may process the images itself, or may transmit the images to one or more other devices on the network for processing (e.g., network devices 202, 204, 206, 208, 210, access device 216, gateway 212, or any other device capable of performing image analysis). The camera or other device(s) may process the images in order to determine where different devices are located throughout the venue. In some cases, the location information obtained from the captured images may be used to supplement or enhance a location determined using other location determination techniques described herein. In some cases, the location determined using the captured images may be used as an approximate starting location for a device (e.g., network device 202), which may be refined over time using one or more other location determination techniques described herein.

In some embodiments, a location determined using one or more of the location determination techniques described above may be verified or corrected using information obtained from one or more location data sources. For example, an IP address location can be verified when GPS location information becomes available from another device, such as access device 216.

In some embodiments, a network device, an access device, or other device may determine a layout of the venue 200. For example, one or more sensors within the access device 216, such as the sensors described above (e.g., a gyroscope, magnetometer, a compass, and/or the like), may be used to perform dead reckoning in order to track the movement of the access device 216 over time. In some cases, the access device 216 may gather the sensor data for analysis. In some cases, the access device 216 may send the sensor data to a network device 202, 204, 206, 208, or 210 for analysis. After a period of time (e.g., a day, a week, a month, or any other period of time), the access device 216 or a network device 202, 204, 206, 208, 210 may gather enough sensor data to determine where it is possible for a user to move within and outside of the venue 200, and may develop a layout or floor plan of the venue. For example, as user moves the access device 216 around the venue 200 over time, the access device 216 and/or network device 202, 204, 206, 208, or 210 may detect a pattern in which the user does not enter certain portions of the venue 200. The access device 216 and/or network device 202, 204, 206, 208, or 210 may determine that these portions of the venue 200 are inaccessible to the user, and may start to develop a layout of the venue 200 accordingly. For example, the access device 216 and/or network device 202, 204, 206, 208, or 210 may determine that the inaccessible areas are walls, and may generate the layout to include a floor plan with different rooms separated by the walls.

In some embodiments, an address or other location information associated with the venue 200 may be used to associate the layout at the venue's 200 physical location. For example, a user may input the address at which the venue 200 is located. As another example, one or more location data sources described above may be used by the access device 216 or a network device 202, 204, 206, 208, or 210 to determine the location of the venue 200. In such embodiments, a graphical interface may be displayed to a user depicting the venue 200 with its layout. The graphical interface may display the venue 200 overlaid on a map using, for example, a commercially available map application or program. The graphical interface may further display the various devices that are present within the venue 200 at their determined locations. In some embodiments, the graphical interface may allow a user to indicate an approximate location of a device within the venue 200, described in more detail with respect to FIG. 6.

Figure 6:
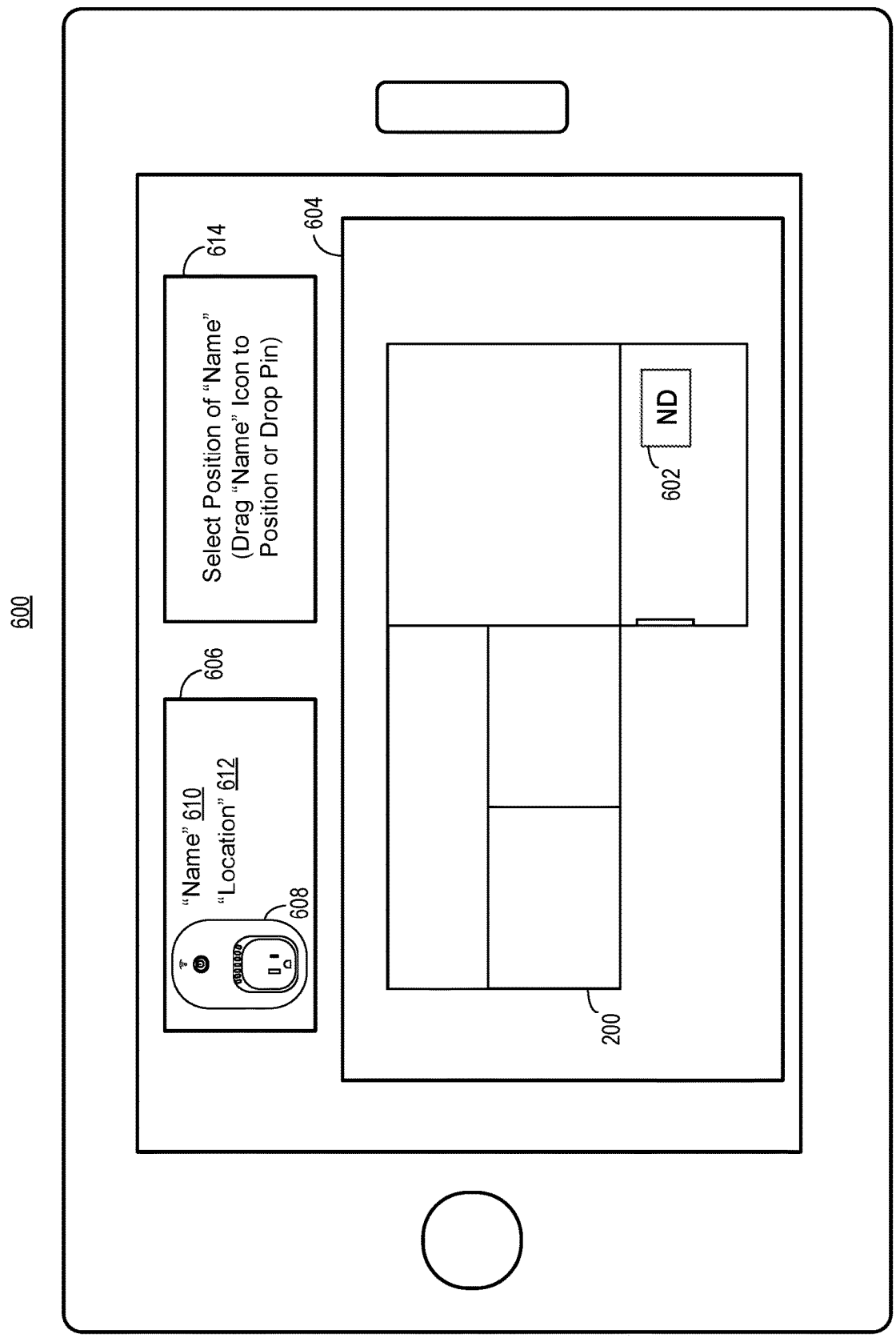
FIG. 6 is an illustration of an example of a graphical interface displayed on a computing device, in accordance with some embodiments.

FIG. 6 illustrates an example of a graphical interface 600 displayed on a computing device. The computing device may include, for example, an access device, a network device, or any other device capable of displaying a graphical interface. The graphical interface 600 may allow a user to indicate an approximate location of one or more devices within a venue, such as the venue 200. For example, the graphical interface 600 may include or may use a commercially available map application or program, such as Google Maps™, Mapquest™, or the like.

The venue 200 may be overlaid in section 604 of the graphical interface 600. For example, the venue 200 may be overlaid on a map. The venue 200 may be displayed with a layout so that different rooms or other partitions of the venue 200 are displayed. The layout may be determined using the techniques described above, such as using a sensor (e.g., accelerometer, gyroscope, or the like) within an access device. The graphical interface may further display icons of the various devices that are present within the venue 200, such as icon 602 of a network device. In some embodiments, a device may be displayed at a random location until a specific or approximate location is determined for the device, such as using the previously described techniques. In some embodiments, if a location has been determined for a device using, for example, the previously described techniques, the device may be displayed at that location. In such embodiments, the user-indicated location may be used to supplement or replace the previously determined location. While only a single device icon 602 is displayed in the graphical interface 600, one of ordinary skill in the art will appreciate that any number of devices that are located within the venue 200 may be displayed, such as one or more of the network devices 202, 204, 206, 208, 210, the access device 216, or the gateway 212. For example, all devices within the venue 200 may be displayed in the graphical interface 600. In another example, devices may only be displayed when they are first powered on or reset so that an approximate location may be established for the newly powered or reset devices.

The graphical interface 600 may prompt a user in section 614 to select or otherwise indicate an approximate location of a device in the venue. The prompt may be displayed as section 614. In some embodiments, the graphical interface 600 may prompt the user to indicate the location of a device upon an icon of the device being displayed. For example, the icon of a device may be displayed when the device is powered on or reset. In some embodiments, the prompt may be displayed in response to a user selecting an icon of a device. For example, any of the network devices 202, 204, 206, 208, 210 may be displayed in the graphical interface 600, and a user may select an icon of network device 202 (e.g., icon 602). In response to the user selecting the icon of network device 202, the graphical interface 600 may prompt the user to identify the location of the network device 202. One of ordinary skill in the art will appreciate that other events may cause the prompt to be displayed to the user.

The prompt displayed in section 614 may provide a description to the user explaining how to identify a location of a device. In some cases, the user may perform a drag-and-drop operation to identify the location of the device. For example, the user may drag an icon of a network device to the position at which the device is located. In some cases, the user may perform a pin-drop operation. For example, the user may drop a pin at the position at which the device is located. The user may drop the pin by performing various operations, such as by touching or otherwise selecting a portion of the displayed graphical interface for a predetermined period of time (e.g., 0.5 seconds, 1 second, or any appropriate period of time), double clicking the portion of the graphical interface, touching or otherwise selecting the portion of the graphical interface with two or more fingers, or the like. In some embodiments, in the event a map application or program is used, the available operations that may be performed by the user may be dependent on the map application or program. One of ordinary skill in the art will appreciate that any other appropriate operations may be performed by the user to identify the location of a device.

The graphical interface 600 may display in section 606 a picture 608 of a displayed device, a name 610 of the displayed device, and a location 612 of the displayed device. For example, the network device identified by icon 602 may be a home automation switch. A user may select picture 608 from a predefined list of pictures to accurately depict the network device identified by icon 602. The user may name the network device so that it is readily identifiable to perform a particular function, such as "home automation switch." The location 612 may be displayed as a specific portion or room of the venue 200 (e.g., kitchen, bedroom, bathroom, master bedroom, loft, office, file room, print room, or the like), as a GPS coordinate, as a latitude-longitude position, or the like.

In some embodiments, the picture 608 and/or name 610 may be used to determine or estimate a location of a device. For example, the picture 608 and/or name 610 may provide details on the type of device. The name 610, for example, may include "slow cooker," implying that the device is located in a kitchen. The picture 608 may further include a picture of slow cooker, further implying that the device is located in a kitchen. In some embodiments, the computing device on which the graphical interface 600 operates may determine a location of a device using the picture 608 and/or name 610. In some embodiments, the computing device may transmit the information relating to the picture 608 and/or name 610 to a server of an external network (e.g., network 114) or another device on a local network (e.g., network 100, the network of venue 200, or the like), and the server or other device may determine or estimate the location using the information.

In some embodiments, once the computing device operating the graphical interface 600 has received an input by a user indicating the location or position of a device, the computing device may transmit the information to another device on the local network (e.g., network device, router, or the like) or to a network server (e.g., a server in network 114 or 214). For example, the computing device operating the graphical interface 600 may include the access device 216. The access device 216, via graphical interface 600, may receive the input corresponding to the selection of a position of a network device (e.g., network device 202, 204, 206, 208, or 210), and may transmit the position information to the network device. The network device may then determine its location using the position information.

In some embodiments, the position or location indicated by a user operating the graphical interface 600 may be used as the approximate location for a device. For example, a network device may receive the position information from access device 216, and may accept the position as its location. In some embodiments, the location indicated by the user may be used by a device as a starting point for determining a location of the device. For example, the location indicated by the user may be used by a network device as another data point, in addition to other data points obtained by the network device, to determine its location. In the latter example, the location indicated by the user may be used to supplement a location determined using GPS or latitude-longitude location information received from an access device, a location determined using triangulation or trilateration, a location determined based on a site survey, a location determined using a geolocation service, or any of the other techniques described herein.

In some embodiments, the desired accuracy of the location indicated by the user via graphical interface 600 may be on a room-by-room basis. For example, the graphical interface 600 may prompt the user to identify a room in which a device is located. In such embodiments, other location determination techniques, such as those described above, may be used to further refine the exact location of a device in the event a more accurate location is desired. In some embodiments, a user may identify a more specific location for a device, such as a particular corner or side of a room.

Using the above-described techniques, a device may be configured to learn its location over time, gauge confidence in that location, and engage a user to help in fixing that location with reasonable accuracy, increasing confidence further.

Once a location is determined for the one or more devices in a venue using any of the techniques described with respect to FIGS. 2-6, for example, the location may be used to perform various location-related functions. In one example, once network device 202 determines a sufficiently accurate location for itself (e.g., down to a specific room, such as a bathroom, kitchen, print room, or the like, or down to a specific portion of a room, or the like), the network device may recognize that an access device is located within a certain proximity from the network device, and, in response, may perform a function that is appropriate for its specific location. Various functions may be performed. For example, a network device may cause a light to be switched on or off when it determines that an access device has come within a particular distance from the network device. In another example, a network device may cause a water faucet to be turned on or off in response to determining that an access device has entered within a predetermined distance to a faucet. In another example, a network device may cause a garage door to open or close. In yet another example, a network device may cause one or more sprinklers to turn on or off. One of ordinary skill in the art will appreciate that any number of functions may be performed in response to determining the proximity of two devices to one another. Each of these functions may be performed without the use of motion sensors or other motion-related devices.

In some embodiments, a device may store location information corresponding to its determined location. For example, rather than simply determining and transmitting its location information to a server, a device may store its location information so that it can be used by other devices for location determination. For example, the network device 202 may store global positioning system (GPS) coordinates, a latitude-longitude position, or other appropriate location information, of the network device 202. In some embodiments, a network device may share its stored location information so that other devices can use the location information to determine their own locations. For example, the network device may broadcast its location information in a beacon frame, or in some other communication, that can broadcast the network device's location information to one or more other devices within or outside of the network device's network. As another example, the network device may transmit its location information (e.g., in a beacon frame or other appropriate communication) to a specific device that requests location information.

Figure 7:
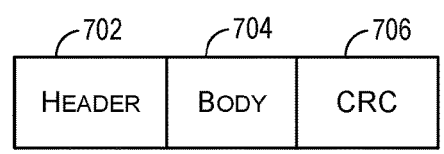
FIG. 7 is an illustration of an example of a communication frame, in accordance with some embodiments.

FIG. 7 illustrates one example of a communication frame 700 including location information that may be transmitted by a device to one or more other devices. In some embodiments, the communication frame 700 may include a beacon frame, a probe response frame, or any other appropriate communication frame. In some cases, the communication frame 700 includes a communication frame defined in any of the 802.11 family of standards. The communication frame 700 may be transmitted by one or more devices, such as the network devices or access devices within network 100 or within a network associated with one or more venues (e.g., venue 200). For example, the communication frame 700 may be transmitted by one or more of the network devices 202, 204, 206, 208, 210 in order to share their location information. In some embodiments, the one or more devices may transmit their location information along with a unique identifier of each device. For example, a unique identifier may include a MAC address, a universally unique identifier (UUID), a unique device identifier (UDID), a globally unique identifier (GUID), a RFID, a serial number, or any other identifier that is unique to each device. In some embodiments, the communication frame 700 may be transmitted from a device to a gateway, such as gateways 110, 112, or 212. The gateway may then route and transmit the communication frame 700 to an intended destination device via a local area network (network 100, network 200, or the like) and/or via an external network (e.g., cloud network 114, external network 214, or the like). In some embodiments, the one or more devices may transmit the communication frame 700 directly to a destination device using, for example, a Bluetooth™ communication, a Zigbee™ communication, a UWB communication, a WiFi-Direct communication, a BLE communication, a cellular, another broadband communication, or some other communication using an appropriate communication protocol. In embodiments, the one or more devices may transmit the communication frame 700 to one or more nodes of a mesh network, and one or more of the nodes may transmit the communication frame 700 along a determined route until it reaches the destination device.

The communication frame 700 includes a header field 702, a body 704, and a cyclic redundancy check (CRC) field. In some embodiments, the header field 702 includes a frame control field, a duration field, one or more addresses (e.g., source and destination MAC addresses), a basic service set identification (BSSID) field, a sequence control field, or the like. The CRC field provides error detection capability.

Figure 8:
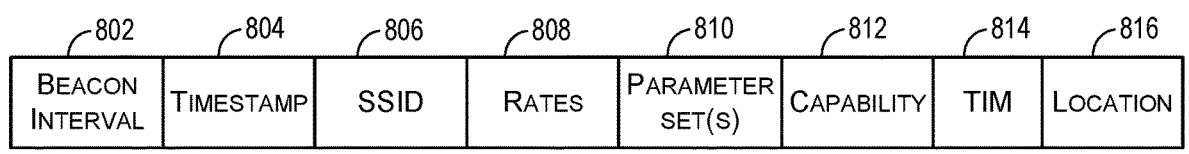
FIG. 8 is an illustration of an example of a body of a communication frame, in accordance with some embodiments.

FIG. 8 illustrates an example of a body 704 of the communication frame 700. The body 704 may include a beacon interval field 802, a timestamp field 804, one or more service set identification (SSID) fields 806, a rates field 808 indicating supported rates, a parameter set field 810, a capability field 812, a traffic indication map (TIM) field 814, and a location field 816. The beacon interval field 802 may indicate the amount of time between communication frame 700 transmissions, which may allow devices that enter a low power mode to know when to wake up to receive the communication frame 700. The timestamp field 804 may be used by a device after it receives the communication frame 700 to update its local clock, enabling synchronization among multiple devices that are associated with the device transmitting the communication frame 700. The SSID field 806 identifies a specific network, such as the local area network for which the transmitter of the communication frame 700 is a part. The rates field 808 indicates the rates that the network supports, so that a receiving device knows the transmission rates to use. The parameter set(s) field 810 may include information describing specific signaling methods (e.g., spread spectrum, direct sequence spread spectrum, or the like), a channel number that a gateway or other device on the network is using, or the like. The capability field 812 includes capability information indicating requirements of devices to connect the network that the beacon represents. The TIM field 814 includes information identifying devices that have data frames stored or buffered in a device, such as a gateway.

The body 704 further includes a location field 816 that includes location information identifying a location determined by a device. The location information may include GPS coordinates, a latitude-longitude position, or the like. For example, as described above with respect to FIGS. 2-6, a device that may not have access to location data sources may determine its location using location information and/or signals received from one or more other devices. A device may then broadcast or directly send to specific devices its location using the communication frame 400 or any other appropriate communication mechanism. For example, a device may broadcast or directly send the communication frame 400 to multiple devices in and around the device's home network. One or more of the multiple devices may be able to use the device's location in order to determine their own locations using one or more of the techniques described above.

In some embodiments, the communication frame 700 also includes a unique identifier field (not shown) that includes a unique identifier. The unique identifier field may include a unique identifier (e.g., a MAC address, a UUID, a RFID, a serial number, or the like) of the network device sending the communication frame 700. The unique identifier field may be included in the header 702 (e.g., in a source address field, or other field) or may be included in the body 704.

A network of devices, such as various network devices, may determine an accurate location for themselves using the above-described techniques, and may make the locations available for use by other devices (e.g., by transmitting communication frame 700). The network of devices that can store and share location information determined using the above-described techniques may be referred to herein as a crowd sourced location data source. Accordingly, the network of devices with each device storing and sharing its location information may make up a crowd sourced location data source that is usable by other devices that may not have access to one or more other location data sources. For example, the network of devices with location information that make up the crowd sourced location data source may be devices that are configured to communicate using WiFi™, Zigbee™, Bluetooth™, infrared (IR), UWB, WiFi-Direct, BLE or the like, protocols, such as network devices, but that do not have access to GPS and/or cellular location data sources. Other devices that also have WiFi™, Zigbee™, Bluetooth™, infrared (IR), UWB, WiFi-Direct, BLE or other communication capabilities, but no GPS and/or cellular capabilities, may communicate with one or more of the devices of the crowd sourced location data source to access the location information. For example, the other devices may receive communication frames with location information from one or more of the devices of the crowd sourced location data source. The other devices may access the location information using the WiFi™, Zigbee™, Bluetooth™, infrared (IR), UWB, WiFi-Direct, BLE or other communication protocol for which the devices are configured to operate. The devices of the crowd sourced location data source may be located across different a geographical areas or regions. As a result, devices without access to certain location data sources can accurately determine their location using the location information provided by the network of devices of the crowd sourced location data source that are located in different areas.

FIG. 9 illustrates an embodiment of a process 900 of determining and storing a location of a network device. In some aspects, the process 900 may be performed by a computing device, such as a network device 102, 104, 106, 202, 204, 206, or 208 shown in FIGS. 1-5. While specific examples may be given of a network device performing the process 900, one of ordinary skill in the art will appreciate that other devices may perform the process 900.

Process 900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 900 may allow a network device to determine and/or update or supplement its location using location information and signals received from another device (e.g., an access device, other network device, a gateway, or any other device).

At 902, the process 900 includes receiving, on a network device, location information of an access device, wherein the location information includes location coordinates of the access device. For example, the location information may include global positioning coordinates of the access device's location, a latitude-longitude position of the access device, or the like. The access device has access to one or more location data sources, such as GPS and/or cellular location data sources, and can readily obtain the location information, as described above with respect to FIGS. 2-5. Using one or more of the location data sources, the access device may determine its location at one or more points (e.g., points A in FIG. 2 and/or point B in FIG. 3). The access device may then transmit to the network device the location information identifying the locations for the points.

At 904, the process 900 includes receiving, on the network device, a signal from the access device. For example, the network device may be aware of one or more locations of points of the access device, but may need to determine further information in order for the network device to determine its own location. At 906, the process 900 includes determining a location of the network device, wherein the location of the network device is determined using the location information of the access device and the signal received from the access device. For example, using the signal from the access device, the network device may determine its relative distance from the access device. The network device may use the distance information along with the location information to determine its own location, as described with respect to FIGS. 2-5.

At 908, the process 900 includes storing, on the network device, the location of the network device. For example, the network device may store its location information so that it can be used by other devices for location determination.

In some embodiments, the process 900 may include transmitting the location of the network information. For example, the stored location information may be transmitted so that other devices can use the location information to determine their own locations. For example, the location of the network device is transmitted in a beacon. The beacon may include a service set identification associated with the network device. One of ordinary skill will appreciate that other frames other than a beacon frame may be used to transmit the location information. For example, the network device may broadcast its location information in another communication frame that can broadcast the network device's location information to one or more other devices within or outside of the network device's network.

In some embodiments, the process 900 may include receiving a signal from an additional network device, determining a signal strength of the signal received from the additional network device, and determining the location of the network device using the signal strength of the signal received from the additional network device. For example, as described above with respect to FIGS. 2-5, the network device may determine its relative distance to one or more other network devices to determine its own location. In one example, the network device may determine a relative geometry of its position relative to the additional network device by determining its distance from the additional network device, for example, based on the signal strength, the round-trip time (RTT), a combination thereof, or other measurement of signal received from the additional network device.

In some embodiments, the process 900 may include determining a signal strength of the signal received from the access device, receiving signal strengths of other signals received by other network devices from the access device, performing triangulation using the signal strength of the signal and the signal strengths of the other signals, and determining the location of the network device using a result of the triangulation.

In some embodiments, the process 900 may include performing triangulation using the location coordinates of the access device, and determining the location of the network device using a result of the triangulation.

As described above with respect to FIGS. 2-5, other sources of location information may be available to determine device locations or to supplement previously determined devices locations. For example, in some embodiments, the process 900 may include receiving updated location information of the access device, wherein the updated location information of the access device is updated over time using sensor information of the access device, as described previously. The process 900 may include determining an updated location of the network device, wherein the updated location of the network device is determined using the updated location information. In some embodiments, the process 900 may include determining a layout of a venue in which the network device is located, wherein the layout is estimated using the updated location information.

In some embodiments, the process 900 may include performing a site survey to determine an existence of one or more gateways. For example, the site survey may be performed during a configuration process of the network device. The process 900 may further include receiving identification information of the one or more gateways and transmitting the identification information of the one or more gateways. For example, the network device may receive the identification information from the one or more gateways, and may transmit the identification information to a server. The process 900 may further include receiving location information associated with the one or more gateways, and determining the location of the network device using the location information associated with the one or more gateways. The location information associated with the one or more gateways may be received from the server. As described above, the location information of the one or more gateways obtained as a result of the site survey may provide an estimated location for the network device.

In some embodiments, the process 900 may include determining an internet protocol address of a gateway, and determining the location of the network device using the internet protocol address of the gateway. The location may be determined using an IP geolocation service, as described above.

In some embodiments, the process 900 may include receiving global positioning system location information, and validating the location of the network device using the global positioning system location information. For example, as described above, a location determined using one or more of the location determination techniques described herein may be verified or corrected using information obtained from one or more location data sources. In one example, a location can be validated or verified when global positioning system location information becomes available from another device, such as an access device or gateway.

In some embodiments, the process 900 may include receiving a gateway signal from a gateway, determining a signal strength of the gateway signal, and determining the location of the network device using the signal strength of the gateway signal. For example, the network device may determine its relative distance from the gateway by performing triangulation or trilateration on the gateway signal.

Figure 10:
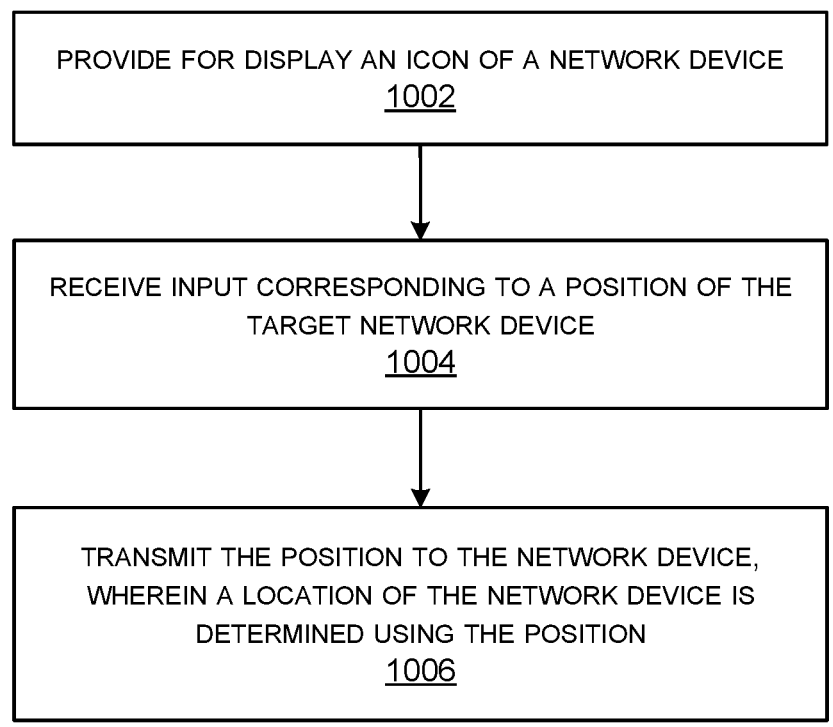
FIG. 10 is a flowchart illustrating an embodiment of a process for obtaining a position of a network device, in accordance with some embodiments.

FIG. 10 illustrates an embodiment of a process 1000 of determining and storing a location of a network device. In some aspects, the process 1000 may be performed by a computing device, such as an access device 108, 216, or 600 shown in FIGS. 1-3 and 5-6. While specific examples may be given of an access device performing the process 1000, one of ordinary skill in the art will appreciate that other devices may perform the process 1000.

Process 1000 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1002, the process 1000 includes providing for display, by a computing device, an icon of a network device. The computing device may include an access device, such as any of the access devices 108, 216, or 600 shown in FIGS. 1-3 and 5-6. For example, the icon may include the icon 602 illustrated in FIG. 6. At 1004, the process 1000 includes receiving input corresponding to a position of the network device. In some embodiments, the input corresponding to the position of the network device includes a drag-and-drop operation. The drag-and-drop operation may include dragging the icon of the network device to the position. In some embodiments, the input corresponding to the position of the network device includes a pin-drop operation. The pin-drop operation may include dropping a pin at the position.

At 1006, the process 1000 includes transmitting the position to the network device, wherein a location of the network device is determined using the position. In some embodiments, the position is used to update the location of the network device.

In some embodiments, the process 1000 includes providing for display a map of a venue in which the network device is located. The icon of the network device may be provided for display by overlaying the icon on the map. Using FIG. 6 as an example, the venue 200 may be overlaid in section 604 of the graphical interface 600.

In some embodiments, the process 1000 includes providing for display a layout of the venue in which the network device is located, wherein the layout of the venue is provided for display by overlaying the layout on the map. Using FIG. 6 as an example, the venue 200 may be displayed with a layout so that different rooms or other partitions of the venue 200 are displayed. The layout may be determined using the techniques described above, such as using a sensor within an access device.

Techniques are also described herein for determining a location of a device or object using a crowd sourced location data source. For example, as described in further detail with respect to FIGS. 11-15, once a sufficient number of devices with location information are present in one or more geographic areas such that a crowd sourced location data source is formed, a device may locate itself or locate another device by accessing or otherwise utilizing the location information from one or more of the devices in the crowd sourced location data source. In some embodiments, the network of devices of the crowd sourced location data source may make up a mesh network in which each device is a node of the mesh network, and each node may transmit a communication to another node along a determined route until the communication reaches a destination device. The devices that make up the crowd sourced location data source may be referred to herein as a location device. A location device may include a client device, such as a network device (e.g., network device 102, 104, 106, 202, 204, 206, 208, or 210), an access device (e.g., access device 108 or 216), or the like. In some examples, a user that wishes to find a misplaced object may request the services of a network of location devices from the crowd sourced location data source to locate the object. The object may be unable to communicate directly with a client device of the user. For example, the object may be located at a distance far enough away from a client device of the user such that the object may not be able to communicate with the client device. The object may also be unable to determine its own location and/or may be unable to transmit its location to the client device of the user from the remote location. For example, the object may include a communication device that is only able to communicate with devices that are within a certain distance from the communication device, and that is unable to communicate using long-range communication technologies. Accordingly, the network of location devices that are part of the crowd sourced location data source may be used to locate the object. The network of location devices may also be used to communicate the location of the object back to the client device of the user. The network of location devices and the client device of the user may be in communication with a network server that can receive locations of the object from the location devices and that can report the location of the object to the client device of the user.

Figure 11:
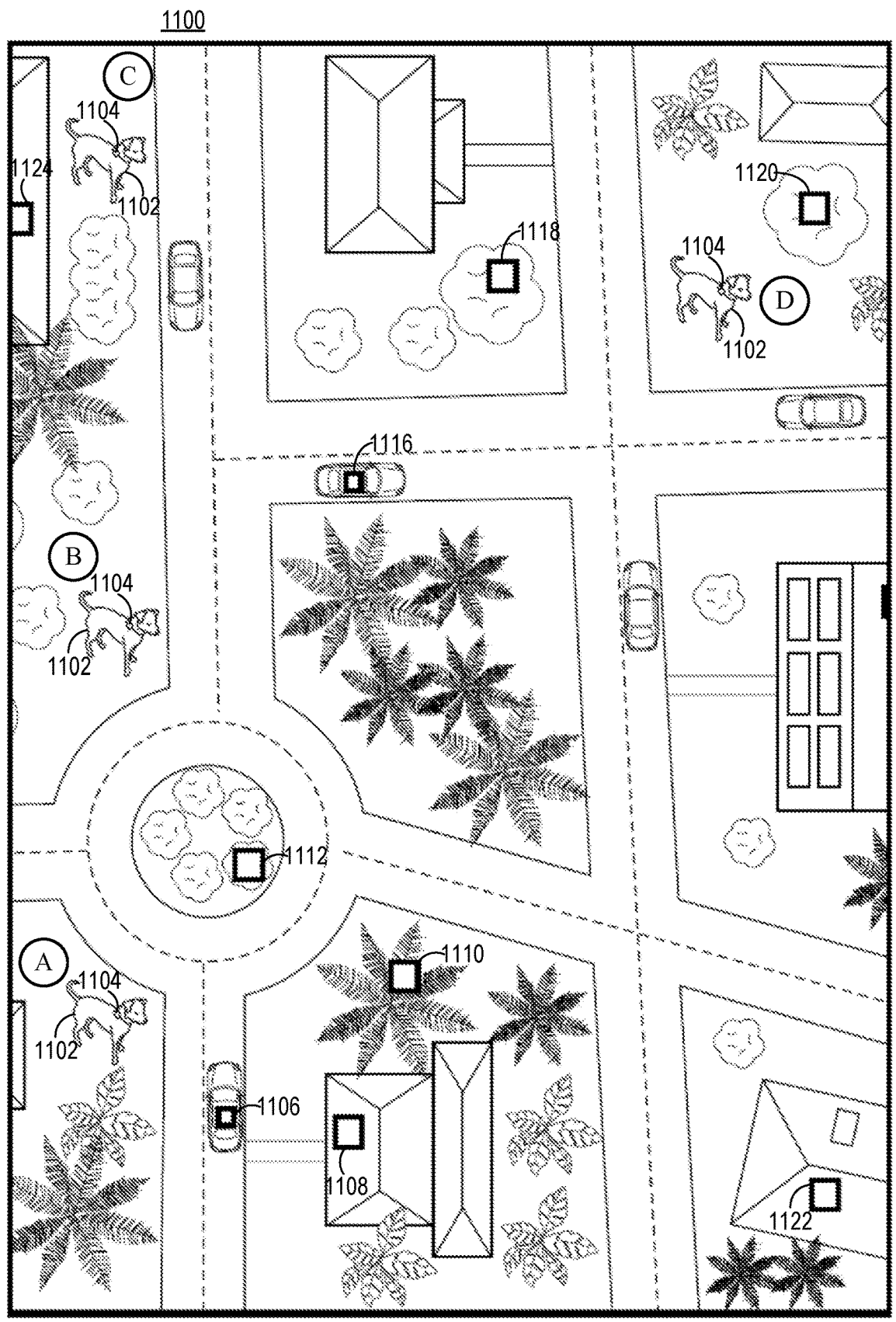
FIG. 11 is an illustration of an example of an outdoor venue, in accordance with some embodiments.

FIG. 11 illustrates an example of an outdoor venue 1100 in which a device may be located. The venue 1100 may include a neighborhood, a park, a university campus, or any other outdoor environment. While the venue 1100 is illustrated as an outdoor environment, one of ordinary skill in the art will appreciate that the same principles described herein may apply to an indoor environment. A network of location devices 1106, 1108, 1110, 1112, 1116, 1118, 1120, 1122, and 1124 is located throughout the venue 1100. The location devices 1106, 1108, 1110, 1112, 1116, 1118, 1120, 1122, and 1124 may make up or may be part of a crowd sourced location data source, and may be positioned at various locations within the venue 1100. For example, location device 1108 is located in a building, location device 1106 is located in a car, and location device 1112 is located in a bush.

Each of the location devices 1106, 1108, 1110, 1112, 1116, 1118, 1120, 1122, and 1124 stores location information determined using any of the techniques described above with respect to FIGS. 2-10. The location devices 1106, 1108, 1110, 1112, 1116, 1118, 1120, 1122, and 1124 may be configured to share the location information with other devices that come within communication range of the location devices 1106, 1108, 1110, 1112, 1116, 1118, 1120, 1122, and 1124. For example, the location device 1106, 1108, 1110, 1112, 1116, 1118, 1120, 1122, or 1124 may transmit a communication frame (e.g., communication frame 700) that includes location information identifying a position of the location device 1106, 1108, 1110, 1112, 1116, 1118, 1120, 1122, or 1124 to one or more other devices. Any of the location devices 1106, 1108, 1110, 1112, 1116, 1118, 1120, 1122, and 1124 may include a client device. For example, any of the location devices 1106, 1108, 1110, 1112, 1116, 1118, 1120, 1122, and 1124 may include a network device, similar to any of the network devices 102, 104, 106, 202, 204, 206, 208, 210 described above. As another example, any of the location devices 1106, 1108, 1110, 1112, 1116, 1118, 1120, 1122, and 1124 may include an access device, similar to any of the access devices 108 or 216 described above. The location devices 1106, 1108, 1110, 1112, 1116, 1118, 1120, 1122, and 1124 can be used to perform various functions. For example, the location device 1108 may include an IoT device that allows a user to locally or remotely access, control, and/or configure various objects. The IoT device may not include a cellular transceiver radio. In one example, the location device 1112 may include an automation device that controls a sprinkler system. As yet another example, the location device 1106 may include an access device that allows a user to connect to a local area network, a cellular network, another broadband network, and one or more wide area networks.

In some examples, a user located remotely from the venue 1100 may have misplaced an object. The user may make a location request to locate the object. For example, the user may have misplaced the dog 1102, and may make a location request using a client device in order to locate the dog 1102. The client device of the user may include an access device, which may be similar to any of the access devices 108 or 216 described above. In some examples, an application, a proprietary program, a web browser, or any other program executed and operated by the client device may allow the user to make the location request. The user may be registered with a location service that is operated using an external network, such as the Internet, a cloud network, a cellular network, another broadband network, or any wide area network. For example, the external network may include the network 114, the network 214, or another network. The application, a proprietary program, a web browser, or other program executed and operated by the client device may allow the user to interface with the location service. In some embodiments, the location devices 1106, 1108, 1110, 1112, 1116, 1118, 1120, 1122, and 1124 may include an application or other program associated with the location service that allows the devices to perform the location functionality described herein.

The request may be transmitted by the user's client device to a network server. The network server may be included in the external network with which the user is registered. For example, the network server may be part of the network 114 or the network 214. Once the network server receives the request, the network server may identify one or more location devices of the crowd sourced location data source in which to send the request. In some embodiments, the network server may identify one or more location devices based on a geographical area or region. In some examples, when making the request, the user may identify a geographical region in which the user believes the dog 1102 may be located. For example, the user may limit the search to a specific town or region. The geographical region may be included in the request. In some embodiments, the search may be expanded in the event the dog 1102 is not found within the specified geographical region. For example, the search for the dog 1102 may be performed using a ripple technique, in which the server starts the search with location devices within a specified geographical area, and then incrementally expands the geographical area to search additional location devices as needed. In some examples, the network server may determine a location in which the client device of the user is located, and may limit or begin the search in a geographical area corresponding to the location of the user's client device. For example, the network server may begin the search in a geographical region that corresponds to a zip code in which the user's client device is located. In such examples, the network may use the ripple technique in the event the dog 1102 is not located within the zip code.

A communication or tracking device may be part of or integrated with the object to allow the object to be located. The communication or tracking device may include a network device, such as any of the network devices 102, 104, 106, 202, 204, 206, 208, 210 described above. For example, the device 1104 may be a communication or tracking device that is attached to a collar of the dog 1102, and may be used to locate the dog 1102 as it moves from points A to D illustrated in FIG. 11. In some embodiments, the devices 1104 may include an application or other program associated with the location service that allows the device 1104 to perform the location functionality described herein. The device 1104 may include one or more transceiver radios that can communicate using relatively short range communication protocols, such as a WiFi™, Bluetooth™, Zigbee™, IR, UWB, WiFi-Direct, BLE, and/or other appropriate transceiver radios. The device 1104, however, may not include long range communication capabilities. For example, the device 1104 may not include a cellular transceiver radio. Accordingly, the device 1104 may be unable to directly communicate with the user's client device due to the distance between the device 1104 and the user's client device. In some embodiments, the device 1104 also may not be able to communicate with the network server. For example, the device 1104 may be out of range of or may not have permission to access a WiFi™ network. In another example, the device 1104 may not have the communication capabilities to communicate with the network server. For example, the device 1104 may include only a Bluetooth™ transceiver radio, a Zigbee™ transceiver radio, an IR transceiver radio, a UWB transceiver radio, a WiFi-Direct transceiver radio, and/or a BLE transceiver radio. Thus, the device 1104 may rely on communication with the location devices 1106, 1108, 1110, 1112, 1116, 1118, 1120, 1122, and 1124 in order to determine its location and communicate its location back to the user's client device via the network server.

The request may include a unique identifier of the device that is attached to or integrated with the object that is to be located. The identifier may include a MAC address, a universally unique identifier (UUID), a unique device identifier (UDID), a globally unique identifier (GUID), a RFID, a serial number, or any other unique identifier of the device. The characters of the unique identifier may include letters and/or numbers. In one example, the device 1104 may be associated with a unique identifier. The unique identifier may be stored in the external network in which the network server is located and with which the user may be registered. Devices may register with the network and may be issued a unique identifier by the external network. An example of the registration process is described below with respect to FIG. 16. The external network may store a unique identifier for each of the registered devices so that communications can be directed to a device by referencing the device's unique identifier. For example, a communication, such as a location request, may include the unique identifier of a device in order to identify the device as the intended subject or recipient of the communication. In one example, the request from the user to locate the dog 1104 may include the identifier of the device 1104 so that the location devices 1106, 1108, 1110, 1112, 1116, 1118, 1120, 1122, or 1124 of the crowd sourced location data source are aware of which device to locate. In some embodiments, the device 1104 may periodically transmit or broadcast a tracking signal that includes the unique identifier of the device 1104 so that location devices 1106, 1108, 1110, 1112, 1116, 1118, 1120, 1122, 1124 are aware when the device 1104 is in proximity to location devices 1106, 1108, 1110, 1112, 1116, 1118, 1120, 1122, 1124. In some embodiments, the device 1104 may only transmit or broadcast the tracking signal if it determines that it is outside of communication range with the user's client device. For example, when the device 1104 is in communication range with the user's client device, it may only transmit a tracking signal in response to a command from the client device. However, the device 1104 may detect when it is no longer within communication range with the client device, and in response may begin transmitting or broadcasting the tracking signal so that any location devices that are located within communication range from the device 1104 may receive the tracking signal.

In some embodiments, the network server may require authentication before a user can locate an object. For example, the network server may determine whether the requestor is authorized to locate the device. In some embodiments, the network server may authenticate the user by generating a signature using a key associated with the user. For example, as described in further detail with respect to FIG. 16, the client device of the user may generate a signature using a security key issued by the network server or other server. The network server may receive the signature from the client device, and may use the signature to verify that the client device is associated with the unique identifier of device 1104. For example, once the signature is received by the network server, the network server may generate a signature using a key stored at the network for the client device, and may then verify whether the signatures match. In some embodiments, to authenticate the user, the network server may receive login credentials (e.g., a user name and password) from the user that verify whether the user is authorized to locate the device 1104. For example, an account of the user may indicate that the user is associated with the unique identifier of the device 1104. Upon determining that the signatures match or that the credentials are correct, the server may authorize the user to locate the dog 1102. For example, the network server may query or inspect the user's record or profile that includes devices with which the user is associated. Further details regarding a user's record or profile are discussed with respect to FIG. 16.

Once the network server determines the location devices 1106, 1108, 1110, 1112, 1116, 1118, 1120, 1122, or 1124 that are eligible to receive the request (e.g., based on a specified or determined geographic location), the network server may transmit the user's request including the unique identifier of the device 1104 to one or more of the location devices 1106, 1108, 1110, 1112, 1116, 1118, 1120, 1122, and 1124. In some embodiments, the network server may transmit the request and the identifier of the device 1104 to one of the location devices 1106, 1108, 1110, 1112, 1116, 1118, 1120, 1122, or 1124, and then that device may transmit the request and identifier to one or more of the other location devices 1106, 1108, 1110, 1112, 1116, 1118, 1120, 1122, and 1124 individually or as a broadcast message. As a result, the network server may transmit the request to one location device, and may receive a location of the device 1104 from a different or additional location device within the geographical area of the venue 1100. In some embodiments, the network server may transmit the request as a broadcast request that is receivable by more than one of the location devices 1106, 1108, 1110, 1112, 1116, 1118, 1120, 1122, or 1124. By broadcasting the request, any of the location devices 1106, 1108, 1110, 1112, 1116, 1118, 1120, 1122, or 1124 that receive the broadcasted request may continuously or periodically (e.g., over a period of one or more seconds, minutes, or the like) search for communications from the device 1104 until a period of time has elapsed or until the location devices 1106, 1108, 1110, 1112, 1116, 1118, 1120, 1122, 1124 are prompted to quit searching (e.g., by the network server, by another location device, by a user's client device, or the like).

In some examples, the network server may transmit the user's request to locate the device 1104 and the unique identifier of device 1104 to location device 1122. In such instances, the network server may transmit the location request and identifier only to the location device 1122 (not as a broadcast message), and the location device 1122 can then retransmit the location request and identifier to any of the other location devices 1106, 1108, 1110, 1112, 1116, 1118, 1120, 1124. For example, the location device 1122 may retransmit the location request and identifier upon receiving the location request. In another example, the location device 1122 may retransmit the location request and identifier once it has determined it has received a communication from the device 1104 and/or obtained a location for the device 1104. In another example, the location device 1122 may receive a request for the location request and identifier from another location device, and may retransmit the location request and identifier upon receiving the request from the other location device. One of ordinary skill in the art will appreciate that the location device 1122 may retransmit the request to locate the device 1104 and the identifier of the device 1104 at any time after receiving the request and identifier. In some examples, the network server may transmit the request as a broadcast request to all of the location devices 1106, 1108, 1110, 1112, 1116, 1118, 1120, or 1122.

In response to receiving the request 1104, the location device 1122 may begin to look for communications that include the unique identifier of the device 1104. For example, the location device 1122 may start, from the point in time it receives the request, detecting whether any received communications include the unique identifier of the device 1104. In some embodiments, the location device 1122 may also determine whether it has recently received any communications that include the unique identifier of the device 1104. For example, the location device 1122 may determine whether it has detected any communications that include the unique identifier of the device 1104 within a certain period of time. The location device 1122 may store a record in memory (e.g., a cache, flash memory, or the like) that records unique identifiers of devices from which the location device 1122 has received communications. The record may include a time stamp indicating when the communications are received. In some embodiments, the location device 1122 may delete unique identifiers of devices that it has not received communications from within the period of time. The period of time may include minutes, hours, days, weeks, or any other appropriate period of time.

At the point in time in which the location device 1122 receives the request, the dog 1102 and the device 104 may be positioned at point A. In the embodiment illustrated in FIG. 11, the location device 1122 cannot receive communications from the device 1104 due to the distance between location device 1122 and device 1104 being too great. As a result, the location device 1122 may determine that it does not detect any current communications from the device 1104 and may also determine that it has not recently received any communications within a certain period of time (e.g., based on a record of received unique identifiers).

In the event the network server transmits the request and unique identifier of device 1104 to only location device 1122, the location device 1122 may retransmit the request and identifier to another of the location devices 1106, 1108, 1110, 1112, 1116, 1118, 1120, or 1124. For example, the location device 1122 may transmit the request and unique identifier of device 1104 to location device 1108. In some embodiments, location device 1108 may receive the request and identifier in a broadcast request, as described above. Once the request and identifier are received, the location device 1108 may begin to look for communications that include the unique identifier of the device 1104, and may also determine if the location device 1108 includes a stored record of the unique identifier of the device 1104. When located at point A, the device 1104 attached to the dog 1102 is close enough to location device 1108 that the location device 1108 can receive communications from the device 1104. For example, the location device 1108 may receive a communication, such as a tracking signal, from the device 1104. As explained above, the device 1104 may transmit or broadcast a tracking signal that includes the unique identifier of the device 1104. Once the location device 1108 and the device 1104 have exchanged communications (e.g., a tracking signal is received by location device 1108 from device 1104), the location device 1108 may obtain a location of the device 1104 at point A. The location device 1108 can obtain the location of the device 1104 in various ways. For example, as explained in more detail below, the location device 1108 may determine the location of the device 1104, the location device 1108 may transmit its location to device 1104 so device 1104 can determine its location, or the location of the location device 1108 may be used as an approximate location for device 1104.

In some examples, the location device 1108 may use information from the received communication signals to determine a location of the device 1104 using any of the techniques described above with respect to FIGS. 2-10. For example, the location device 1108 may determine a distance between it and two or more other known points (e.g., location devices 1106 and 1110) as well as a distance between it and the device 1104. As another example, the location device 1108 may determine distances between the device 1104 and other known points (e.g., location devices 1106 and 1110). As described above, the distances may be determined using a RSSI measurement, a RCPI measurement, a RTT measurement, a combination thereof, or the like. The location device 1108 may then perform triangulation or trilateration using its location, the locations devices 1106 and 1110, and the determined distances between either the location device 1108 and location devices 1106 and 1110, or the determined distances between device 1104 and location devices 1106, 1108, 1110.

In some embodiments, the location device 1108 may transmit its own location information to the device 1104 so that the device 1104 can determine its location using any of the techniques described above with respect to FIGS. 2-10. The location information may include GPS coordinates, a latitude-longitude position, or any other appropriate location designation. For example, the device 1104 may analyze signals received from location device 1108, and may determine a distance between the device 1104 and the location device 1108 based on the signals (e.g., using RSSI measurements, RCPI measurements, RTT measurements, or the like). The device 1104 may further determine distances between it and other devices with known locations (e.g., location devices 1106 and 1110) using similar techniques. The device 1104 may then perform triangulation or trilateration using the location information of location device 1108 along with the determined distances. The device 1104 may then transmit its determined location back to the location device 1108.

In some embodiments, the location of the location device 1108 may be used as the approximate location of the device 1104. In such embodiments, the location device 1108 or the device 1104 does not have to determine an exact location of the device 1104. For example, the distance between location device 1108 and device 1104 may be short enough such that using the location of location device 1108 is close enough for the dog 1102 to be found. Thus, an exact location for the dog 1102 may not be required. Because the device 1104 attached to the dog 1102 uses close range communications to communicate with the location devices 1106, 1108, 1110, 1112, 1116, 1118, 1120, 1122, or 1124, it may be assumed that the distance between the dog 1102 and a location device 1106, 1108, 1110, 1112, 1116, 1118, 1120, 1122, or 1124 is short enough such that a location of a location device can be used as an approximate location for the dog 1102. Accordingly, an estimated location of the dog 1102 using the location of location device 1108 may be sufficient due to the proximity of the device 1104 to location device 1108.

The location device 1108 can then transmit location information corresponding to the determined location of the device 1104 along with the unique identifier of the device 1104 back to the network server. The location information may include GPS coordinates, a latitude-longitude position, or any other appropriate location designation for the device 1104. The network server may store the location information in a record or profile associated with the user and/or the device 1104. For example, the network server may store the location information of the device 1104 in a record or profile associated with the user and/or the device 1104 that maps the unique identifier of the device 1104 with the location information of the device 1104. The record or profile may include the record or profile discussed with respect to FIG. 16.

Using location information of the device 1104 received from the location device 1108, the network server can respond to the user's request with a location of the dog 1102 at point A. For example, the server may send a response to the user with the location information for the dog 1102. The user may receive a prompt or notification via the application, proprietary program, web browser, or other program executed and operated by the user's client device.

Using the above described techniques, the location devices 1106, 1108, 1110, 1112, 1116, 1118, 1120, 1122, or 1124 making up the crowd sourced location data source allows the user to track the movement of the dog 1102 as the dog 1102 moves to different points A, B, C, and D throughout the venue 1100. For example, other location devices 1106, 1112, and 1110 in proximity to the device 1104 while the dog 1102 is located at point A may also detect communications from the device 1104 upon receiving the request and unique identifier of device 1104 (e.g., from the server or from another location device), and may obtain a location of device 1104 using any of the techniques described above. Further, when the dog 1102 moves to point B, the location devices 1112 and 1116 may receive communications from device 1104, and may obtain location information for the device 1104. When the dog 1102 moves to point C, the location device 1124 may receive one or more communications, and may obtain location information for the device 1104. As the dog moves through the venue 1100 to point D, the location devices 1118 and 1120 may receive communications and obtain the location information for the device 1104. As the locations for the device 1104 are obtained, the location devices 1112, 1116, 1118, 1120, and 1124 may transmit the location information along with the unique identifier of device 1104 to the network server. The network server can send an update to the user's client device each time new location information is received from one of the location devices 1106, 1108, 1110, 1112, 1116, 1118, 1120, 1122, or 1124.

In some embodiments, a location device may obtain and/or report a location of a tracking device (e.g., device 1104) without receiving a location request from the network server. For example, tracking devices that belong to a location service (e.g., that have been registered with a location service by a user) may send tracking signals with unique identifiers of the tracking devices that are detected by one or more location devices. In such embodiments, any location device that receives a tracking signal from a tracking device may obtain the tracking device's location, and may store the location and/or unique identifier of the tracking device in a record or database. The location device may transmit the location and unique identifier back to the network server. The network server may store the location information of the tracking device in the event a user requests location of the object.

Figure 12:
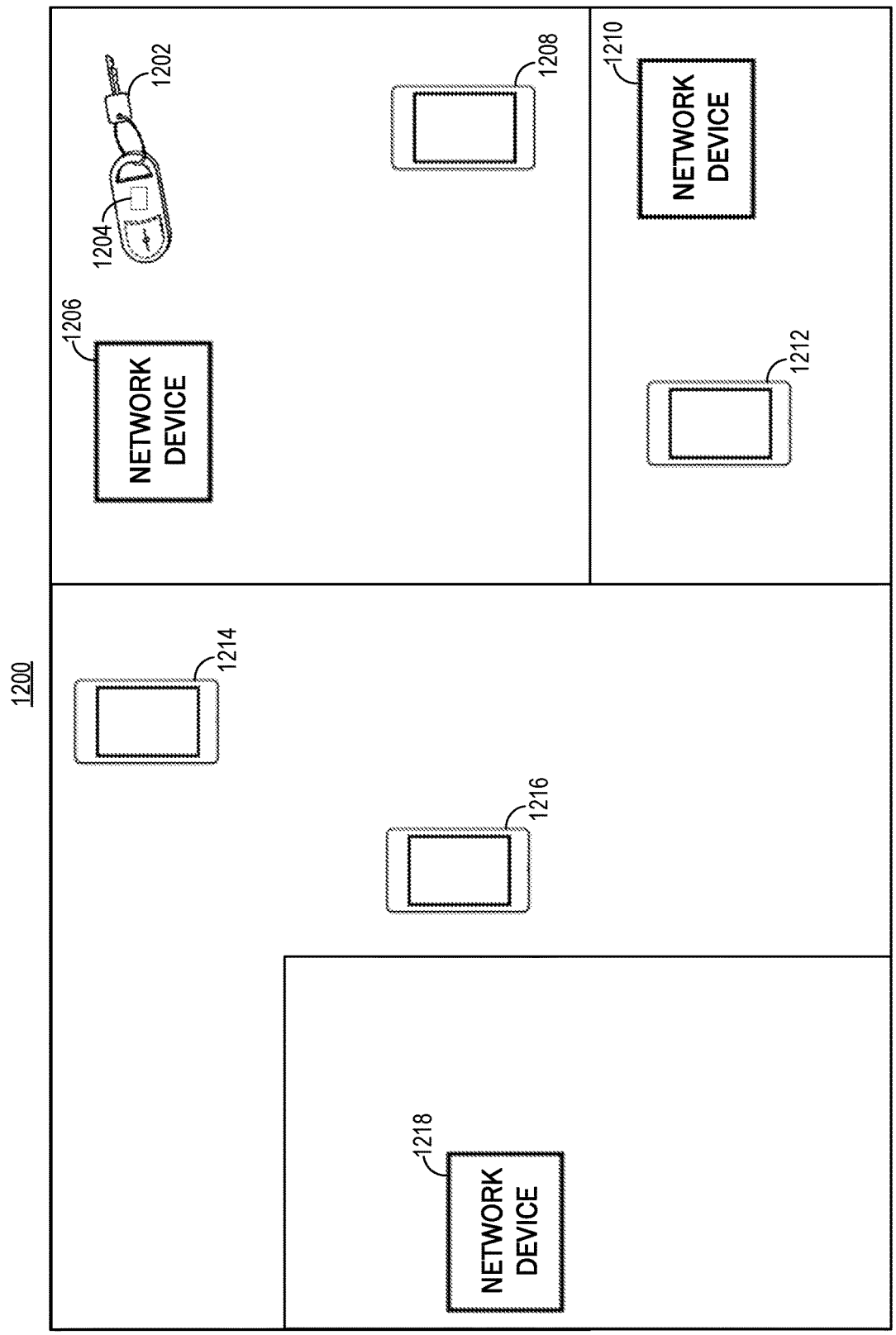
FIG. 12 is an illustration of another example of a venue, in accordance with some embodiments.

FIG. 12 illustrates an example of an indoor venue 1200 in which a device may be located. The venue 1200 may include a house, an airport terminal, a university building, or any other indoor environment. While the venue 1200 is illustrated as an indoor environment, one of ordinary skill in the art will appreciate that the same principles described herein may apply to an outdoor environment. A network of location devices 1206, 1208, 1210, 1212, 1214, 1216, and 1218 is located throughout the venue 1200. The location devices 1206, 1208, 1210, 1212, 1214, 1216, and 1218 may make up or may be part of a crowd sourced location data source, and may be positioned at various locations within the venue 1200.

Each of the location devices 1206, 1208, 1210, 1212, 1214, 1216, and 1218 stores location information. The location information may be determined using any of the techniques described above with respect to FIGS. 2-10. The location devices 1206, 1208, 1210, 1212, 1214, 1216, and 1218 may be configured to share the location information with other devices (e.g., by transmitting a communication frame, such as communication frame 700) that come within communication range of the location devices. Any of the location devices 1206, 1208, 1210, 1212, 1214, 1216, and 1218 may include a client device. For example, the location devices 1206, 1208, 1210, 1212, 1214, 1216, or 1218 may include a network device, similar to any of the network devices 102, 104, 106, 202, 204, 206, 208, 210 described above. As another example, the location devices 1206, 1208, 1210, 1212, 1214, 1216, and 1218 may include an access device, similar to any of the access devices 108 or 216 described above. Some of the location devices may be in a fixed position and some of the location devices may be mobile. In some examples, the location devices 1206, 1210, and 1218 may include network devices (similar to those described with respect to FIGS. 1 and/or 2) that are statically located in a relatively fixed position such that the devices are moved, if at all, seldomly. In one example, the network device 1206 includes an automation switch that plugs into a wall outlet. In some examples, the location devices 1208, 1212, 1214, and 1216 may include access devices (similar to those described above with respect to FIGS. 1 and/or 2) that move throughout the venue 1200. For example, the location device 1208 may include a mobile device that a user carries with them while moving throughout the venue 1200.

Similar to the example discussed with respect to FIG. 11, a user located remotely from the venue 1200 may have misplaced an object, and the user may make a location request to locate the object. The same location techniques described above with respect to FIG. 11 may be used to locate the object. For example, the user may have misplaced the key 1202, and may make a location request using a client device in order to locate the key 1202. An application, a proprietary program, a web browser, or any other program executed and operated by the client device may allow the user to make the location request. The location request may be transmitted to a server, and the server may transmit the request to one or more of the location devices 1206, 1208, 1210, 1212, 1214, 1216, or 1218. A difference between the dog 1102 and the key 1202 is that the dog 1102 is mobile, whereas the key 1202 is stable and does not move throughout the venue 1200 (unless carried or otherwise attached to a mobile object, such as a person). However, the same principles discussed with respect to FIG. 11 may be used to locate the key 1202.

A communication or tracking device 1204 that is part of or integrated with the key 1202 may periodically or continuously transmit a tracking signal to allow the object to be located. The device 1204 and tracking signal may be similar to the device 1104 and tracking signals described above with respect to FIG. 11. The location devices 1206, 1208, 1210, 1212, 1214, 1216, or 1218 that are in proximity to the device 1204 or that pass by device 1204 may detect the tracking signal. The location devices 1206, 1208, 1210, 1212, 1214, 1216, or 1218 may detect the tracking signals in response to receiving the request from the network server. The request includes a unique identifier of the device 1204, such as a MAC address, a UUID, a UDID, a GUID, a RFID, a serial number, or any other unique identifier of the device 1204.

In the embodiment illustrated in FIG. 12, the location device 1206 may be within a communication range of the device 1204, and may receive a communication from the device 1204, such as a tracking signal. Further, one or more of the location devices 1208, 1212, 1214, or 1216 may pass by the device 1204 at some point in time and may receive a communication from the device 1204, such as a tracking signal. However, the location devices 1210 and 1218 are fixed at points in the venue 1200 that are outside of the communication range of the device 1204, and thus cannot receive any communications from the device 1204. In some embodiments, as described above, each location device may store a record stored in memory (e.g., a cache, flash memory, or the like) that records unique identifiers of devices from which each location device has received communications. The record may also store a time stamp indicating when the communications are received. The location devices 1206, 1208, 1210, 1212, 1214, 1216, or 1218 may query the record to determine whether and when they received a communication from the device 1204 prior to receiving the request. For example, the location devices 1210 and 1218 may determine that the unique identifier of device 104 is not present in their records. In another example, the location devices 1208, 1212, 1214, or 1216 that move throughout the venue 1200 may have passed by the device 1204 and received one or more communications from the device 1204 at some point in time before the request to locate the key 1202 with device 1204 is received. Each of the location devices 1208, 1212, 1214, or 1216 can check to determine if the unique identifier of the device 1204 is in any of their stored records.

In response to receiving the communication from device 1204 before or after the request is received, the location devices 1206, 1208, 1212, 1214, and/or 1216 may obtain the location of the device 1204 using any of the techniques described with respect to FIGS. 2-10. For example, the location devices 1206, 1208, 1212, 1214, and/or 1216 may determine the location of the device 1204, the location devices 1206, 1208, 1212, 1214, and/or 1216 may transmit their locations to device 1204 so device 1204 can determine its location, or the location of any of the location devices 1206, 1208, 1212, 1214, and/or 1216 may be used as an approximate location for device 1204.

The location devices 1206, 1208, 1212, 1214, and/or 1216 may then transmit location information corresponding to the determined location of the device 1204 along with the unique identifier of the device 1204 back to the network server. The location information may include GPS coordinates, a latitude-longitude position, or any other appropriate location designation for the device 1204. Using location information of the device 1204 received from one or more of the location devices 1206, 1208, 1212, 1214, and/or 1216, the network server can respond to the user's request with a location of the key 1202 in the venue 1200. For example, the server may send a response to the user with the location information for the key 1202. The user may receive a prompt or notification via the application, proprietary program, web browser, or other program executed and operated by the user's client device.

In some embodiments, any of the location devices 1206, 1208, 1212, 1214, and/or 1216 may obtain and/or report a location of the device 1204 without receiving a location request from the network server. For example, devices that belong to a location service (e.g., that have been registered with a location service by a user), such as device 1204, may send tracking signals that are picked up by one or more of the location devices 1206, 1208, 1212, 1214, and/or 1216. Any of the location devices 1206, 1208, 1212, 1214, and/or 1216 that receives a tracking signal from the device 1204 may obtain the location of the device 1204, and may store the location and/or the unique identifier of the device 1204 in a record or database. The location devices 1206, 1208, 1212, 1214, and/or 1216 may transmit the location and unique identifier back to the network server. The network server may store the location information of the tracking device in the event a user requests location of the object.

FIG. 13 illustrates an embodiment of a process 1300 for determining a location of an object using a crowd sourced location data source. While specific examples may be given of a location device performing the process 1300, one of ordinary skill in the art will appreciate that other devices may perform the process 1300. In some aspects, the process 1300 may be performed by a computing device, such as a location device 1106, 1108, 1110, 1112, 1116, 1118, 1120, 1122, 1124, 1206, 1208, 1212, 1214, or 1216. As described above, a location device may include a client device, such as a network device similar to any of the network devices 102, 104, 106, 202, 204, 206, 208, 210 described above, or an access device similar to any of the access devices 108 or 216 described above.

Process 1300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1302, the process 1300 includes receiving, at a computing device, a request to locate a device, wherein the request includes an identifier of the device. In some embodiments, the request further includes a geographical area to search for the device. For example, when making the request, a user may use a client device to identify a geographical region in which the user believes the device may be located. In another example, a network server that sends the request to the computing device may determine a location in which a user's client device is located, and may only send the request to location devices in a geographical area corresponding to the location of the user's client device. Using FIG. 11 as an example, the computing device may include location device 1108, which may receive a request to locate the device 1104 that is attached to the dog 1102. The request may be received by the computing device from a network server or from another location device. The identifier may include a MAC address, a UUID, a UDID, a GUID, a RFID, a serial number, or any other unique identifier of the device to be located. By including the identifier in the request, any device receiving the request knows what device's identifier to look for in any received communication. For example, in response to receiving the request, the computing device may begin to look for communications that include the unique identifier of the device. The computing device may also determine whether it has recently received any communications that include the unique identifier of the device by, for example, referring to a record of received unique identifiers of devices from which communications have been received.

In some embodiments, the process 1300 may include transmitting the request to locate the device to one or more devices within the geographical area, wherein the transmitted request includes the identifier of the device. For example, the network server may transmit the request to the computing device, and the computing device may transmit the request to one or more other location devices within or outside of the geographical area. The one or more other location devices may communicate with the device, obtain a location of the device, and transmit the obtained location of the device to the network server.

In some embodiments, the request is received as a broadcast request that is receivable by the one or more devices within the geographical area. For example, the network server may broadcast the request to one or more location devices located in the geographical area.

At 1304, the process 1300 includes receiving a communication from the device, wherein the communication includes the identifier of the device. The communication may include a tracking signal that is transmitted or broadcast by the device. For example, the device may periodically transmit or broadcast the tracking signal that includes the unique identifier of the device so that location devices are aware when the device is in proximity to the location devices. Using FIG. 11 as an example, the location device 1108 may receive a tracking signal from device 1104. The location device 1108 may identify that the device 1104 is the device for which a location has been requested based on the unique identifier of the device 1104 being included in the request and in the tracking signal.

At 1306, the process 1300 includes obtaining a location of the device. For example, the computing device may obtain the location of the device using any of the techniques described with respect to FIGS. 2-10. For example, the computing device may determine the location of the device, the computing device may transmit its location to the device so that the device can determine its own location and then transmit the location back to the computing device, or the location of the computing device may be used as an approximate location for the device. In one example, the computing device may determine the location of the device using the communication received from the device. For example, as described above with respect to FIGS. 2-10, the computing device may determine a distance between it and the device based on signal characteristics of the communication signal received from the device, such as RSSI measurements, RCPI measurements, RTT measurements, or the like. The computing device may perform triangulation or trilateration using the distance determination, its location, and locations of one or more other devices with known locations to determine the location of the device. In some embodiments, the device can determine its location based on signals it receives from the computing device or other location devices using the techniques described above with respect to FIGS. 2-10. In some embodiments, if the device and the computing device are in close proximity, the location of the computing device may be used as an approximate location for the device. For example, the device may only be able to communicate with other devices from relatively close distances using WiFi™ signals, Zigbee™ signals, Bluetooth™ signals, IR™ signals, UWB signals, WiFi-Direct signals, BLE signals, or the like. In these examples, the computing device may use its own location as an approximate location for the device.

At 1308, the process 1300 includes transmitting the location of the device and the identifier of the device to a server, wherein the server is configured to use the location of the device and the identifier of the device to send a response to the requestor of the request. For example, again using FIG. 11 as an example, the computing device may include the location device 1108, which can then transmit location information corresponding to the determined location of the device 1104 along with the unique identifier of the device 1104 back to the network server. The location information may include GPS coordinates, a latitude-longitude position, or any other appropriate location designation for the device 1104. Using location information of the device 1104 received from the location device 1108, the network server can respond to the user's request with a location of the dog 1102 at one or more points in the venue 1100. For example, the server may send a response to the user with the location information for the dog 1102. The user may receive a prompt or notification via the application, proprietary program, web browser, or other program executed and operated by the user's client device.

FIG. 14 illustrates another embodiment of a process 1400 for determining a location of an object using a crowd sourced location data source. While specific examples may be given of an external network server performing the process 1400, one of ordinary skill in the art will appreciate that other devices may perform the process 1400. For example, the process 1400 may be performed on a server located in a local area network.

Process 1400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1402, the process 1400 includes receiving, on a network server, a communication, wherein the communication includes a request to locate a device, an identifier of the device, and a geographical area to search. For example, a user may use a client device to make the request to the network server to locate a tracking or communication device that is attached to or otherwise included with an object that the user wishes to locate. Using FIG. 11 as an example, the network server may receive a request from a user's client device to locate the device 1104 that is attached to the dog 1102. The network server may be part of an external network, such as the network 114, the network 214, or another network. The identifier may include a MAC address, a UUID, a UDID, a GUID, a RFID, a serial number, or any other unique identifier of the device to be located (e.g., device 1104). The geographical area can be identified in various ways, as discussed above. For example, when making the request, the user may identify the geographical area as a region in which the user believes the device may be located. In another example, the network server may determine a location in which the user's client device is located. The location may be included in the communication, for example, as a zip code, an address, a city name, a city code, or any other appropriate identifier of a geographical area or region. The server may limit or begin the search in the geographical area corresponding to the location of the user's client device.

In some embodiments, the process 1400 may include determining whether the requestor is authorized to locate the device. In some embodiments, determining whether the requestor is authorized to locate the device includes generating a signature using a key associated with the requestor. For example, as described in further detail with respect to FIG. 16, the user's client device may register with the network server or other server and may be issued a security key upon being registered. When making the request to locate the device (e.g., device 1104), the client device of the user may generate a signature using the security key. The network server may receive the signature from the client device, and may use the signature to verify that the client device, and thus the user, is associated with the unique identifier of the device the user is attempting to locate. For example, once the signature is received by the network server, the network server may generate a signature using a key stored at the network for the client device, and may then verify whether the signatures match. In some embodiments, determining whether the requestor is authorized to locate the device includes receiving login credentials (e.g., a user name and password) from the user that verify whether the user is authorized to locate the device. For example, an account of the user may indicate that the user is associated with the unique identifier of the device. Upon determining that the signatures match or that the credentials are correct, the server may authorize the user to locate the device that is attached to or otherwise included with the object that the user wishes to locate. For example, the network server may query or inspect the user's record or profile that includes devices with which the user is associated. Further details regarding a user's record or profile are discussed with respect to FIG. 16.

At 1404, the process 1400 includes determining a location device that is present within the geographical area. As described above, a location device is configured to obtain a location of one or more devices within the geographical area. For example, the network server may identify one or more location devices of a crowd sourced location data source in which to send the request. Using FIG. 11 as an example, the network server may determine that any one or more of location devices 1106, 1108, 1110, 1112, 1116, 1118, 1120, 1122, and/or 1124 are located within the geographical area of the venue 1100. In some embodiments, the search may be expanded to include location devices that are located beyond the geographical region in the event the device for which the user is searching is not found within the specified geographical region. For example, the search for the device may be performed using a ripple technique that includes the server starting the search with location devices within the geographical area, and then incrementally expanding the geographical area to utilize additional location devices outside the geographical area as needed. For example, the search may begin with location devices located in the user's city, and if the device is not found in the user's city, the search may be expanded to include location devices located in the user's county. If the device is still not found in the user's county, the search may be expanded again to include location devices located in the user's state. One of ordinary skill in the art will appreciate that other geographic areas may be searched.

At 1406, the process 1400 includes transmitting the request and the identifier of the device to the location device. Using FIG. 11 as an example, the network server may transmit to location device 1108 the request to locate the device 1104 that is attached to the dog 1102. In some embodiments, the process 1400 includes transmitting the request as a broadcast request that is receivable by a plurality of location devices within the geographical area. Referring again to FIG. 11 as an example, the network server may broadcast the request to all or a portion of the location devices 1106, 1108, 1110, 1112, 1116, 1118, 1120, 1122, and/or 1124 located within the geographical area of the venue 1100. In some embodiments, the network server may transmit the request to only one or the location devices in the geographical area. That location device may then transmit the request to one or more of the other location devices in the geographical area or to location devices outside of the geographical area (e.g., if the device is not found in the geographical area).

In response to receiving the request, the location device may begin to look for communications that include the unique identifier of the device. The location device may also determine whether it has recently received any communications that include the unique identifier of the device. For example, the location device may refer to or query a record of received unique identifiers of devices from which communications have been received. The location device may receive, after or before the request, a communication from the device that includes the unique identifier of the device. The communication may include a tracking signal that is transmitted or broadcast by the device. For example, the device may periodically transmit or broadcast the tracking signal that includes the unique identifier of the device so that location devices are aware when the device is in proximity to the location devices. Using FIG. 11 as an example, the location device 1108 may receive a tracking signal from device 1104. The location device 1108 may identify that the device 1104 is the device for which a location has been requested based on the unique identifier of the device 1104 being included in the request and in the tracking signal.

The location device may then obtain a location of the device using any of the techniques described with respect to FIGS. 2-10. For example, the location device may determine the location of the device, the location device may transmit its location to the device so that the device can determine its own location and then transmit the location back to the location device, or the location of the location device may be used as an approximate location for the device. The location device may transmit the location and unique identifier back to the network server.

In some embodiments, a location device may detect communications from certain devices regardless of whether a request to locate that device has been received. For example, devices that belong to a location service (e.g., that have been registered with a location service by a user) may send tracking signals with unique identifiers of the tracking devices that are detected by location devices. A location device that receives a tracking signal from a device may obtain the device's location, and may store the location and/or the unique identifier in a record or database. The location device may transmit the location and unique identifier of the device back to the network server.

At 1408, the process 1400 includes receiving a location of the device from the location device. For example, referring again to FIG. 11, the network server may receive location information corresponding to the location of the device 1104 from the location device 1108. The location information may include GPS coordinates, a latitude-longitude position, or any other appropriate location designation for the device 1104. The process 1400 may also include receiving the unique identifier of the device from the location device. In some embodiments, the process 1400 may include transmitting the request to the location device and receiving the location of the device from an additional location device within the geographical area, wherein the request is transmitted from the location device to the additional location device. For example, as described above, the network server may transmit the request to only one or the location devices in the geographical area, and that location device may then transmit the request to one or more of the other location devices in the geographical area or to location devices outside of the geographical area (e.g., if the device is not found in the geographical area). One of the other location devices within or outside of the geographical area may obtain a location of the device, and may then transmit the location and/or the identifier of the device to the network server.

In some embodiments, the network server may store location information corresponding to the location of the device in a record or profile associated with the device and/or the user that made the request to locate the device. For example, the network server may store the location information of the device in a record or profile associated with the user and/or the device that maps the unique identifier of the device with the location information of the device. The record or profile may include the record or profile discussed with respect to FIG. 16.

At 1410, the process 1400 includes transmitting the location of the device to the requestor of the request. For example, using location information corresponding to the location of the device received from the location device, the network server can respond to the user's request with a location of the object that the user wishes to locate. For example, the server may send a response to the user with the location information for the object. The user may receive a prompt or notification via an the application, proprietary program, web browser, or other program executed and operated by the user's client device.

Figure 15:
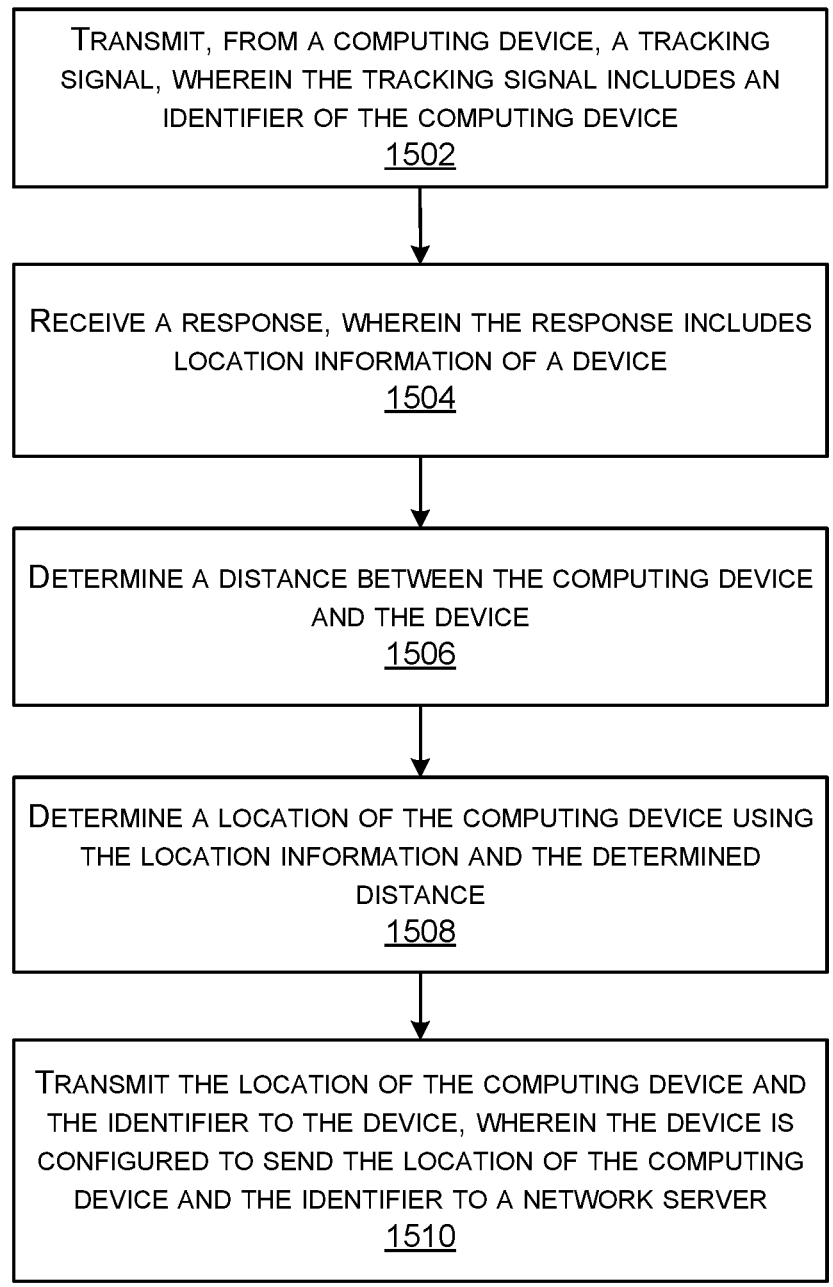
FIG. 15 is a flowchart illustrating another embodiment of a process for determining a location of a device, in accordance with some embodiments.

FIG. 15 illustrates another embodiment of a process 1500 for determining a location of an object using a crowd sourced location data source. While specific examples may be given of a communication or tracking device performing the process 1500, one of ordinary skill in the art will appreciate that other devices may perform the process 1500. In some aspects, the process 1500 may be performed by a computing device, such as a tracking device. A tracking device may include a network device, such as any of the network devices 102, 104, 106, 202, 204, 206, 208, or 210 described above.

Process 1500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1502, the process 1500 includes transmitting, from a computing device, a tracking signal, wherein the tracking signal includes an identifier of the computing device. For example, the computing device may include a tracking device and may be part of or integrated with an object that a user wishes to locate. The computing device may be used to locate the object in a venue. Using FIG. 11 as an example, the computing device may include the device 1104 that is attached to a collar of the dog 1102. The computing device may include one or more transceiver radios that can communicate using short range communication protocols, such as a WiFi™, Bluetooth™, Zigbee™, IR, UWB, WiFi-Direct, BLE, and/or other appropriate transceiver radios. In some embodiments, the computing device does not include a cellular transceiver radio or other long range communication capabilities. Accordingly, in such embodiments, the computing device may be unable to directly communicate with a client device of the user due to the distance between the computing device and the user's client device. For example, the user may attempt to locate the object with which the computing device is attached from a remote location. In these embodiments, the computing device also may not be able to communicate with a network server that the user can communicate with to locate the object. For example, the computing device may be out of range of or may not have permission to access a WiFi™ network. In another example, the computing device may not have the communication capabilities to communicate with the network server. For example, the computing device may include only a Bluetooth™ transceiver radio, a Zigbee™ transceiver radio, an IR transceiver radio, a UWB transceiver radio, a WiFi-Direct transceiver radio, and/or a BLE transceiver radio. In such embodiments, the computing device may rely on communications with one or more location devices in order to determine its location and to communicate its location back to the user's client device via the network server.

In some embodiments, the computing device may periodically transmit or broadcast the tracking signal with the identifier of the computing device so that location devices are aware when the computing device is in communication range. In some embodiments, the identifier may include a unique identifier, such as a MAC address, a UUID, a UDID, a GUID, a RFID, a serial number, or any other unique identifier of the computing device. In some embodiments, the process 1500 may include determining that the computing device is outside of a communication range with an access device, and transmitting the tracking signal when the computing device is outside of the communication range. For example, the computing device may only transmit or broadcast the tracking signal if it determines that it is outside of communication range with the user's client device. When the computing device is in communication range with the user's client device, it may only transmit a tracking signal in response to a command from the client device. However, the computing device may detect when it is no longer within communication range with the client device, and in response may begin transmitting or broadcasting the tracking signal so that any location devices that are located within communication range from the device may receive the tracking signal.

At 1504, the process 1500 includes receiving a response, wherein the response includes location information of a device. For example, the computing device may transmit the tracking signal, which may be received by a location device. Once the location device receives the tracking signal, the location device may transmit location information corresponding to its location to the computing device. The location information may include GPS coordinates, a latitude-longitude position, or any other appropriate location designation. Referring to FIG. 11 as an example, the location device 1108 may receive the tracking signal, and may transmit a response to the device 1104 with location information corresponding to the location of the location device 1108.

At 1506, the process 1500 includes determining a distance between the computing device and the device. At 1508, the process 1500 includes determining a location of the computing device using the location information and the determined distance. For example, the computing device may receive the location information from the location device, and the computing device can determine its location using any of the techniques described above with respect to FIGS. 2-10. In some examples, the computing device may analyze signals received from the location device, and may determine a distance between the computing device and the location device based on the signals. For example, the computing device may determine the distance based on RSSI measurements, RCPI measurements, RTT measurements, or the like, as described above. The computing device may further determine distances between it and other devices with known locations (e.g., other location devices that may send the computing device their location) using similar techniques. The computing device may then perform triangulation, trilateriation, or any other appropriate location determination technique using the location information of the location device along with the determined distances.

In some embodiments, the process 1500 may include receiving a plurality of responses, wherein each response includes location information of a sender of the response. For example, the computing device may broadcast or transmit the tracking signal so that multiple location devices can receive the tracking signal. The location devices may then respond with their location information so that the computing device can determine its location. For example, responses from multiple location devices may allow a more accurate and precise location determination for the computing device. As another example, responses from multiple location devices may be beneficial in the event the computing device is mobile and needs to determine its location at multiple points within a venue as it moves around.

At 1510, the process 1500 includes transmitting the location of the computing device and the identifier to the device. The device is configured to send the location of the computing device and the identifier to a network server. Referring again to FIG. 11 as an example, the device 1104 may determine its location and may transmit its determined location to the location device 1108. The location device 1108 may then transmit the location of the device 1104 and/or the identifier of the device 1104 to the network server. The network server may store location information corresponding to the location of the computing device in a record or profile associated with the computing device and/or the user that made the request to locate the device. For example, the network server may store the location information in a record or profile associated with the user and/or the computing device that maps the unique identifier of the computing device with the location information of the computing device. The record or profile may include the record or profile discussed with respect to FIG. 16. Using the location information corresponding to the location of the computing device received from the location device, the network server can respond to the user's request with a location of the object that the user wishes to locate. For example, the server may send a response to the user with the location information for the object. The user may receive a prompt or notification from an application, proprietary program, web browser, or other program executed and operated by the user's client device.

Using the techniques described in FIGS. 2-15, a crowd sourced location data source may be created, and a device or object may be located using the crowd sourced location data source. As described herein, each of the devices making up the crowd sourced location data source can store its location information, and can allow that information to be accessed by other devices that may not have access or the capability to connect with one or more other location data sources (e.g., devices that have WiFi™, Zigbee™, Bluetooth™, infrared (IR), UWB, WiFi-Direct, BLE, or other communication capabilities, but no GPS and/or cellular capabilities). By using the location information provided by the crowd sourced location data source, any device with a transceiver radio can determine its location and also report its location to a remote location even if the device lacks long range communication capabilities. In some embodiments, a device may need to be registered with a location service in order to access location information from a location device. Accordingly, the crowd sourced location data source may be utilized to provide location services to users to allow the users to locate misplaced objects or people.

Figure 16:
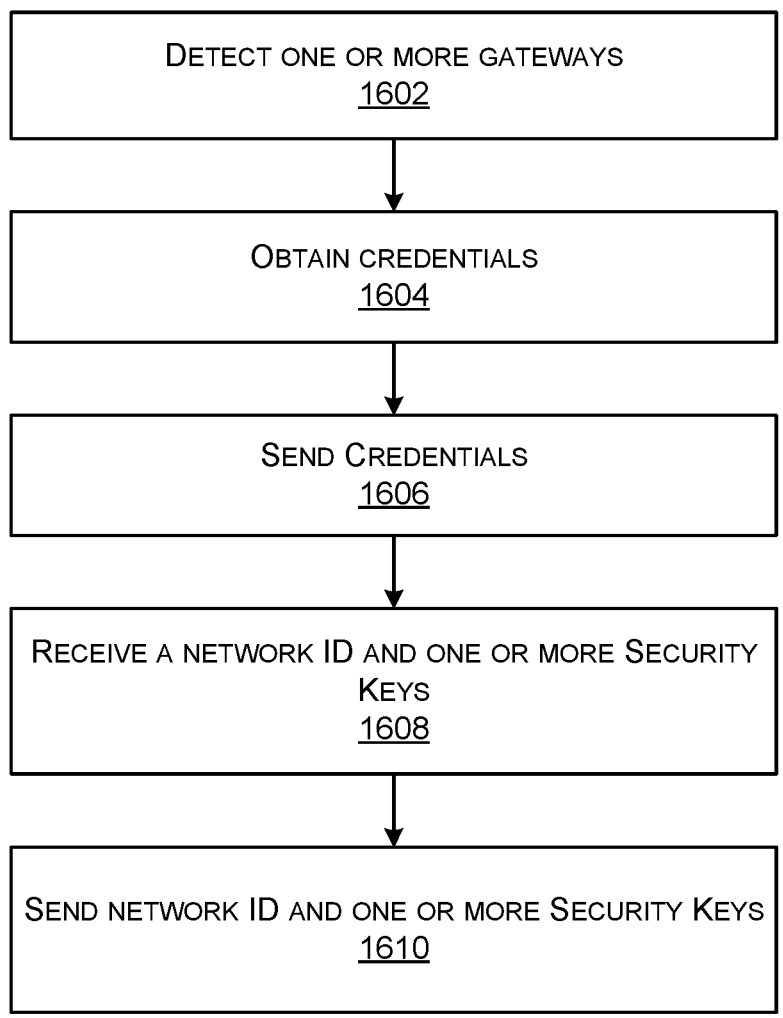
FIG. 16 is a flowchart illustrating an embodiment of a process for registering one or more network devices, in accordance with some embodiments.

As noted above in the description of FIG. 1, network devices, upon being powered on or reset, may be registered with a network (e.g., a cloud network or other external network) and associated with a logical network within a local area network. FIG. 16 illustrates an example of a process 1600 for registering one or more devices, such as the network devices 102, 104, 106 illustrated in FIG. 1, the network devices 202, 204, 206, 208, 210 illustrated in FIGS. 2-3, and 5, or the location devices illustrated in FIGS. 11-12. As noted above, a location device may include a network device. When multiple network devices and gateways are included within a local area network, the network devices and/or gateways may be installed at different times, resulting in the techniques described with respect to FIG. 16 possibly occurring for each network device and/or gateway at different points in time. For example, referring to FIG. 1, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 1602, a network device may detect one or more gateways upon being powered on or reset. In some embodiments, a provisioning process may occur when the network device is powered on or reset and detected by an access device (e.g., access device 108, 216, 1206, 1208, 1212, 1214, and/or 1216). During the provisioning process, the access device may directly communicate with the network device. In some embodiments, direct communication between network devices and an access device may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with an external network (e.g., cloud network 114, external network 214, or the like). For example, the access device (e.g., via the application, program, or the like) may instruct the network device to register with the cloud network upon receiving confirmation from the network device that it has been successfully paired with a gateway. At 1604, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 1606. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. Other relevant information may include location information corresponding to a location of any of the devices. In one example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, a universally unique identifier (UUID), a globally unique identifier (GUID), a unique device identifier (UDID), or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID), a globally unique identifier (GUID), a unique device identifier (UDID), or the like that may include letters and/or numbers. As described above, for each logical network, the server may generate a unique key for a network device and a separate unique key for an access device.

At 1608, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 1610, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device may access the network devices locally via a gateway (e.g., gateway using communication signal 118) or remotely via the cloud network (e.g., cloud network 114 using communication signal 120). In some embodiments, the communication between the access device and the cloud network may be a HTTP or HTTPS communication. One of ordinary skill in the art will appreciate that other communication mechanisms may be used to communicate between the access device and the cloud network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like), as described above with respect to FIG. 16. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 17:
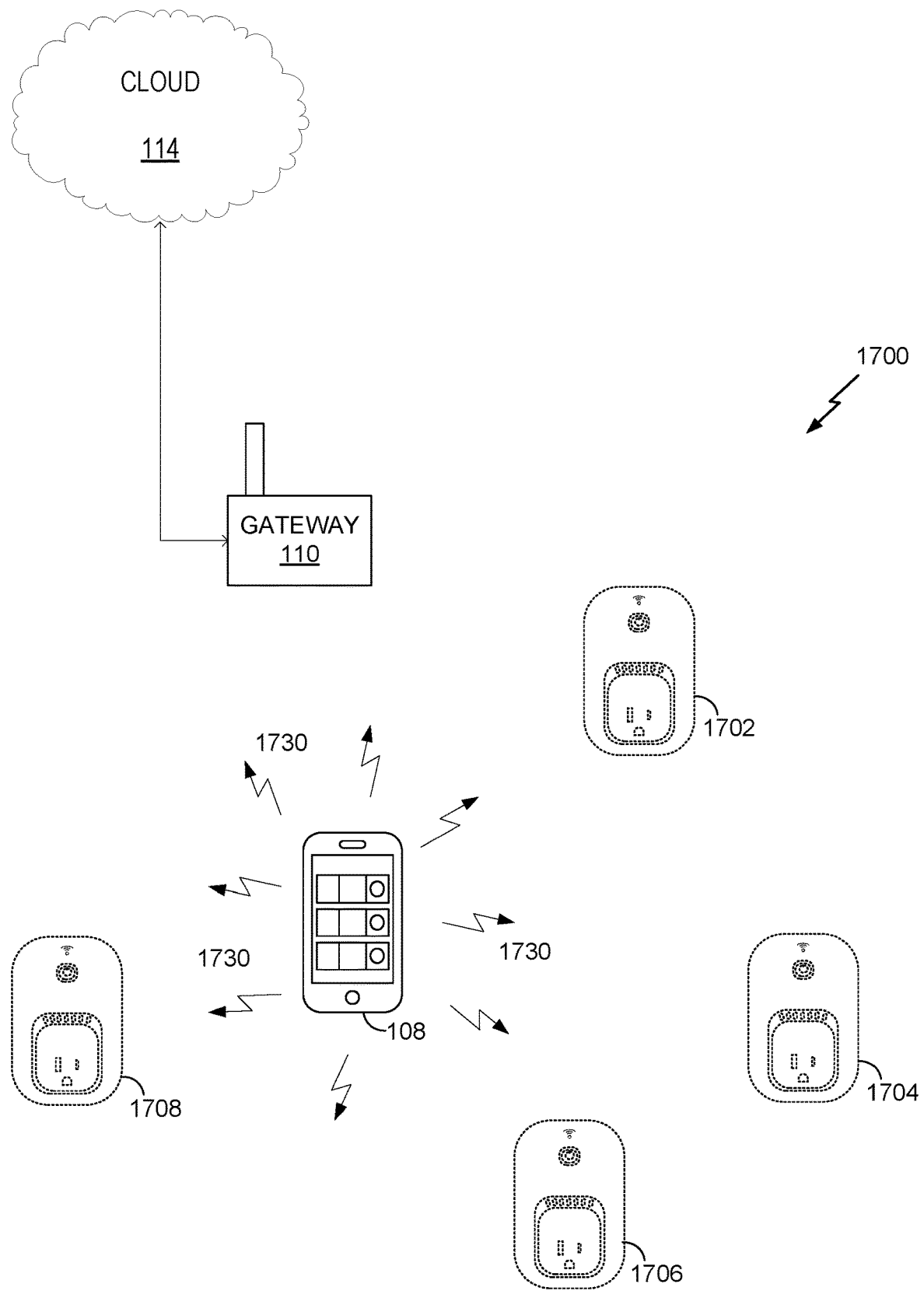
FIG. 17 is an illustration of an example of a network environment, in accordance with some embodiments.

FIG. 17 illustrates an example of a network 1700, according to embodiments of the present invention. Specifically, the network 1700 can be a wireless local area network enabling an access device to communicate with network devices to control adjustment of attributes related to operation of the network devices. Network 1700 includes network device 1702, network device 1704, network device 1706, and network device 1708. The network 1700 also includes access device 108. In other words, the network 1700 may be substantially similar to the network 100 except that access device 108 has been turned on near the network 1700, to which it is associated, or has entered an area to which the network 1700 can reach.

When access device 108 can enter the network 1700 as shown in FIG. 17, access device 108 may be authenticated based on the access device's authentication with the logical network or may otherwise commence communication with cloud network 114. Access device 108 may also communicate notification of its presence or other information directly to other network devices 1702-1708 within network 1700, as shown in FIG. 17 by communication paths 1730. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1700, including network device 1702, network device 1704, network device 1706, and network device 1708, information/data regarding its status. Such status data may include the fact that it is present and turned on, or other status data/information. At any time that network devices 1702, 1704, 1706, and 1708 recognize that access device 108 is present at network 1700, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1702-1708 and access device 108 may each receive communication from other network devices around the network 1700, including the status of each of those network devices, network devices 1702-1708 and/or access device 108 may be continuously scanning network 1700 (including, for example, running discovery algorithms) to determine whether any devices within the network have moved, turned on/off or otherwise added to or subtracted from the network 1700, or have otherwise changed statuses.

Since network devices 1702-1708 and access device 108 may each receive communication from other devices around network 1700, including the status of each of those devices, each network device within network 1700 may know the status of each other network device in the network 1700. For example, access device 108 or devices 1702-1708 may not be required to communicate with cloud network 114 in order to obtain one or more of such statuses. Since cloud network 114 is an external network and may be remote from network 1700, communication between network devices within the network 1700 and cloud 114 may take more time than communication between two devices within network 1700. For example, communication between devices within network 1700 may take anywhere from 1 millisecond to 100 milliseconds, while communication between a device within network 1700 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1700 may choose to send and receive/retrieve statuses directly with other devices within the network 1700 instead of communicating such information via cloud network 114. When a network device receives status data from another network device on the device's local area network 1700, it may store that status data so that it may retrieve and use that status data at a later time.

Figure 18:
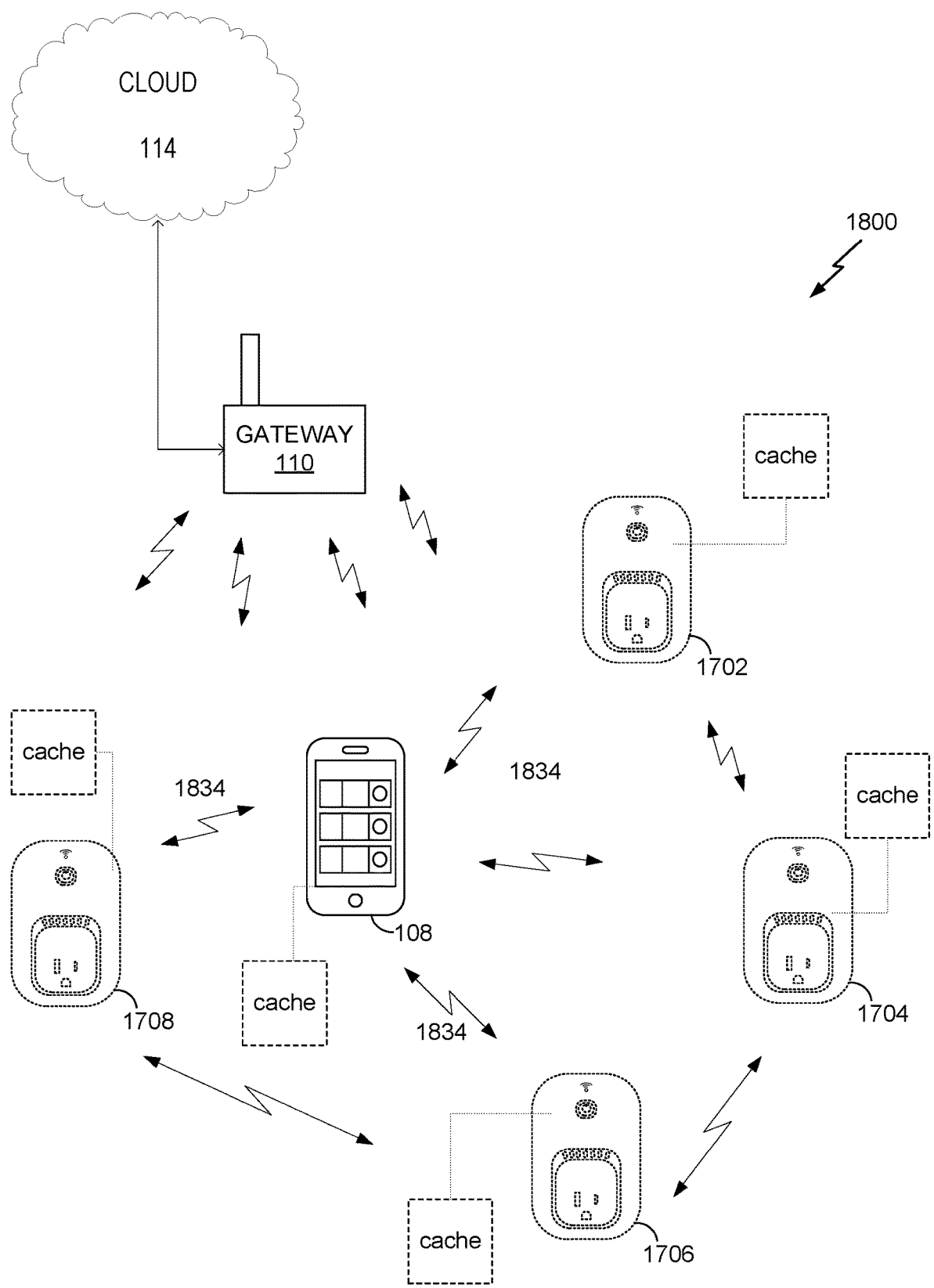
FIG. 18 is an illustration of an example of a network environment, in accordance with some embodiments.

FIG. 18 illustrates an example of a network 1800, according to embodiments of the present invention. The local area network 1800 may include network device 1702, network device 1704, network device 1706, network device 1708, and access device 108. FIG. 18 also illustrates that one or more network devices 1702-1708 and/or access device 108 may include a storage device, such as a cache, for storing data, including data regarding its own status and data regarding statuses received from the other devices within local area network 1800. For example, access device 108 may, after being powered up, broadcast/send its status to network device 1708 via communication 1834. Network device 1708 may store the status data received from access device 108 until the next time access device 108 updates its status by sending new/updated status data to network device 1708. Cache may be used for storage within network devices 1702-1708 and/or access devices within the local area network 1800 so that each of the devices may be able to quickly retrieve the data it needs from storage. An application operating on the access device 108 can access the cache to obtain information to display the visual interface for each network device 1702-1708 registered within the network 1800. Although a caching device may be used to store such data within the network and/or access devices within the local area network 1800, other types of storage may be used.

The cache can contain a known interface list including interface information for different, known types of devices. The known list can include a record for each network device known by the access device 108 to exist on the network 1800. When an application is run on the access device 108, the access device 108 can access the known interfaces in the cache to present the display of access device 108. The display can present one or more visual interfaces, each corresponding to a network device known to exist on the network 1800. Each visual interface can be generated based on a visual interface module corresponding to each device on the network 1800. In an example, the display can include a visual interface (e.g., a module tile) for each device in the network 1800 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1800. For example, the status display can include a speed of a fan (e.g., a fan speed of 56 in a range of values between 0 and 100) of the network device 1702 (e.g., a fan), a value of sensitivity of a sensor (e.g., a value of 34 in a range of values 0-100) for the network device 1704 (e.g., a motion sensor), a value of brightness (e.g., 65 percent brightness) for the network device 1706 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1800 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1800, a network device may not know when another network device changes status (e.g. turns/powers off). However, network devices and/or access devices within local area network 1800 may broadcast/send any updates in its status to other devices on the network. For example, if network device 1702 changes status, it may send status data to the other network devices, such as network devices 1704, 1706 and 1708 and to access device 108. However, network device 1702 may not know which devices to update since the other devices may change statuses periodically (e.g. turn off).

Therefore, a network or access device may subscribe to another network or access device within local area network 1800. For example, network devices 1704, 1706 and 1708 and access device 108 may subscribe to status data notifications/updates from network device 1702. Such a subscription may be registered for upon initial connection with network device 1702 when network device 1702 first enters local area network 1800 or at any other time after network device 1702 has been associated with local area network 1800. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1702 may store a list of network devices 1704, 1706 and 1708 and access device 108 after those devices subscribe to network device 1702. Then, when network device 1702 undergoes a change in status, network device 1702 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1800, each contain continuously updated statuses of each other device on the network and obtain those statuses and updates through direct communication without necessary use of the cloud.

Figure 19:
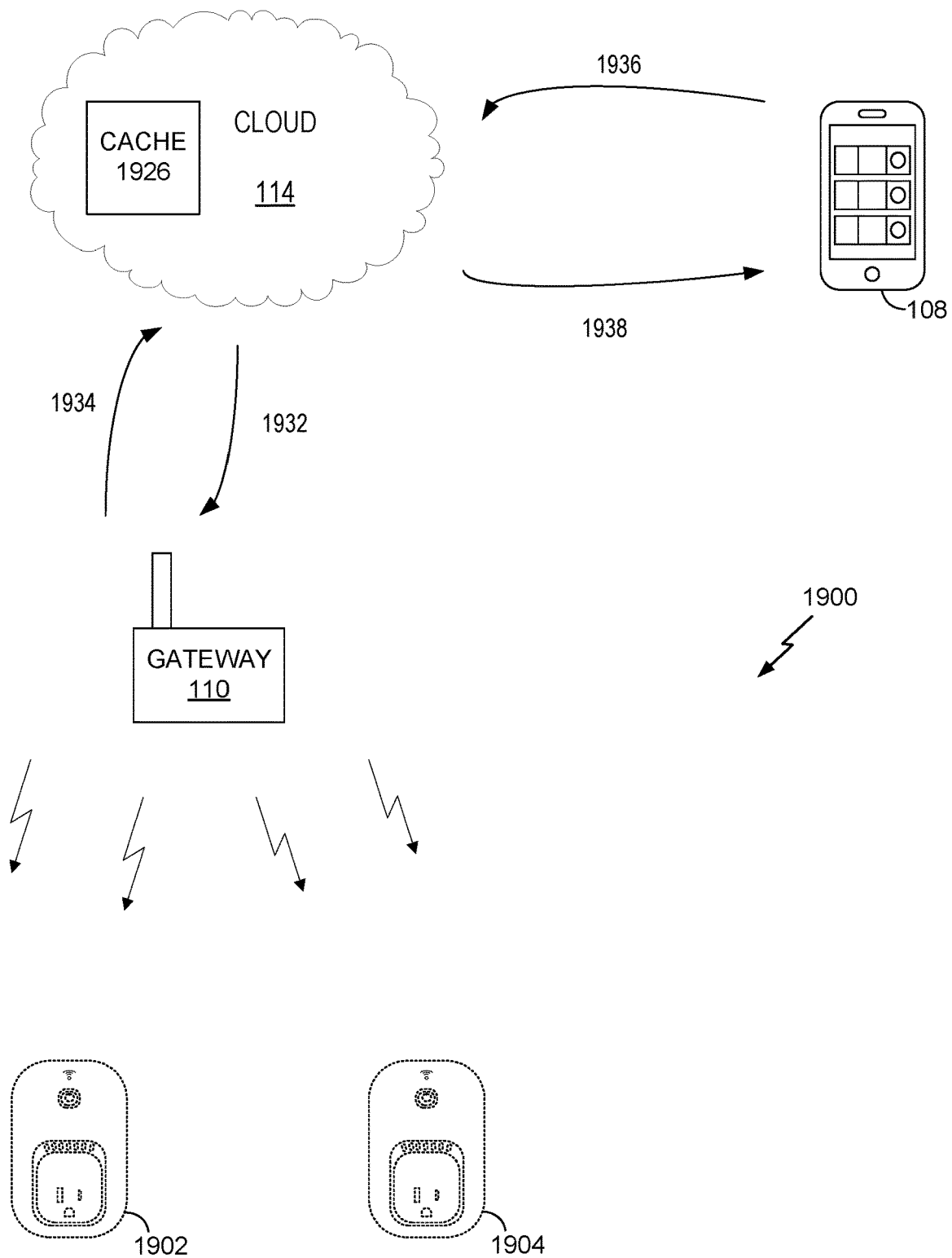
FIG. 19 is an illustration of an example of a network environment, in accordance with some embodiments.

FIG. 19 illustrates an access device 108 that is located remotely from network 1900 (e.g. local area network), according to embodiments of the present invention. Local area network 1900 includes gateway 110 and network devices 1902 and 1904 (which may be, for example, the same as any of network devices 1702-1708 in FIGS. 17 and 18), as shown in FIG. 19. However, network 1900 may also include a variety of other network devices and one or more access devices directly connected to network 1900. Gateway 110 is connected to cloud network 114, and allows network devices 1902 and 1904 to connect to cloud 114, the internet, or other external networks via gateway 110. In some embodiments, the network devices 1902 and 1904 may include home automation devices that allow a user to access, control, and/or configure various home appliances located within the user's home, such as a television, radio, light, microwave, iron, and/or the like.

Access device 108 is not directly connected to network 1900. Instead, access device 108 is external to network 1900 and may connect to cloud network 114 and to network 1900 via cloud network 114. As noted, network devices 1902 and 1904 may change status on a periodic basis. In some embodiments, even when external to and not directly connected to network 1900, an access device may request to check the status of the devices on the network. When access device 108 seeks to check the status of any device on the network, the access device 108 may transmit/send a communication 1936 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1938 of such status data to the access device 108. For example, after network devices 1902 and 1904 are turned on, authenticated and are a part of network 1900, network devices 1902 and 1904 may communicate their statuses to cloud network 114. Furthermore, any time the status of network devices 1902 and 1904 changes, the device that incurred a status change may push/send information (e.g. an indication) of that status change to cloud network 114. Cloud network 114 may store, in cache 1926 or otherwise, the statuses (which may be time stamped in metadata or otherwise) of network devices 1902 and 1904. Therefore, when access device 108 requests from cloud network 114 the statuses of devices on network 1900, cloud 114 may send its most recently stored/updated statuses to access device 108.

To obtain the most updated status data of devices within network 1900, cloud 114 may, upon receiving a request for status data related to network devices 1902 and 1904, transmit/send a communication 1932 (e.g. request, query, etc.) for such status data to network devices 1902 and 1904 via gateway 110. Once network devices 1902 and 1904 receive this request, network devices 1902 and 1904 may send a communication 1934 (e.g. updated status data) to cloud 114 to replace the previously stored/cached statuses in cache 1926. Upon receipt of updated status data 1934 from network 1900, cloud 114 may send a communication 1938 of such status data to the access device 108.

However, the process of cloud network 114 requesting updated statuses from network devices 1902 and 1904 within network 1900 may cause latency within the system. More specifically, the time required for cloud network 114 to request updated statuses from network devices 1902 and 1904 and to in turn receive updated statuses from network devices 1902 and 1904 may be substantially greater than the time required for cloud network 114 to send its currently stored statuses (without being updated) for network devices 1902 and 1904 to access device 108. For example, of the total time required for access device 108 to receive updated statuses from cloud network 114, 80% or more of that total time may include cloud network 114 requesting updated statuses from network devices 1902 and 1904. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1902 and 1904 is the transmission of data between cloud 114 and network devices 1902 and 1904, the access device 108 and cloud network 114 may maximize efficiency by minimizing the effect of the transmission of data between cloud 114 and network devices 1902 and 1904 on the whole process/system.

Figure 20:
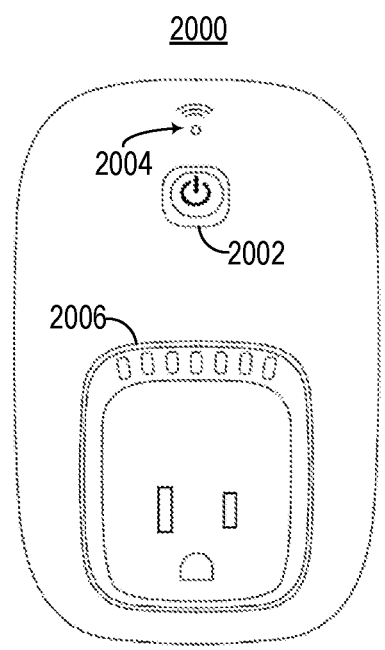
FIG. 20 is an illustration of an example of a front view of a network device, in accordance with an embodiment.
Figure 21:
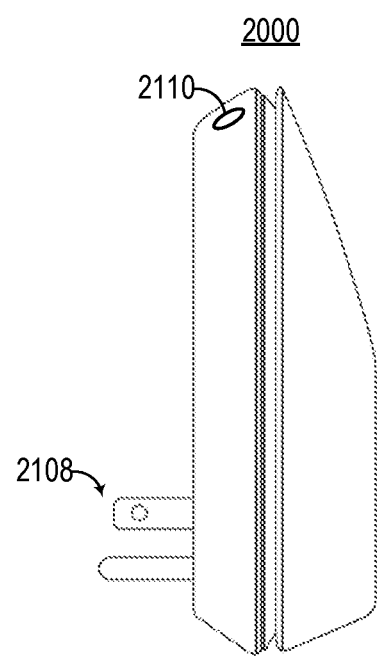
FIG. 21 is an illustration of an example of a side view of a network device, in accordance with an embodiment.

FIG. 20 illustrates an example of a front view of a network device 2000. FIG. 21 illustrates an example of a side view of the network device 2000. The network device 2000 may include any of the network devices 102, 104, or 106 described herein. In some embodiments, the network device 2000 may be a home automation network device. For example, the network device 2000 may include a home automation switch that may be coupled with a home appliance. A user may wirelessly access the network device 2000 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 2000 may include a WiFi enabled switch that connects home appliances and other electronic devices to a compatible 802.11b/g/n/ac WiFi network. The network device 2000 may thus allow users to locally or remotely turn devices on or off from anywhere, program customized notifications, and/or change device status. The network device 2000 may further allow a user to create custom schedules or have devices respond to sunrise or sunset.

The network device 2000 includes an power switch 2002 that may be depressed in order to turn the network device 2000 on and off. In some embodiments, a light source may be integrated with or located behind the power switch. For example, a light-emitting diode (LED) may be located on a circuit board under the power button 2002. The light source may be illuminated when the network device 2000 is powered on, and may not be illuminated when the network device 2000 is powered off.

The network device 2000 further includes a communications signal indicator 2004. The signal indicator 2004 may indicate whether the network device 2000 has access to a communications signal, such as a WiFi signal. For example, the signal indicator 2004 may include a light source (e.g., a LED) that illuminates when the network device 2000 is connected to a communications signal. The light source may depict different colors or other characteristics (e.g., flashing, dimming, or the like) to indicate different levels of signal strength or mode of operation.

The network device 2000 includes a restore button 2110. The restore button 2110 may allow a user to reset the network device 2000 to factory default settings. For example, upon being depressed, the restore button 2110 may cause all software on the device to be reset to the settings that the network device 2000 included when purchased from the manufacturer.

The network device 2000 further includes a plug 2108 and an outlet 2006. The plug 2108 allows the network device 2000 to be plugged into a wall socket, such as a socket providing 120V, 220V, or the like. In turn, an appliance may be plugged into the outlet 2006. Once the network device 2000 is registered according to the techniques described above, an appliance plugged into the socket 2006 may be controlled by a user using an access device (e.g., access device 108).

Figure 22:
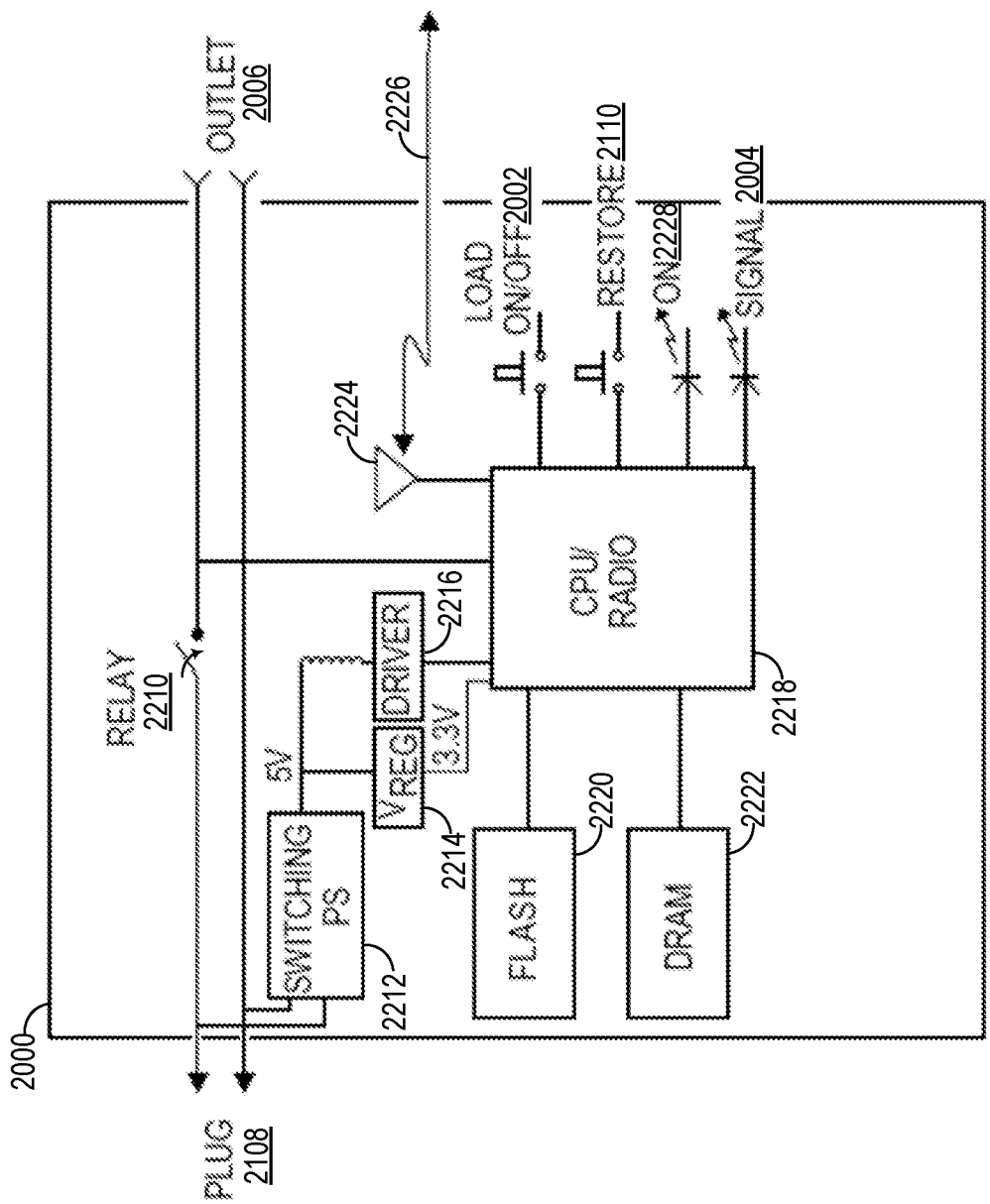
FIG. 22 is an example of a block diagram of a network device, in accordance with an embodiment.

FIG. 22 is an example of a block diagram of the network device 2000 depicting different hardware and/or software components of the network device 2000. As described above with respect to FIGS. 20 and 21, the network device 2000 includes the outlet 2006, the plug 2108, the power button 2002, the restore button 2110, and the communications signal indicator 2004. The network device 2000 also includes light source 2228 associated with the power button 2002. As previously described, the light source 2228 may be illuminated when the network device 2000 is powered on.

The network device 2000 further includes a relay 2210. The relay 2210 is a switch that controls whether power is relayed from the plug 2108 to the outlet 2006. The relay 2210 may be controlled either manually using the power button 2002 or remotely using wireless communication signals. For example, when the power button 2002 is in an ON position, the relay 2210 may be closed so that power is relayed from the plug 2108 to the outlet 2006. When the power button 2002 is in an OFF position, the relay 2210 may be opened so that current is unable to flow from the plug 2108 to the outlet 2006. As another example, an application or program running on an access device may transmit a signal that causes the relay 2210 to be opened or closed. For instance, an access application may display a graphical interface on the access device that includes a power button. The user may tap or otherwise select the power button, and the access application may send a communication signal (e.g., over a WiFi network) to the network device 2000 instructing the network device 2000 to open or close the relay 2210.

The network device 2000 further includes flash memory 2220 and dynamic random access memory (DRAM) 2222. The flash memory 2220 may be used to store instructions or code relating to an operating system, one or more applications, and any firmware. The flash memory 2220 may include nonvolatile memory so that any firmware or other program can be can updated. In the event the network device 2000 loses power, information stored in the flash memory 2220 may be retained. The DRAM 2222 may store various other types of information needed to run the network device 2000, such as all runtime instructions or code.

The network device 2000 further includes a CPU/Radio 2218. The CPU/Radio 2218 controls the operations of the network device 2000. For example, the CPU/Radio 2218 may execute various applications or programs stored in the flash memory 2220 and/or the dynamic random access memory (DRAM) 2222. The CPU/Radio 2218 may also receive input from the various hardware and software components, interpret the input, and perform one or more functions in response to the input. As one example, the CPU/Radio 2218 may determine whether the power button 2002 has been pressed, and determines whether the relay 2210 needs to be opened or closed. The CPU/Radio 2218 may further perform all communications functions in order to allow the network device 2000 to communicate with other network devices, one or more gateways, one or more location devices, a cloud network, and/or one or more access devices. While the CPU and radio of the network device 2000 are shown to be combined in the CPU/Radio 2218, one of ordinary skill in the art will appreciate that, in some embodiments, the CPU and radio may be separately located within the network device 2000. For example, CPU circuitry may be situated at a separate location on a circuit board from the location of radio circuitry, the CPU circuitry may be located on a different circuit board from the radio circuitry, or the like. Further, the network device 2000 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 2000 does not include a cellular network transceiver radio or interface, and thus may not be configured to directly communicate with a cellular network. In some embodiments, the network device 2000 may include a cellular network transceiver radio, and may be configured to communicate with a cellular network using the cellular network transceiver radio.

The network device 2000 may communicate with other devices and/or networks via antenna 2224. For example, antenna 2224 may include a 2.4 GHz antenna, a 5 GHz antenna, or the like, that can transmit and receive WiFi communications signals. In some embodiments, the antenna 2224 may comprise or coupled with a wireless transceiver. The network device 2000 may include other types of antennas that can communicate Bluetooth® signals, Zigbee® signals, Ultra-Wideband (UWB) signals, WiFi-Direct signals, BLE signals, and/or the like. In some embodiments, the antenna 2224 may be configured to communicate different types of signals, such as the WiFi signals, Bluetooth® signals, Zigbee® signals, UWB signals, WiFi-Direct signals, BLE signals, and/or the like. In some embodiments, the network device 2000 may include multiple antennas for communicating the different types of communication signals. As one example, the network device 2000 may include both a 2.4 GHz antenna and a 5 GHz antenna.

The network device 2000 further includes a driver 2216, a switching power supply 2212, and a voltage regulator 2214. The driver 2216 may include instructions or code that can be used to translate control signals or commands received from applications running on the DRAM 2222 to commands that the various hardware components in the network device 2000 can understand. In some embodiments, the driver 2216 may include an ambient application running on the DRAM 2222. The switching power supply 2212 may be used to transfer power from the outlet in which the plug 2108 is connected to the various loads of the network device 2000 (e.g., CPU/Radio 2218). The switching power supply 2212 may efficiently convert the voltage and current characteristics of the electrical power to a level that is appropriate for the components of the network device 2000. For example, the switching power supply 2212 may perform AC-DC conversion. In some embodiments, the switching power supply 2212 may be used to control the power that is relayed from the plug 2108 to the outlet 2006. The voltage regulator 2214 may be used to convert the voltage output from the switching power supply 2212 to a lower voltage usable by the CPU/Radio 2218. For example, the voltage regulator 2214 may regulate the DC voltage from 5V to 3.3V.

In some examples, the network device 2000 further includes a location engine (not shown) and a location storage device (not shown). The location engine is configured to perform one or more of the steps described above with respect to FIG. 9, 10, 13, or 15. For example, the location engine may obtain location information and one or more signals received by the antenna 2224 and/or a wireless transceiver. The location information may include location coordinates of an access device or another network device. The one or more signals may be received from the access device or the other network device. The location engine may determine a location of the network device 2000 using the location information, as described above with respect to FIG. 9. The location storage device may store the location of the network device 2000. In another example, the location engine may provide for display an icon of a network device. An input device may receive input indicating a position of the network device 2000, as described above with respect to FIG. 10. The location storage device may store the location. Antenna 2224 and/or a transceiver may transmit the position to another network device or to an access device. In another example, the location engine may obtain or determine a location of a device that a requestor has requested the network device 2000 to locate, as described above with respect to FIG. 13. The antenna 2224 and/or a transceiver may transmit the obtained location to a server. In yet another example, the location engine may generate a tracking signal that includes an identifier of the network device. The location engine may obtain a response (received by the antenna 2224 and/or transceiver) that includes location information of a device. The location engine may then determine a location of the network device 2000 using the location information of the device and a determined distance, as described above with respect to FIG. 15. The antenna 2224 and/or transceiver may then transmit the location of the network device 2000 and the identifier to the device.

In various embodiments, functions may be stored as one or more computer-program products, such as instructions or code, in a non-transitory machine-readable storage medium, such as the flash memory 2220 and/or the DRAM 2222. The network device 2000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 9, 10, 13, or 15, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 9, 10, 13, or 15. For example, the network device 2000 may be used as a location device or a tracking device. The memory, such as the flash memory 2220 and/or the DRAM 2222, may be a processor-readable memory and/or a computer-readable memory that stores software code (programming code, instructions, etc.) configured to cause a processor(s) within the CPU/Radio 2218 to perform the functions described. In other embodiments, one or more of the functions described may be performed in hardware.

A set of these instructions and/or code might be stored on a non-transitory machine-readable storage medium, such as the flash memory 2220 and/or the DRAM 2222. In some cases, the storage medium might be incorporated within a computer system, such as the CPU/Radio 2218. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 2000 and/or might take the form of source and/or installable code, which, upon compilation and/or installation on the network device 2000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 2000 may have other components than those depicted in FIGS. 20-22. Further, the embodiment shown in the figures are only one example of a network device that may incorporate an embodiment of the invention. In some other embodiments, network device 2000 may have more or fewer components than shown in the figure, may combine two or more components, or may have a different configuration or arrangement of components.

Figure 23:
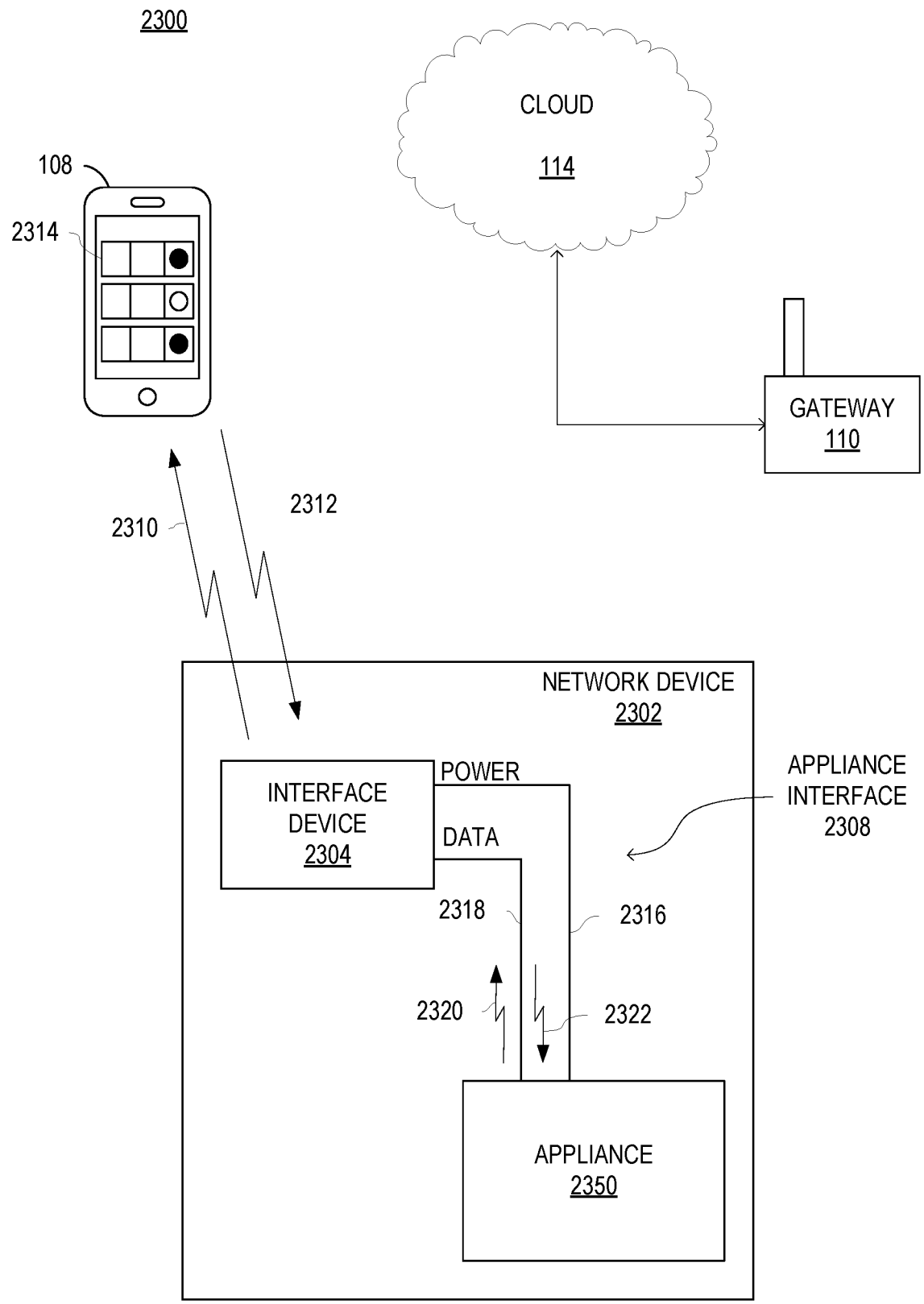
FIG. 23 is a schematic illustration of a local area network including a network device that includes an appliance, in accordance with an embodiment.

FIG. 23 is a schematic illustration of a local area network 2300 including a network device 2302 that includes an appliance 2350. The network device 2302 can comprise an interface device 2304 and the appliance 2350 connected by an appliance interface 2308. The appliance interface 2308 can include a data connection 2318 and a power connection 2316. The data connection 2318 can be a serial connection (e.g., RS-232, USB, or other), or any other suitable data connection. The interface device 2304 can be fully powered by the appliance 2302 through the power connection 2316, or can have a separate source of power.

The appliance 2350 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 2350 can be adapted to operate with the interface device 2304. The appliance 2350 can be any finite state machine. The appliance 2350 can, but need not, know or store one or more states related to the appliance. For example, the appliance 2350 may know or store data related to whether the appliance 2350 is turned on, how long the appliance has been on (or off), among other status data.

The interface device 2304 can be positioned within the housing of the appliance 2350, or can be attached externally to the appliance 2350. The interface device 2304 can be removable from the appliance 2350, or can be permanently installed in or on the appliance 2350.

The interface device 2304 can be connected to the local area network 2300 through a network interface. The interface device 2304 can be connected by a wired or wireless connection (e.g., WiFi, Zigbee, or others described herein or well known). In some embodiments, the interface device 2304 can be connected directly to the cloud network 114 through a cellular internet connection (e.g., EDGE, LTE, or others).

The interface device 2304 can communicate with another network device, an access device 108, or another client device through the network interface 2306. The interface device 2304 can transmit a status information signal 2310 with status information to the access device 108, and the access device 108 can transmit a network device control signal 2312 to the interface device 2304. The status information signal 2310 and the network device control signal 2312 can be transmitted between the interface device 2304 and the access device 108 using a telecommunications network (e.g., a cellular network, or other suitable broadband network), using a local area network 2300 (e.g., through a gateway 110), or using the cloud network 114, although such a signal may pass through an intermediary device or network to do so.

The interface device 2304 can interpret the network device control signal 2312 and perform actions based on the contents of the network device control signal 2312. The network device control signal 2312 can include commands that can be performed by the interface device 2304 itself. The network device control signal 2312 can also include commands that are to be performed by the appliance 2350. Commands that are to be performed by the appliance 2350 can include commands like turn on or off, set a desired temperature (e.g., heat up or cool down to 215° F. or any other temperature), or other suitable commands depending on the particular appliance. The interface device 2304 can interpret the network device control signal 2312 and can send out a command 2322, through the data connection 2318 of the appliance interface 2308, based on the network device control signal 2312. The appliance 2350 can then perform the command indicated in the network device control signal 2312.

The interface device 2304 can also transmit commands to the appliance 2350 that are not based on a network device control signal received from the access device 108, but are rather based on programming in the interface device 2304. Examples of such commands can include commands to update a communication rate, commands to check a state of the appliance 2350, commands to set or get a clock time of the appliance 2350, or any other suitable commands.

The interface device 2304 can receive, through the data connection 2318 of the appliance interface 2308, a response (e.g., response 2320) to any command from the appliance 2350. In some examples, the response 2320 can include an indication that the command 2322 was received. In some examples, the response may include only an indication that a command is received (e.g., an ACK). In some examples, the response 2320 can include information for some value on the appliance 2350, such as an "on/off" state, a serial number, a product identification, a manufacturer identification, a temperature, a time since live, a setting, or any other value retrievable from the appliance 2350. The interface device 2304 can interpret the value and can send information about the value (e.g., the state of the appliance is "on," the temperature of the appliance, the time since the appliance first turned on, or other information) as status information (e.g. using status information signal 2310) to the access device 108. Additionally, the interface device 2304 can send status information about itself (e.g., time since live, supplied power, signal strength, and others) as status information (e.g. using status information signal 2310) to the access device 108.

The interface device 2304 can also use responses (e.g., response 2320) from the appliance 2350 to perform additional functions at the interface device 2304, such as error handling. In some cases, when performing the additional functions, the interface device 2304 does not transmit any status information 2310 to the access device 108 based on those particular responses.

The access device 108 can include one or more display tiles (e.g., display tile 2314) for displaying information and controls corresponding to the network device 102.

In some embodiments, the interface device 2304 can transmit a heartbeat command (e.g., command 2322) over the data connection 2318 to the appliance 2302 to determine whether the appliance 2350 is working properly and/or in a state of readiness. If the interface device 2304 determines that the appliance 2350 has had some sort of failure (e.g., the appliance 2350 sends a response 2320 indicating a failure or the interface device 2304 does not receive any response 2320), the interface device 2304 can take corrective action (e.g., restarting the appliance 2350 or an element of the appliance 2350), can log the event, or can alert the user).

Figure 24:
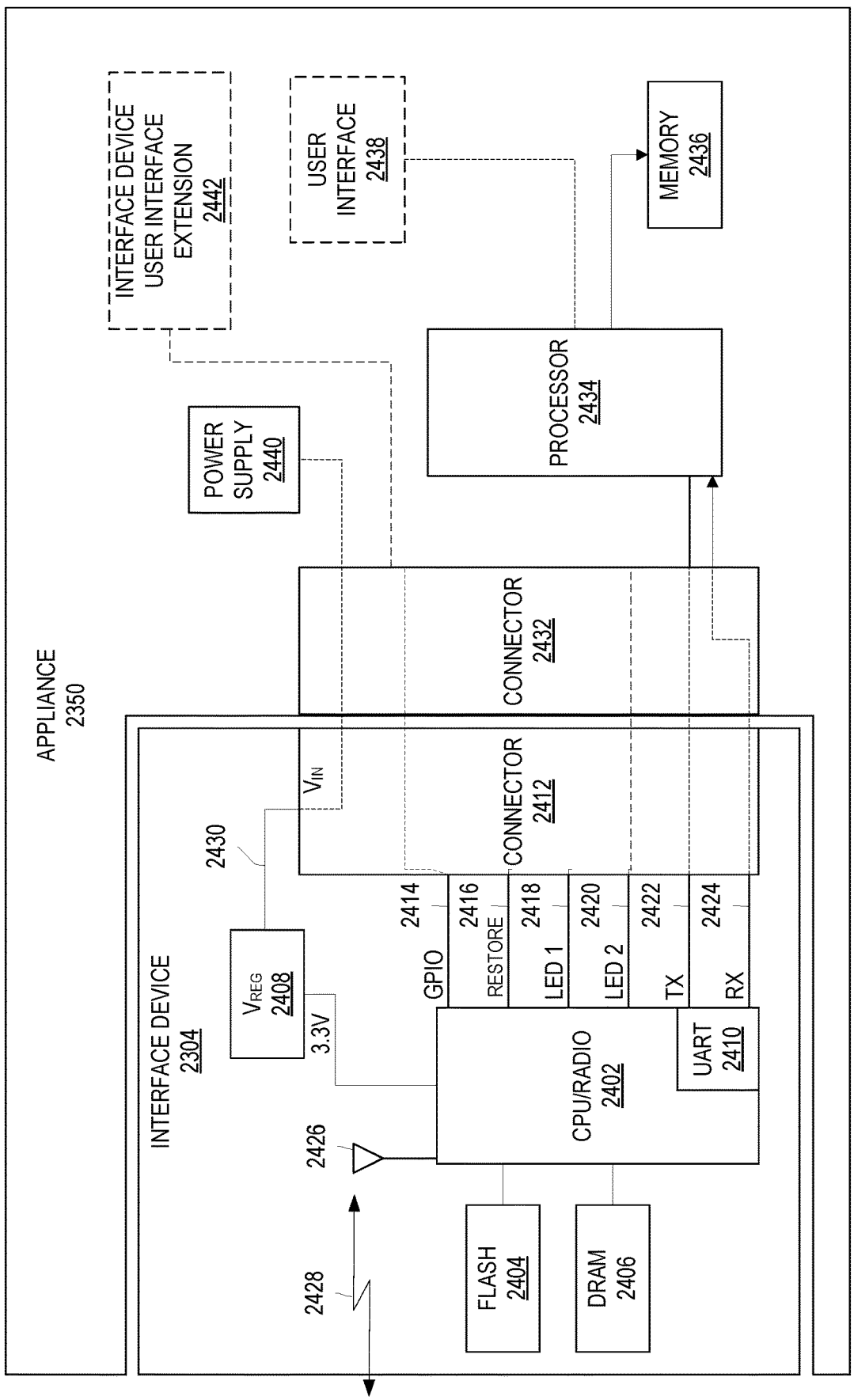
FIG. 24 is an example of a block diagram of a network device including an interface device attached to an appliance, in accordance with an embodiment.

FIG. 24 depicts a block diagram of a network device including an interface device 2304 attached to an appliance 2350 according to one embodiment. The interface device 2304 can include connector 2412 that interacts with connector 2432 of the appliance 2350.

The interface device 2304 can include flash memory 2404 and dynamic random access memory (DRAM) 2406. The flash memory 2404 may be used to store instructions or code relating to an operating system, one or more applications, and any firmware. The flash memory 2404 can be used to store a cache. The flash memory 2404 may include non-volatile memory so that any firmware or other program can be can updated. In the event the interface device 2304 loses power, information stored in the flash memory 2404 may be retained. The DRAM 2406 may store various other types of information needed to run the interface device 2304, such as all runtime instructions or code. The flash memory 2404 or DRAM 2406 or a combination thereof may include all instructions necessary to communicate with an appliance 2350, including all instructions necessary to communicate using the appliance serial protocol disclosed herein.

The interface device 2304 further includes a CPU/Radio 2402. The CPU/Radio 2402 can control the operations of the interface device 2304. For example, the CPU/Radio 2402 may execute various applications or programs stored in the flash memory 2404 and/or the dynamic random access memory (DRAM) 2406. The CPU/Radio 2402 may also receive input from the appliance 2350, interpret the input, and perform one or more functions in response to the input. The CPU/Radio 2402 may further perform all communications functions in order to allow the interface device 2304 to communicate with other network devices, one or more gateways, a cloud network, and/or one or more access devices. The interface device 2304 may communicate with other devices and/or networks via antenna 2426. For example, antenna 2426 may include a 2.4 GHz antenna that can transmit and receive WiFi communications signals 2428. The antenna 2426 may include other types of antennas that can communicate Bluetooth® signals, Zigbee® signals, Ultra-Wideband (UWB) signals, and/or the like. In some embodiments, the interface device 2304 may include multiple antennas for communicating different types of communication signals.

The CPU/Radio 2402 can include at least one universal asynchronous receiver/transmitter (UART) 2410. The CPU/Radio 2303 can use the UART 2410 to send and receive serial communications. The CPU/Radio 2303 can send data through a transmit line 2422 and a receive data through a receive line 2424. The CPU/Radio 2303 can send and receive data through the transmit line 2422 and receive line 2424 using a serial protocol, such as RS232. The CPU/Radio 2402 can also include an input/output (GPIO) line 2414, a restore line 2416, an LED 1 line 2418, and an LED 2 line 2420. The CPU/Radio 2402 can have additional or fewer lines as necessary. The GPIO line 2414 can be used for any suitable function, such as powering an indicator light on an appliance 2350 or accepting an input from the appliance 2350. A signal sent on the restore line 2416 can be used to restore the CPU/Radio 2402 and/or the interface device 2304 to factory defaults. The LED 1 line 2418 and LED 2 line 2420 can be used to power first and second LEDs that can be used to indicate various statuses, such as whether the interface device has a network connection and whether the interface device is powered on.

The interface device 2304 further includes a voltage regulator 2408. The voltage regulator 2408 may be used to convert the voltage output from the appliance 2350 to a voltage usable by the CPU/Radio 2402. For example, the voltage regulator 2408 may regulate the DC voltage from 5V to 3.3V. The voltage regulator 2408 can be supplied with power from a power line 2430.

Each of the interface lines, including the GPIO line 2414, the restore line 2416, the LED 1 line 2418, the LED 2 line 2420, the transmit line 2422, the receive line 2424, the power line 2430, and any additional lines, can be routed through connector 2412. Connector 2412 can be a proprietary or universal connector. Any appliance 2350 to which the interface device 2304 is attached through the connector 2412 can have the necessary hardware to make use of the interface lines, such as to provide power to the power line 2430 and to provide the first and second LEDs that are driven by the LED 1 line 2418 and LED 2 line 2420.

In alternate embodiments, some interface lines are not routed through the connector 2412. For example, the power line 2430 can be routed to a power supply attached directly to the interface device 2304, and the LED 1 line 2418 and LED 2 line 2420 can be routed to first and second LEDs located within the interface device 2304.

In various embodiments, functions may be stored as one or more instructions or code in memory, such as the flash memory 2404 and/or the DRAM 2406. The interface device 2304 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 2404 and/or the DRAM 2406, may be a processor-readable memory and/or a computer-readable memory that stores software code (programming code, instructions, etc.) configured to cause a processor(s) within the CPU/Radio 2402 to perform the functions described. In other embodiments, one or more of the functions described may be performed in hardware.

A set of these instructions and/or code might be stored on a computer-readable storage medium, such as the flash memory 2404 and/or the DRAM 2406. In some cases, the storage medium might be incorporated within a computer system, such as the CPU/Radio 2402. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 2304 and/or might take the form of source and/or installable code, which, upon compilation and/or installation on the interface device 2304 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 2304 may have other components than those depicted in FIG. 24. Further, the embodiment shown in the figures are only one example of an interface device that may incorporate an embodiment of the invention. In some other embodiments, interface device 2304 may have more or fewer components than shown in the figure, may combine two or more components, or may have a different configuration or arrangement of components.

The appliance 2350 can have a processor 2434. The processor 2434 can be a microcontroller, such as a Peripheral Interface Controller (PIC). The appliance 2350 can include a memory 2436 (e.g., a flash memory or other) that is readable by the processor 2434. The memory 2436 can include instructions enabling the innate functionality of the appliance 2350, such as heating and timing for a crock pot.

The appliance 2350 can include a user interface 2438. The user interface 2438 can provide buttons, displays, LEDs, knobs, and other input and output elements necessary for a user to interact with the appliance 2350. For example, a user interface 2438 for a slow cooker can include a display, a power button, a temperature adjustment button, and a start button. The user interface 2438 can be driven and/or monitored by the processor 2434. In some embodiments, the appliance 2350 is "headless" or has no user interface 2438.

The appliance 2350 can include a power supply 2440 that can provide power to the voltage regulator 2438 of the interface device 2304 through connector 2432, connector 2412, and power line 2430.

The appliance 2350 can include an interface device user interface extension 2442. The interface device user interface extension 2442 can include various input and output elements that are passed directly to the interface device 2304 without being processed by the processor 2434. Examples of input and output elements of the interface device user interface extension 2442 include LEDs associated with the LED 1 line 2418 and LED 2 line 2420, a hardware restore button associated with the restore line 2416, or any other suitable input/output element.

Figure 25:
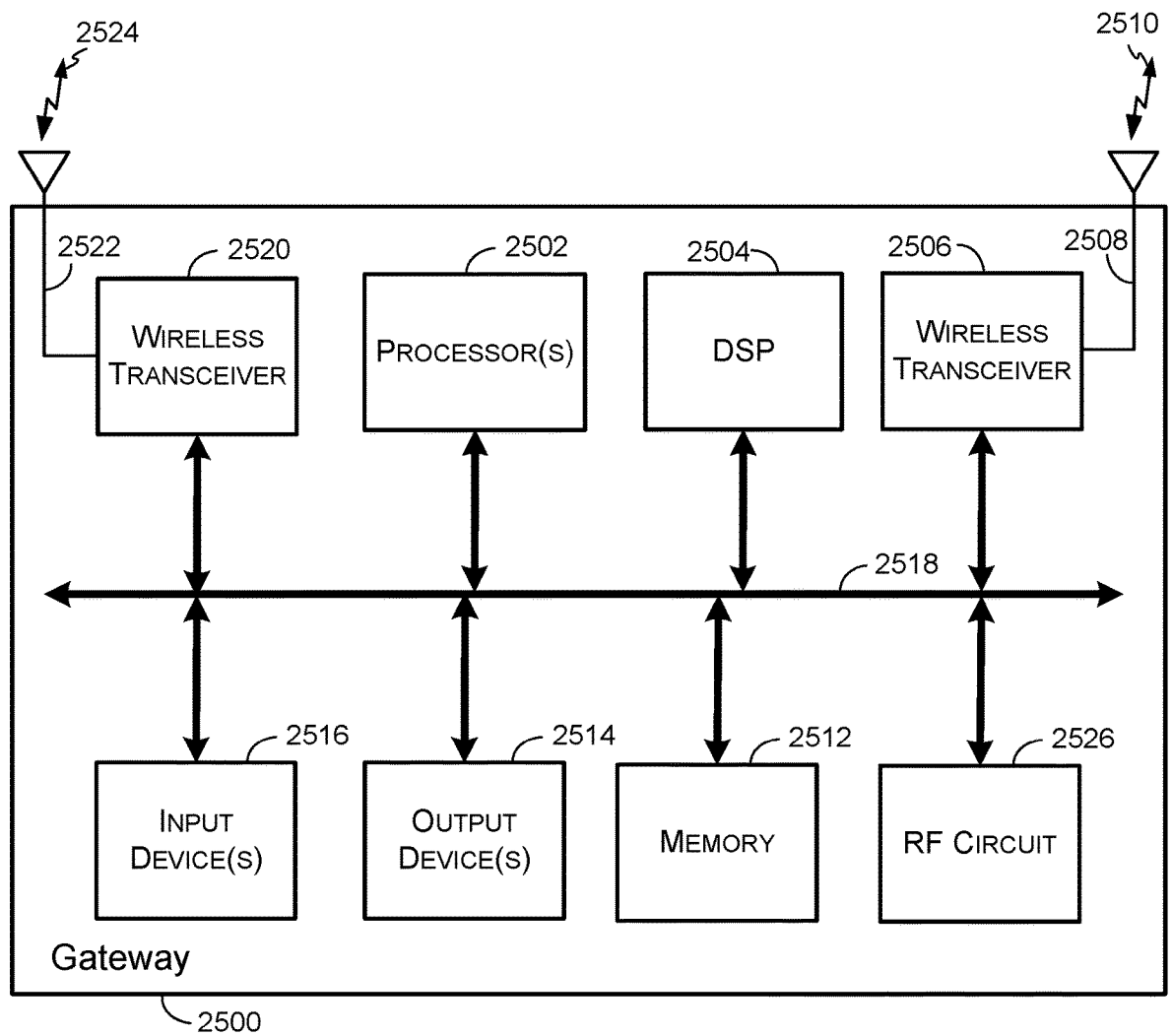
FIG. 25 is a block diagram illustrating an example of a gateway, in accordance with some embodiments.

FIG. 25 illustrates an example of a gateway 2500. The gateway 2500 may include a range extending device, a router, an access point, a modem, and/or any other device that provides network access among one or more computing devices and/or external networks. For example, the gateway 2500 may include a router gateway with access point and router functionality, and may further include an Ethernet switch and/or a modem. As another example, the gateway 2500 may include a range extending gateway that may be used to improve signal range and strength within a network by taking an existing signal from another gateway (e.g., a router gateway, an access point, or the like) and rebroadcasting the signal to create a second logical network.

The gateway 2500 includes hardware elements that can be electrically coupled via a bus 2518 (or may otherwise be in communication, as appropriate). In one embodiment, the bus 2518 can be used for the processor(s) 2502 to communicate between cores and/or with the memory 2512. The hardware elements may include one or more processors 2502, including without limitation one or more general-purpose processors and/or one or more special-purpose processors (such as digital signal processing chips, graphics acceleration processors, and/or the like); one or more input devices 2516, which can include without limitation one or more buttons, a keyboard, a keypad, a touch sensitive screen, a touch pad, and/or the like; and one or more output devices 2514, which can include, without limitation, a display, light or sound indicators, and/or the like.

The gateway 2500 may include one or more wireless transceivers 2506 and 2520 connected to the bus 2518. The wireless transceiver 2506 may be operable to receive wireless signals (e.g., a wireless signal 2510) via an antenna 2508. The wireless transceivers 2520 may be operable to receive wireless signals (e.g., a wireless signal 2514) via an antenna 2522. The wireless transceivers 2506 and 2520 may each include a WiFi transceiver radio designed to transmit and receive signals using frequencies of a specific frequency band, which may be referred to herein as "WiFi circuits." For example, wireless transceiver 2506 may include a 2.4 GHz WiFi circuit, and wireless transceiver 2520 may include a 5 GHz WiFi circuit. Accordingly, the gateway 2500 may include a single WiFi circuit for a first WiFi frequency band, and a single WiFi circuit for a second WiFi frequency band. In some embodiments, the gateway 2500 may include multiple wireless transceivers (not shown) for each available frequency band. The antennas 2508 and 2522 may include multiple band antennas that can transmit and/or receive signals over different frequency bands.

The gateway 2500 may further include radio frequency (RF) circuit 2526. In some embodiments, the wireless transceivers 2506 and 2520 may be integrated with or coupled to the RF circuit 2526 so that the RF circuit 2526 includes the wireless transceivers 2506 and 2520. In some embodiments, the wireless transceivers 2506 and 2520 and the RF circuit 2526 are separate components. The RF circuit 2526 may include a RF amplifier that may amplify signals received over antennas 2508 and 2522. The RF circuit 2526 may also include a power controller that may be used to adjust signal amplification by the RF amplifier. The power controller may be implemented using hardware, firmware, software, or any combination thereof.

The wireless signals 2510 and 2524 may be transmitted via a wireless network. In some embodiments, the wireless network may be any wireless network such as a wireless local area network (e.g., local area network 100), such as WiFi™, a Personal Access Network (PAN), such as Bluetooth®, Zigbee®, or UWB, or a cellular network (e.g. a GSM, WCDMA, LTE, CDMA2000 network). Wireless transceivers 2506 and 2520 may be configured to receive various radio frequency (RF) signals (e.g., signals 2510 and 2524) via antennas 2508 and 2524, respectively, from one or more other gateways, access devices, network devices, cloud networks, and/or the like. Gateway 2500 may also be configured to decode and/or decrypt, via the DSP 2504 and/or processor(s) 2502, various signals received from one or more gateways, network devices, cloud networks, and/or the like.

The gateway 2500 may include a power supply (not shown) that can power the various components of the gateway 2500. The power supply may include a switch-mode power supply, a linear power supply, a push-pull power supply, or any other suitable type of power supply. In some embodiments, the gateway 2500 may include multiple power supplies. For example, a switch-mode power supply may be used to condition input power, and a linear power supply may be used to power the RF circuit 2526. The power supply may be configured to operate over various ranges of appropriate input voltages.

The gateway 2500 may further include (and/or be in communication with) one or more non-transitory machine-readable storage mediums or storage devices (e.g., memory 2512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2512, such as RAM, ROM, FLASH, or disc drive, and executed by processor(s) 2502 or DSP 2504. The gateway 2500 can also comprise software elements (e.g., located within the memory 2512), including, for example, an operating system, device drivers, executable libraries, and/or other code, such as one or more application programs, which may comprise computer programs implementing the functions provided by various embodiments, and/or may be designed to implement methods and/or configure systems, as described herein. Such code and/or instructions can be used to configure and/or adapt a computer (or other device) to perform one or more operations in accordance with various methods. The memory 2512 may be a non-transitory machine-readable storage medium, processor-readable memory, and/or a computer-readable memory that stores the one or more computer-program products configured to cause the processor(s) 2502 to perform the various functions. In other embodiments, one or more of the various functions may be performed in hardware.

A set of these instructions and/or code might be stored on a non-transitory machine-readable storage medium, such as the memory 2512. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the gateway 2500 and/or might take the form of source and/or installable code, which, upon compilation and/or installation on the gateway 2500 (e.g., using any of a variety of generally available compilers, installation programs, compression/decompression utilities, etc.) then takes the form of executable code.

Figure 26:
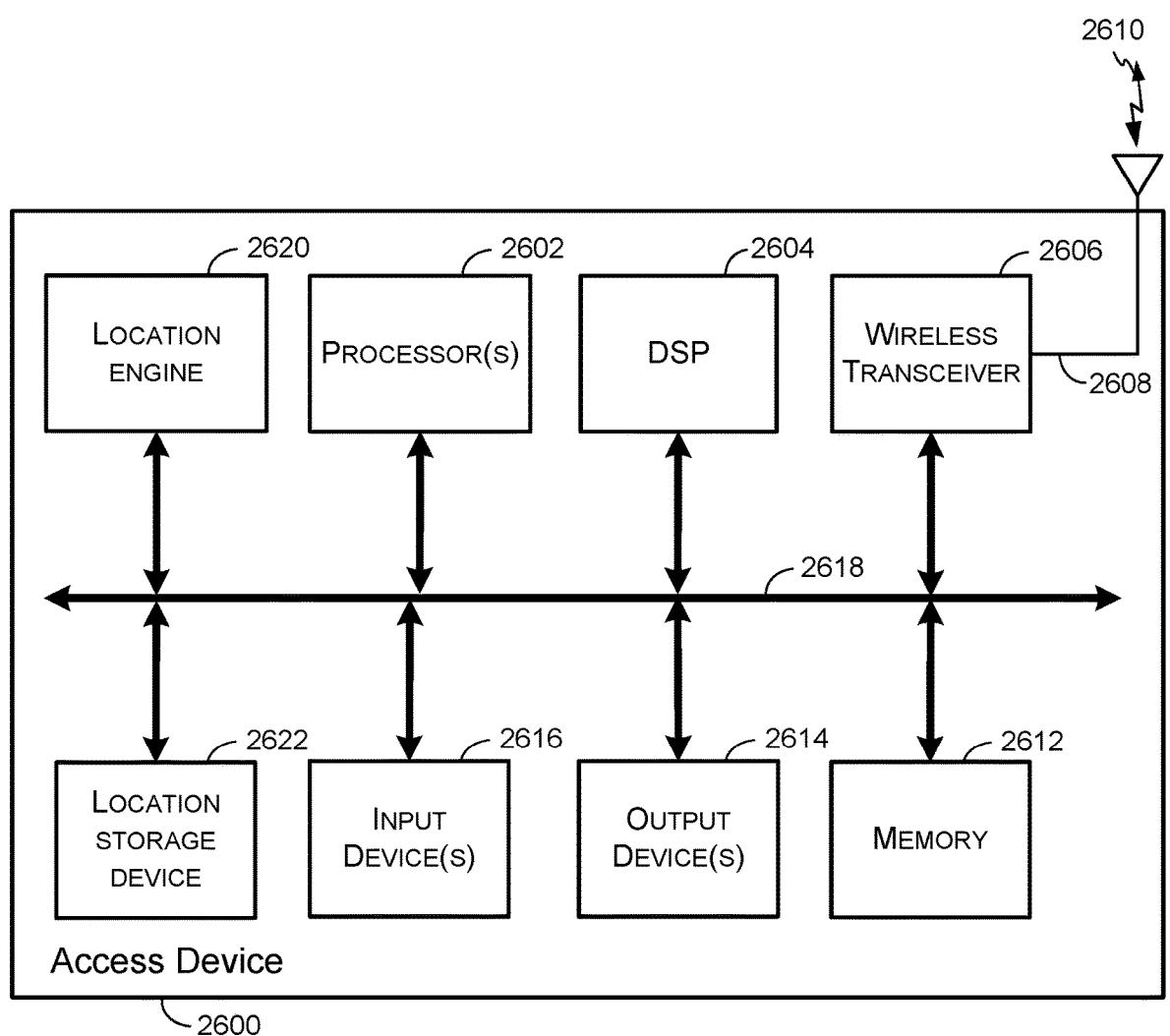
FIG. 26 is a block diagram illustrating an example of an access device, in accordance with some embodiments.

FIG. 26 illustrates an example of an access device 2600. The access device 2600 may include any human-to-machine interface with network connection capability that allows access to a network. For example, the access device 2600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2600 includes hardware elements that can be electrically coupled via a bus 2618 (or may otherwise be in communication, as appropriate). In one embodiment, the bus 2618 can be used for the processor(s) 2602 to communicate between cores and/or with the memory 2612. The hardware elements may include one or more processors 2602, including without limitation one or more general-purpose processors and/or one or more special-purpose processors (such as digital signal processing chips, graphics acceleration processors, and/or the like); one or more input devices 2616, which can include without limitation a camera, a mouse, a keyboard, a touch sensitive screen, a touch pad, a keypad, and/or the like; and one or more output devices 2614, which can include, without limitation, a display, a printer, and/or the like.

The access device 2600 may include one or more wireless transceivers 2606 connected to the bus 2618. The wireless transceiver 2606 may be operable to receive wireless signals via antenna 2608 (e.g., signal 2610). The wireless signal 2610 may be transmitted via a wireless network. In some embodiments, the wireless network may be any wireless network such as a wireless local area network (e.g., local area network 100), such as WiFi, a Personal Access Network (PAN), such as Bluetooth®, Zigbee®, or UWB, or a cellular network (e.g. a GSM, WCDMA, LTE, CDMA2000 network). Wireless transceiver 2606 may be configured to receive various radio frequency (RF) signals (e.g., signal 2610) via antenna 2608 from one or more gateways, network devices, other access devices, cloud networks, and/or the like. Access device 2600 may also be configured to decode and/or decrypt, via the DSP 2604 and/or processor(s) 2602, various signals received from one or more gateways, network devices, other access devices, cloud networks, and/or the like.

The access device 2600 further includes a location engine 2620 and a location storage device 2622. The location engine 2620 is configured to perform one or more of the steps described above with respect to FIG. 9, 10, 13, or 15. For example, the location engine 2620 may obtain location information and one or more signals received by the wireless transceiver 2606. The location information may include location coordinates of another access device, and the one or more signals may be received from the other access device. The location engine 2620 may determine a location of the access device 2600 using the location information, as described above with respect to FIG. 9. The location storage device 2622 may store the location of the access device 2600. In another example, the location engine 2620 may provide for display an icon of a network device. The input device 2616 or the transceiver 2606 may receive input indicating a position of the network device, as described above with respect to FIG. 10. The transceiver 2606 may then transmit the position to the network device. In another example, the location engine 2620 may obtain or determine a location of a device that a requestor has requested the access device 2600 to locate, as described above with respect to FIG. 13. The transceiver 2606 may transmit the obtained location to a server. In yet another example, the location engine 2620 may generate a tracking signal that includes an identifier of the access device. The location engine 2620 may obtain a response, received by the transceiver 2606, that includes location information of a device. The location engine 2620 may then determine a location of the access device 2600 using the location information and a determined distance, as described above with respect to FIG. 15. The transceiver 2606 may then transmit the location of the access device and the identifier to the device.

The access device 2600 may further include (and/or be in communication with) one or more non-transitory machine-readable storage mediums or storage devices (e.g., memory 2612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2612, such as RAM, ROM, FLASH, or disc drive, and executed by processor(s) 2602 or DSP 2604. The access device 2600 can also comprise software elements (e.g., located within the memory 2612), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 9, 10, 13, or 15, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 9, 10, 13, or 15. For example, the access device 2600 may be used as a location device or a tracking device. The memory 2612 may be a non-transitory machine-readable storage medium, processor-readable memory, and/or a computer-readable memory that stores the one or more computer-program products configured to cause the processor(s) 2602 to perform the functions described. In other embodiments, one or more of the functions described may be performed in hardware.

A set of these instructions and/or code might be stored on a non-transitory machine-readable storage medium, such as the memory 2612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the access device 2600 and/or might take the form of source and/or installable code, which, upon compilation and/or installation on the access device 2600 (e.g., using any of a variety of generally available compilers, installation programs, compression/decompression utilities, etc.) then takes the form of executable code.

Figure 27:
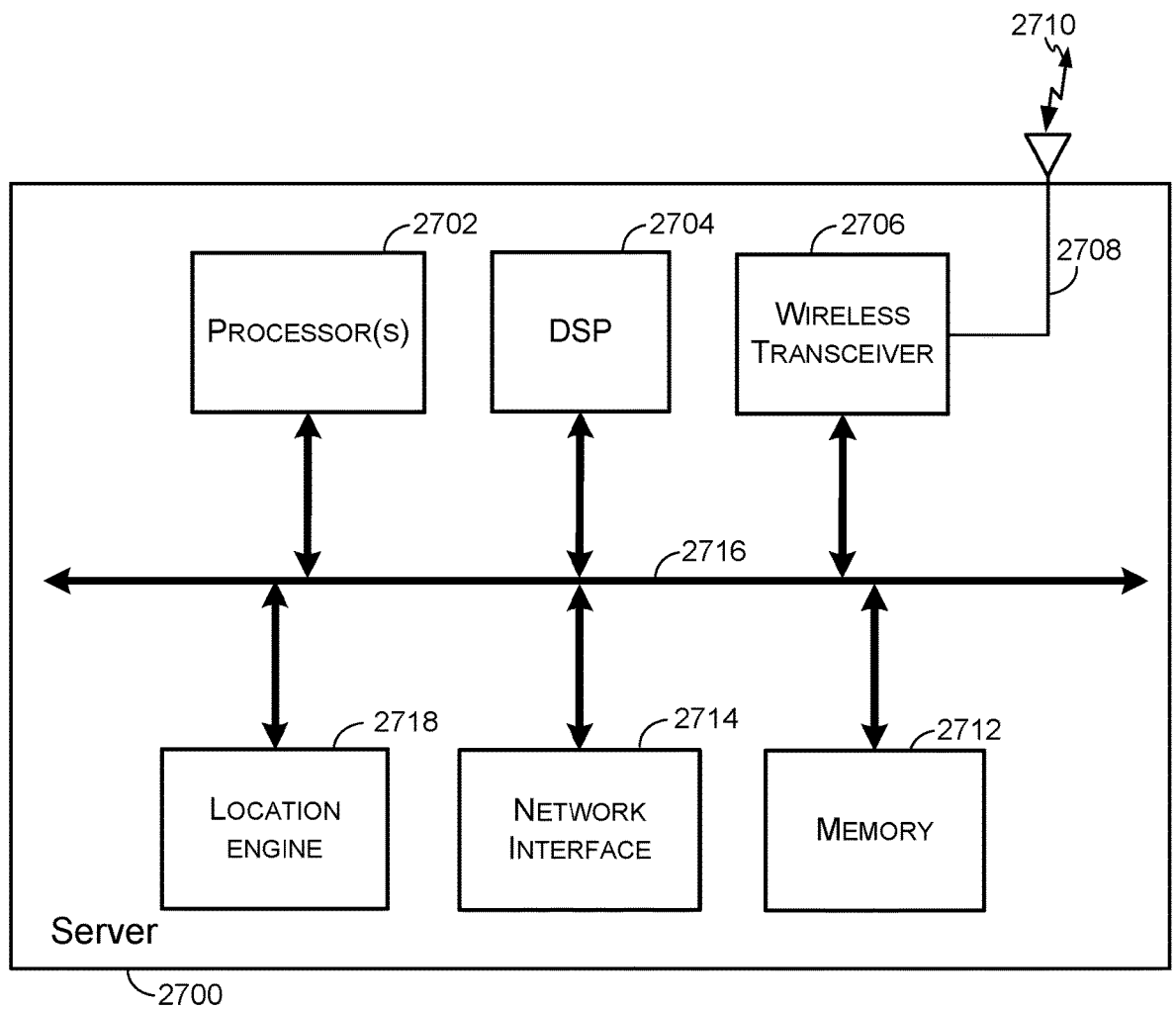
FIG. 27 is a block diagram illustrating an example of a server, in accordance with some embodiments.

FIG. 27 illustrates an example of a server 2700. The server 2700 includes hardware elements that can be electrically coupled via a bus 2716 (or may otherwise be in communication, as appropriate). In one embodiment, the bus 2716 can be used for the processor(s) 2702 to communicate between cores and/or with the memory 2712. The hardware elements may include one or more processors 2702 (e.g., one or more digital signal processing chips, graphics acceleration processors, and/or the like), memory 2712, DSP 2704, a wireless transceiver 2706, a bus 2716, and antenna 2708. Furthermore, in addition to the wireless transceiver 2706, server 2700 can further include a network interface 2714 to communicate with a network (e.g., a local area network, a network of a preferred carrier, Internet, a wide area network, or other suitable network).

The server 2700 further includes a location engine 2718. The location engine 2718 is configured to perform one or more of the steps described above with respect to FIG. 14. For example, the location engine 2718 may determine a location device that is present within a geographical area. The location engine 2718 may determine the presence of the location device in view of a location request requesting location of a device, an identifier of the device, and an identification of the geographical area being received by the transceiver 2706. The location engine 2718 can cause the transceiver 2706 to transmit the location request and the identifier of the device to the location device. The location engine 2718 may then obtain a location of the device received by the transceiver 2706 from the location device, and may cause the transceiver 2706 to transmit the location of the device to the requestor device requesting location of the device.

The server 2700 may further include (and/or be in communication with) one or more non-transitory machine-readable storage mediums or storage devices (e.g., memory 2712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2712, such as RAM, ROM, FLASH, or disc drive, and executed by processor(s) 2702 or DSP 2704. The server 2700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 14. For example, the server 2700 may include the network server described above. The memory 2712 may be a non-transitory machine-readable storage medium, processor-readable memory, and/or a computer-readable memory that stores the one or more computer-program products configured to cause the processor(s) 2702 to perform the functions described. In other embodiments, one or more functions described herein may be performed in hardware.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A network device comprising:
one or more processing devices;
a non-transitory, machine-readable storage medium containing instructions which when executed by the one or more processing devices, cause the one or more processing devices to perform operations comprising:
processing a tracking signal received from a second network device, wherein the tracking signal comprises an identifier of the second network device;
identifying location information of the network device;
determining a distance between the network device and the second network device;
determining a location of the second network device using the location information and the determined distance; and
causing communication of second location information corresponding to the location of the second network device and the identifier of the second network device to a network server and/or another device.

2. The network device as recited in claim 1, the operations further comprising:
receiving a request to locate the second network device, and
where the determining the location of the second network device is consequent to the request.

3. The network device as recited in claim 2, where the request to locate the second network device is received from a third network device.

4. The network device as recited in claim 2, where the request comprises the identifier of the second network device, and the operations further comprise using the identifier from the request and the identifier from the tracking signal to identify the second network device.

5. The network device as recited in claim 1, where the determining the distance between the network device and the second network device comprises:
- analyzing multiple responses received over a period of time from the second network device; and
- determining the distance between the network device and the second network device based on analyzing the multiple responses and using triangulation or trilateration.

6. The network device as recited in claim 1, the operations further comprising:
- causing transmitting, to the second network device, of an indication that the location of the second network device has been determined.

7. The network device as recited in claim 1, the operations further comprising:
- initiating storing of the second location information in a profile associated with the second network device.

8. One or more non-transitory, machine-readable media having machine-readable instructions thereon which, when executed by one or more processors, cause the one or more processors to perform operations comprising:
- processing a tracking signal received from a second network device, wherein the tracking signal comprises an identifier of the second network device;
- identifying location information of a network device;
- determining a distance between the network device and the second network device;
- determining a location of the second network device using the location information and the determined distance; and
- causing communication of second location information corresponding to the location of the second network device and the identifier of the second network device to a network server and/or another device.

9. The one or more non-transitory, machine-readable media as recited in claim 8, the operations further comprising:
- receiving a request to locate the second network device, and
- where the determining the location of the second network device is consequent to the request.

10. The one or more non-transitory, machine-readable media as recited in claim 9, where the request to locate the second network device is received from a third network device.

11. The one or more non-transitory, machine-readable media as recited in claim 10, where the request comprises the identifier of the second network device, and the operations further comprise using the identifier from the request and the identifier from the tracking signal to identify the second network device.

12. The one or more non-transitory, machine-readable media as recited in claim 8, where the determining the distance between the network device and the second network device comprises:
- analyzing multiple responses received over a period of time from the second network device; and
- determining the distance between the network device and the second network device based on analyzing the multiple responses and using triangulation or trilateration.

13. The one or more non-transitory, machine-readable media as recited in claim 8, the operations further comprising:
- causing transmitting, to the second network device, of an indication that the location of the second network device has been determined.

14. The one or more non-transitory, machine-readable media as recited in claim 8, the operations further comprising:
- initiating storing of the second location information in a profile associated with the second network device.

15. A method comprising:
- processing a tracking signal received from a second network device, wherein the tracking signal comprises an identifier of the second network device;
- identifying location information of a network device;
- determining a distance between the network device and the second network device;
- determining a location of the second network device using the location information and the determined distance; and
- causing communication of second location information corresponding to the location of the second network device and the identifier of the second network device to a network server and/or another device.

16. The method as recited in claim 15, further comprising:
- receiving a request to locate the second network device, and
- where the determining the location of the second network device is consequent to the request.

17. The method as recited in claim 16, where the request to locate the second network device is received from a third network device.

18. The method as recited in claim 16, where the request comprises the identifier of the second network device, and the method further comprises using the identifier from the request and the identifier from the tracking signal to identify the second network device.

19. The method as recited in claim 15, where the determining the distance between the network device and the second network device comprises:
- analyzing multiple responses received over a period of time from the second network device; and
- determining the distance between the network device and the second network device based on analyzing the multiple responses and using triangulation or trilateration.

20. The method as recited in claim 15, further comprising:
- causing transmitting, to the second network device, of an indication that the location of the second network device has been determined.

* * * * *